(12) United States Patent
Kimura

(10) Patent No.: US 9,703,140 B2
(45) Date of Patent: Jul. 11, 2017

(54) DISPLAY DEVICE AND MANUFACTURING METHOD THEREOF

(71) Applicant: SEMICONDUCTOR ENERGY LABORATORY CO., LTD., Atsugi-shi, Kanagawa-ken (JP)

(72) Inventor: Hajime Kimura, Kanagawa (JP)

(73) Assignee: Semiconductor Energy Laboratory Co., Ltd., Atsugi-shi, Kanagawa-ken (JP)

(*) Notice: Subject to any disclaimer, the term of this patent is extended or adjusted under 35 U.S.C. 154(b) by 8 days.

(21) Appl. No.: 14/819,595

(22) Filed: Aug. 6, 2015

(65) Prior Publication Data

US 2016/0033820 A1    Feb. 4, 2016

Related U.S. Application Data

(63) Continuation of application No. 14/153,163, filed on Jan. 13, 2014, now abandoned, which is a
(Continued)

(30) Foreign Application Priority Data

Dec. 28, 2005    (JP) ................................. 2005-378778

(51) Int. Cl.
   *G02F 1/1335*    (2006.01)
   *B82Y 20/00*    (2011.01)
   (Continued)

(52) U.S. Cl.
   CPC ........ *G02F 1/133555* (2013.01); *B82Y 20/00* (2013.01); *G02F 1/1333* (2013.01);
   (Continued)

(58) Field of Classification Search
   CPC ......... G02F 1/133555; G02F 1/133345; G02F 1/1368; G02F 1/136286
   See application file for complete search history.

(56) References Cited

U.S. PATENT DOCUMENTS 6,195,140 B1    2/2001  Kubo et al.
6,295,109 B1    9/2001  Kubo et al.
(Continued)

FOREIGN PATENT DOCUMENTS

CN    001402064 A    3/2003
CN    001410815 A    4/2003
(Continued)

OTHER PUBLICATIONS

Huang.Y et al., "8.3:A Single Cell-Gap Transflective Color TFT-LCD by using Image-Enhanced Reflector", SID Digest '03 : SID International Symposium Digest of Technical Papers, 2003, vol. 34, pp. 86-89.
(Continued)

*Primary Examiner* — Dung Nguyen
(74) *Attorney, Agent, or Firm* — Fish & Richardson P.C.

(57) ABSTRACT

In a semi-transmission liquid crystal display device, two resist masks are required to form a reflective electrode and a transparent electrode; therefore, cost is high. A transparent electrode and a reflective electrode which function as a pixel electrode are stacked. A resist pattern which includes a region having a thick film thickness and a region having a thinner film thickness than the aforementioned region is formed over the reflective electrode by using a light exposure mask which includes a semi-transmission portion. The reflective electrode and the transparent electrode are formed by using the resist pattern. Therefore, the reflective electrode and the transparent electrode can be formed by using one resist mask.

17 Claims, 52 Drawing Sheets

Related U.S. Application Data continuation of application No. 12/730,566, filed on Mar. 24, 2010, now Pat. No. 8,634,044, which is a continuation of application No. 11/614,809, filed on Dec. 21, 2006, now Pat. No. 7,821,613.

(51) Int. Cl.
  *G02F 1/1333*  (2006.01)
  *G02F 1/1368*  (2006.01)
  *G02F 1/1362*  (2006.01)

(52) U.S. Cl.
  CPC ...... *G02F 1/1368* (2013.01); *G02F 1/133345* (2013.01); *G02F 1/133371* (2013.01); *G02F 1/136286* (2013.01); *G02F 2001/136231* (2013.01); *G02F 2202/36* (2013.01)

(56) References Cited

U.S. PATENT DOCUMENTS

| | | | |
|---|---|---|---|
| 6,330,047 | B1 | 12/2001 | Kubo et al. |
| 6,452,654 | B2 | 9/2002 | Kubo et al. |
| 6,624,446 | B2 | 9/2003 | Kim |
| 6,808,868 | B2 | 10/2004 | Fujibayashi et al. |
| 6,819,379 | B2 | 11/2004 | Kubo et al. |
| 6,828,167 | B2 | 12/2004 | Kim |
| 6,847,426 | B2 | 1/2005 | Fujimori et al. |
| 6,850,298 | B2 | 2/2005 | Fujimori et al. |
| 6,853,421 | B2 | 2/2005 | Sakamoto et al. |
| 6,906,841 | B2 | 6/2005 | Adachi |
| 6,950,159 | B2 | 9/2005 | Kubo et al. |
| 7,015,997 | B2 | 3/2006 | Choi et al. |
| 7,030,948 | B2 | 4/2006 | Fujimori et al. |
| 7,061,014 | B2 | 6/2006 | Hosono et al. |
| 7,064,346 | B2 | 6/2006 | Kawasaki et al. |
| 7,075,603 | B2 | 7/2006 | Ihida et al. |
| 7,115,913 | B2 | 10/2006 | Shigeno |
| 7,142,272 | B2 | 11/2006 | Fujimori et al. |
| 7,151,581 | B2 | 12/2006 | Kubo et al. |
| 7,161,648 | B2 | 1/2007 | Lim et al. |
| 7,176,494 | B2 | 2/2007 | Kim |
| 7,196,766 | B2 | 3/2007 | Yang et al. |
| 7,212,267 | B2 | 5/2007 | Fujimori et al. |
| 7,250,996 | B2 | 7/2007 | Yoshida et al. |
| 7,282,782 | B2 | 10/2007 | Hoffman et al. |
| 7,289,188 | B2 | 10/2007 | Yang et al. |
| 7,298,436 | B2 | 11/2007 | Misaki et al. |
| 7,323,356 | B2 | 1/2008 | Hosono et al. |
| 7,385,660 | B2 | 6/2008 | Kume et al. |
| 7,468,768 | B2 | 12/2008 | Kubo et al. |
| 7,483,101 | B2 | 1/2009 | Lim et al. |
| 7,486,361 | B2 | 2/2009 | Yoshida et al. |
| 7,532,281 | B2 | 5/2009 | Kim et al. |
| 7,535,528 | B2 | 5/2009 | Kubo et al. |
| 7,541,223 | B2 | 6/2009 | Yang et al. |
| 7,548,293 | B2 | 6/2009 | Choi et al. |
| 7,586,575 | B2 | 9/2009 | Higa et al. |
| 7,599,026 | B2 | 10/2009 | Misaki et al. |
| 7,626,663 | B2 | 12/2009 | Kimura |
| 7,663,717 | B2 | 2/2010 | Kubo et al. |
| 7,679,698 | B2 | 3/2010 | Fujioka et al. |
| 7,697,099 | B2 | 4/2010 | Kume et al. |
| 7,701,538 | B2 | 4/2010 | Kume et al. |
| 7,705,943 | B2 | 4/2010 | Kume et al. |
| 7,751,003 | B2 | 7/2010 | Yoshida et al. |
| 7,773,182 | B2 * | 8/2010 | Kimura ............ G02F 1/134363 349/141 |
| 7,795,616 | B2 | 9/2010 | Yamazaki et al. |
| 7,821,613 | B2 | 10/2010 | Kimura |
| 7,833,813 | B2 | 11/2010 | Cho et al. |
| 7,894,026 | B2 | 2/2011 | Kim et al. |
| 7,952,667 | B2 | 5/2011 | Kubo et al. |
| 7,964,452 | B2 | 6/2011 | Yamazaki et al. |
| 8,054,423 | B2 | 11/2011 | Kubo et al. |
| 8,228,469 | B2 | 7/2012 | Kubo et al. |
| 8,634,044 | B2 | 1/2014 | Kimura |
| 2002/0033918 | A1 | 3/2002 | Shigeno et al. |
| 2003/0164910 | A1 | 9/2003 | Yamazaki et al. |
| 2003/0164911 | A1 | 9/2003 | Eguchi et al. |
| 2003/0218664 | A1 | 11/2003 | Sakamoto et al. |
| 2004/0114077 | A1 | 6/2004 | Chen et al. |
| 2004/0141116 | A1 | 7/2004 | You |
| 2004/0156604 | A1 | 8/2004 | Ino et al. |
| 2004/0212294 | A1 | 10/2004 | Oda et al. |
| 2004/0212763 | A1 | 10/2004 | Tsuchiya |
| 2004/0218123 | A1 | 11/2004 | Park et al. |
| 2005/0030450 | A1 | 2/2005 | Okamoto et al. |
| 2005/0062134 | A1 | 3/2005 | Ho et al. |
| 2005/0094067 | A1 | 5/2005 | Sakamoto et al. |
| 2005/0104070 | A1 | 5/2005 | Kim et al. |
| 2005/0122452 | A1 | 6/2005 | Yoshida et al. |
| 2005/0128399 | A1 | 6/2005 | Kim et al. |
| 2005/0140871 | A1 | 6/2005 | Hwang |
| 2005/0146658 | A1 | 7/2005 | Kim et al. |
| 2005/0151901 | A1 | 7/2005 | Kikkawa et al. |
| 2005/0195353 | A1 | 9/2005 | Park et al. |
| 2005/0213002 | A1 | 9/2005 | Wen et al. |
| 2005/0224804 | A1 | 10/2005 | Champion et al. |
| 2005/0264729 | A1 | 12/2005 | Lin et al. |
| 2005/0270449 | A1 | 12/2005 | Koma et al. |
| 2006/0119771 | A1 | 6/2006 | Lim et al. |
| 2006/0244107 | A1 | 11/2006 | Sugihara et al. |
| 2007/0063211 | A1 | 3/2007 | Iwasaki |
| 2007/0177083 | A1 | 8/2007 | Fujimori et al. |
| 2007/0194379 | A1 | 8/2007 | Hosono et al. |
| 2009/0278122 | A1 | 11/2009 | Hosono et al. |
| 2009/0280600 | A1 | 11/2009 | Hosono et al. |
| 2011/0101352 | A1 | 5/2011 | Hosono et al. |
| 2011/0201162 | A1 | 8/2011 | Hosono et al. |
| 2011/0212558 | A1 | 9/2011 | Yamazaki et al. |
| 2012/0012838 | A1 | 1/2012 | Hosono et al. |
| 2014/0132872 | A1 | 5/2014 | Kimura |

FOREIGN PATENT DOCUMENTS

| | | |
|---|---|---|
| CN | 001415998 A | 5/2003 |
| CN | 001538227 A | 10/2004 |
| EP | 1134811 A | 9/2001 |
| EP | 1284433 A | 2/2003 |
| EP | 1477842 A | 11/2004 |
| EP | 1737044 A | 12/2006 |
| EP | 2226847 A | 9/2010 |
| EP | 2246894 A | 11/2010 |
| EP | 2413366 A | 2/2012 |
| JP | 04-012330 A | 1/1992 |
| JP | 05-251705 A | 9/1993 |
| JP | 11-101992 A | 4/1999 |
| JP | 2000-044236 A | 2/2000 |
| JP | 2000-150900 A | 5/2000 |
| JP | 2000-276110 A | 10/2000 |
| JP | 2002-076356 A | 3/2002 |
| JP | 2002-094064 A | 3/2002 |
| JP | 2002-134756 A | 5/2002 |
| JP | 2002-229016 A | 8/2002 |
| JP | 2002-289859 A | 10/2002 |
| JP | 2002-341384 A | 11/2002 |
| JP | 2003-107505 A | 4/2003 |
| JP | 2003-207774 A | 7/2003 |
| JP | 2004-004680 A | 1/2004 |
| JP | 2004-020610 A | 1/2004 |
| JP | 2004-045558 A | 2/2004 |
| JP | 2004-046223 A | 2/2004 |
| JP | 2004-086108 A | 3/2004 |
| JP | 2004-109797 A | 4/2004 |
| JP | 2004-205663 A | 7/2004 |
| JP | 2004-310110 A | 11/2004 |
| JP | 2004-325838 A | 11/2004 |
| JP | 2004-334205 A | 11/2004 |
| JP | 2005-033172 A | 2/2005 |
| JP | 2005-091477 A | 4/2005 |
| JP | 2005-134889 A | 5/2005 |
| JP | 2005-157224 A | 6/2005 |
| JP | 2005-165309 A | 6/2005 |
| JP | 2005-173037 A | 6/2005 |

(56) References Cited

FOREIGN PATENT DOCUMENTS

| | | |
|---|---|---|
| JP | 2005-196176 A | 7/2005 |
| JP | 2005-524115 | 8/2005 |
| JP | 2005-258183 A | 9/2005 |
| JP | 2005-258410 A | 9/2005 |
| JP | 2005-266761 A | 9/2005 |
| JP | 2005-275213 A | 10/2005 |
| JP | 2005-292399 A | 10/2005 |
| JP | 2005-331675 A | 12/2005 |
| JP | 2005-331926 A | 12/2005 |
| JP | 2005-338829 A | 12/2005 |
| JP | 2005-338845 A | 12/2005 |
| JP | 2006-201793 A | 8/2006 |
| JP | 2007-133293 A | 5/2007 |
| JP | 2007-199708 A | 8/2007 |
| KR | 2003-0010412 A | 2/2003 |
| KR | 2004-0087469 A | 10/2004 |
| WO | WO-03/040441 | 5/2003 |
| WO | WO-03/093898 | 11/2003 |
| WO | WO-2005/047967 | 5/2005 |
| WO | WO-2005/088726 | 9/2005 |

OTHER PUBLICATIONS

Jeong.Y et al., "P-111: Voltage and Rubbing Angle Dependent Behavior of the Single Cell Gap Transflective Fringe Field Switching (FFS) Mode", SID Digest '05 : SID International Symposium Digest of Technical Papers, 2005, vol. 36, pp. 732-725.

Kang.S et al., "4.2:Development of a Novel Trasflective Color LTPS-LCD with Cap-Divided VA-MODE", SID Digest '04 : SID International Symposium Digest of Technical Papers, 2004, vol. 35, pp. 31-33.

Kimizuka.N. et al., "Syntheses and Single-Crystal Data of Homologous Compounds, $In_2O_3(ZnO)_m$ (m=3, 4, and 5), $InGaO_3(ZnO)_3$, and $Ga_2O_3(ZnO)_m$ (m=7, 8, 9, and 16) in the $In_2O_3$-$ZnGa_2O_4$-ZnO System", Journal of Solid State Chemistry, Apr. 1, 1995, vol. 116, No. 1, pp. 170-178.

Li.C et al., "Modulated Structures of Homologous Compounds $InMO_3(ZnO)_m$ (M=In,Ga; m=Integer) Described by Four-Dimensional Superspace Group", Journal of Solid State Chemistry, 1998, vol. 139, pp. 347-355.

Liu.H et al., "20.3:An Ultra Low Driving Voltage and High Performance Reflective Optical self-Compensated TFT-LCD with Wide-Viewing Angle Design", SID Digest '02 : SID International Symposium Digest of Technical Papers, 2002, vol. 33, pp. 766-769.

Nomura.K et al., "Carrier transport in transparent oxide semiconductor with intrinsic structural randomness probed using single-crystalline $InGaO_3(ZnO)_5$ films", Appl. Phys. Lett. (Applied Physics Letters) , Sep. 13, 2004, vol. 85, No. 11, pp. 1993-1995.

Nomura.K et al., "Room-Temperature Fabrication of Transparent Flexible Thin-Film Transistors Using Amorphous Oxide Semiconductors", Nature, Nov. 25, 2004, vol. 432, pp. 488-492.

Nomura.K et al., "Thin-Film Transistor Fabricated in Single-Crystalline Transparent Oxide Semiconductor", Science, May 23, 2003, vol. 300, No. 5623, pp. 1269-1272.

Roosendal.S et al., "8.1:Novel High Performance Transflective LCD with a Paterned Retarder", SID Digest '03 : SID International Symposium Digest of Technical Papers, 2003, vol. 34, pp. 78-81.

Tateuchi.M et al., "56.1:Novel Pixel Structured High Resolution Transflective poly-Si TFT LCDs", SID Digest '03 : SID International Symposium Digest of Technical Papers, 2003, vol. 34, pp. 1486-1489.

Yang.C et al., "68.1:A Transflective OCB LCD with Wide Viewing Angle and Fast Response", SID Digest '05 : SID International Symposium Digest of Technical Papers, 2005, vol. 36, pp. 1876-1879.

Yoda.E et al., "20.2:Wide-Viewing-Angle Transflective TFT-LCDs with Hybird Aligned Nematic Compensators", SID Digest '02 : SID International Symposium Digest of Technical Papers, 2002, vol. 33, pp. 762-765.

Kamiya.T et al., "1a-F-5 Room temperature fabrication and carrier transport of amorphous semiconductor exhibiting large electron Hall mobilities > cm2/Vs", (The 65th Autumn Meeting, 2004) The Japan Society of Applied Physics, Sep. 1, 2004, No. 2, p. 791.

Nomura.K et al., "31a-ZA-6 Carrier Transport in Transparent Amorphous Oxide Semiconductor $InGaZnO_4$", (The 51st Spring Meeting,2004); The Japan Society of Applied Physics and Related Societies, Mar. 28, 2004, No. 2, p. 669.

Office Action (Application No. 200610156731.0) Dated Oct. 16, 2009.

Office Action (Application No. 200610156731.0) Dated May 19, 2010.

Chinese Office Action (Application No. 200610156731.0) Dated Oct. 26, 2010.

Korean Office Action (Application No. 2006-0136941) Dated Dec. 31, 2012.

* cited by examiner

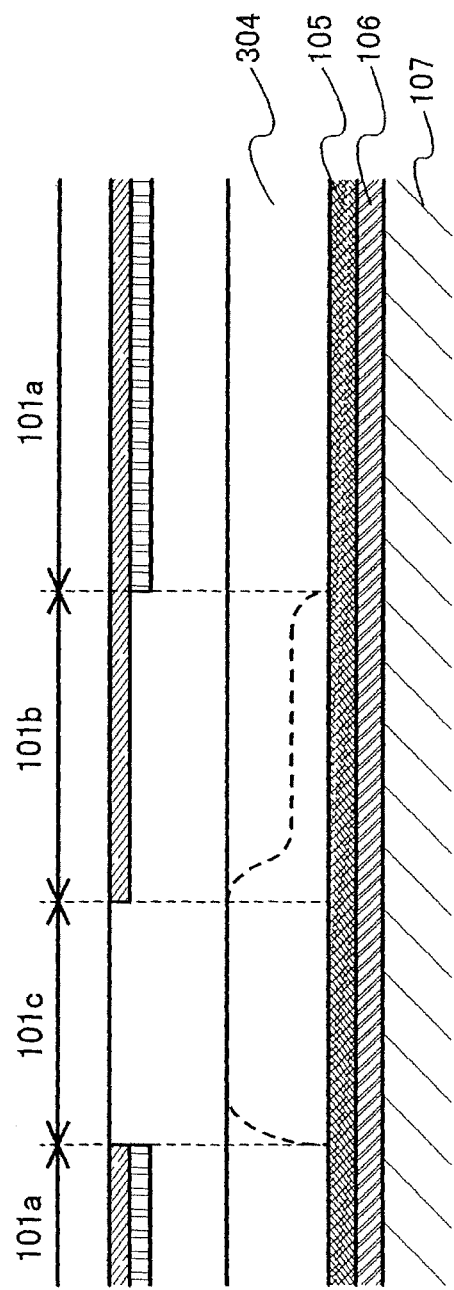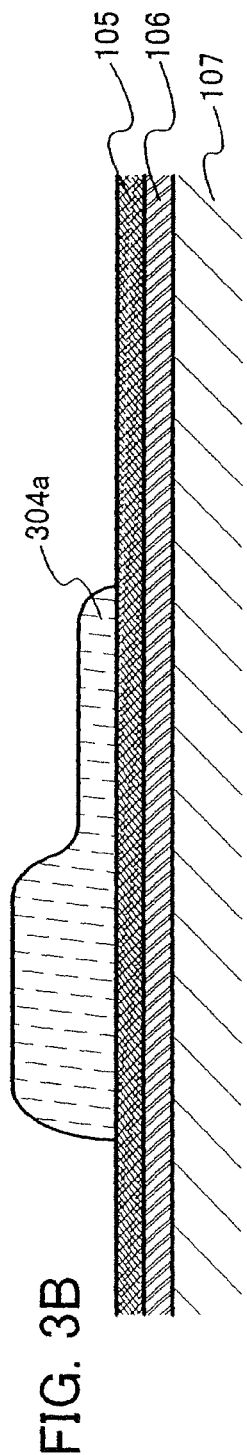

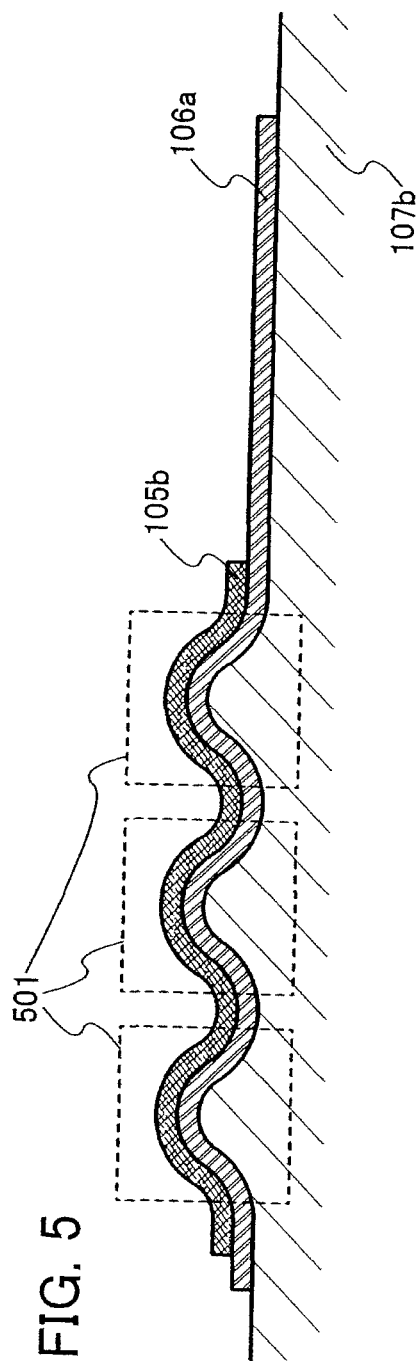

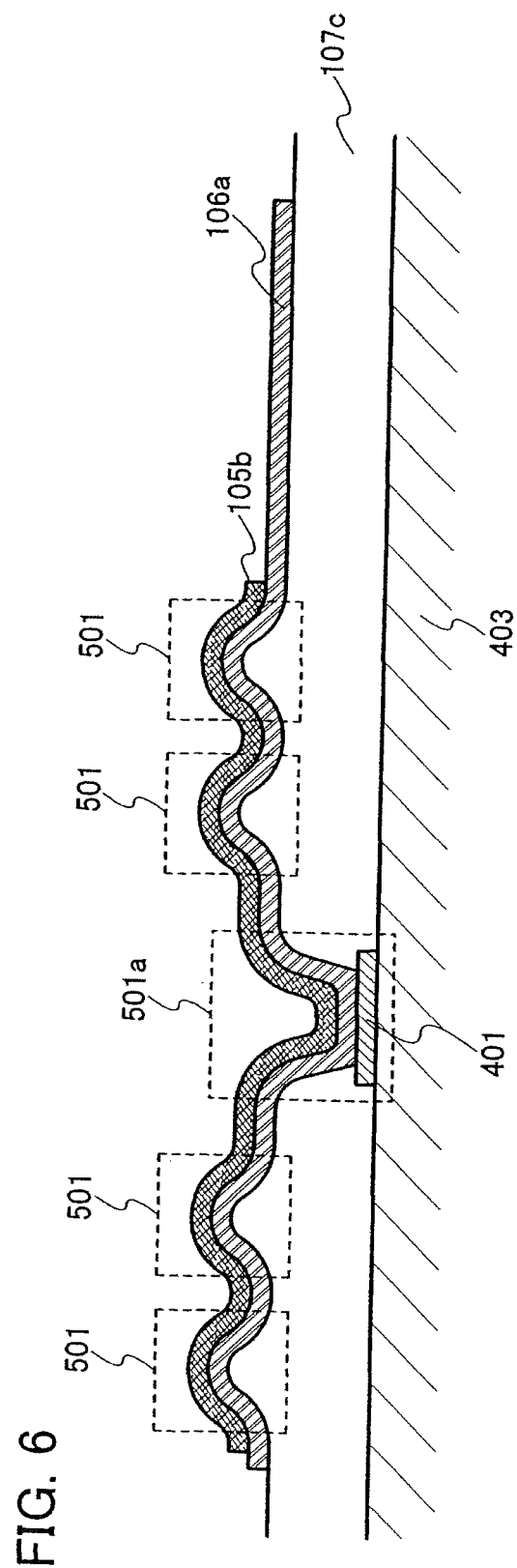

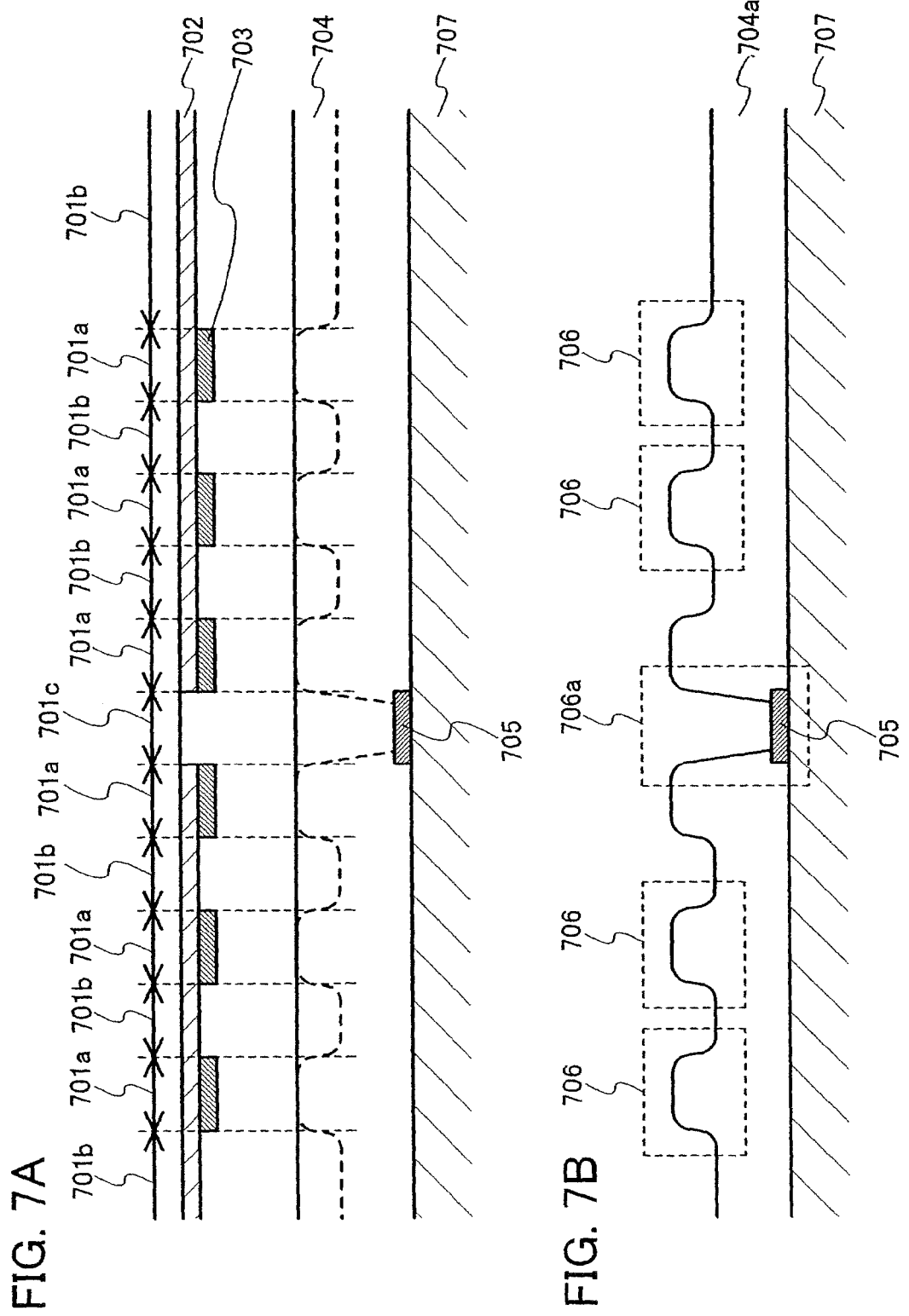

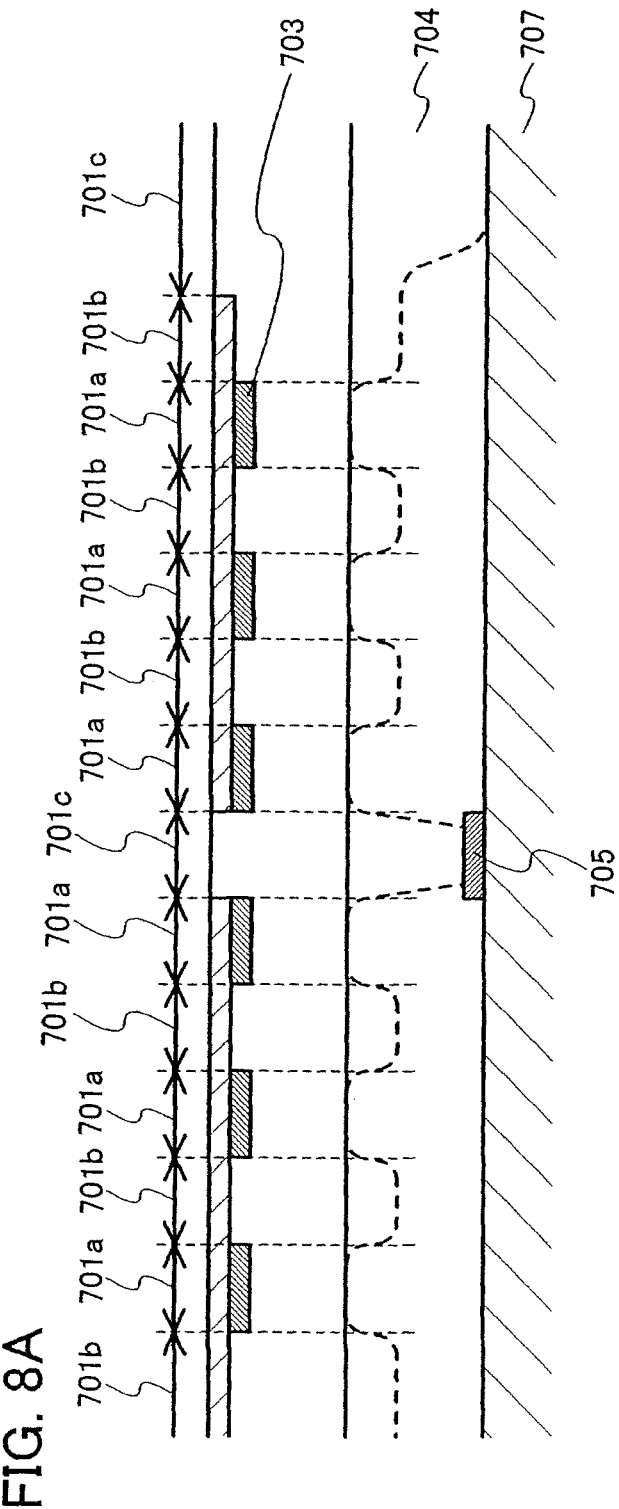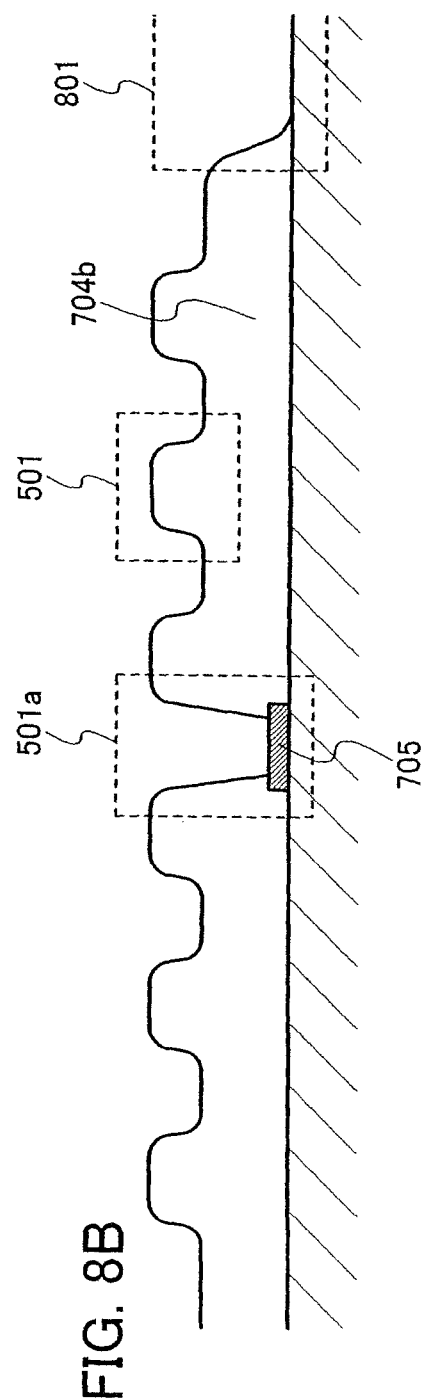

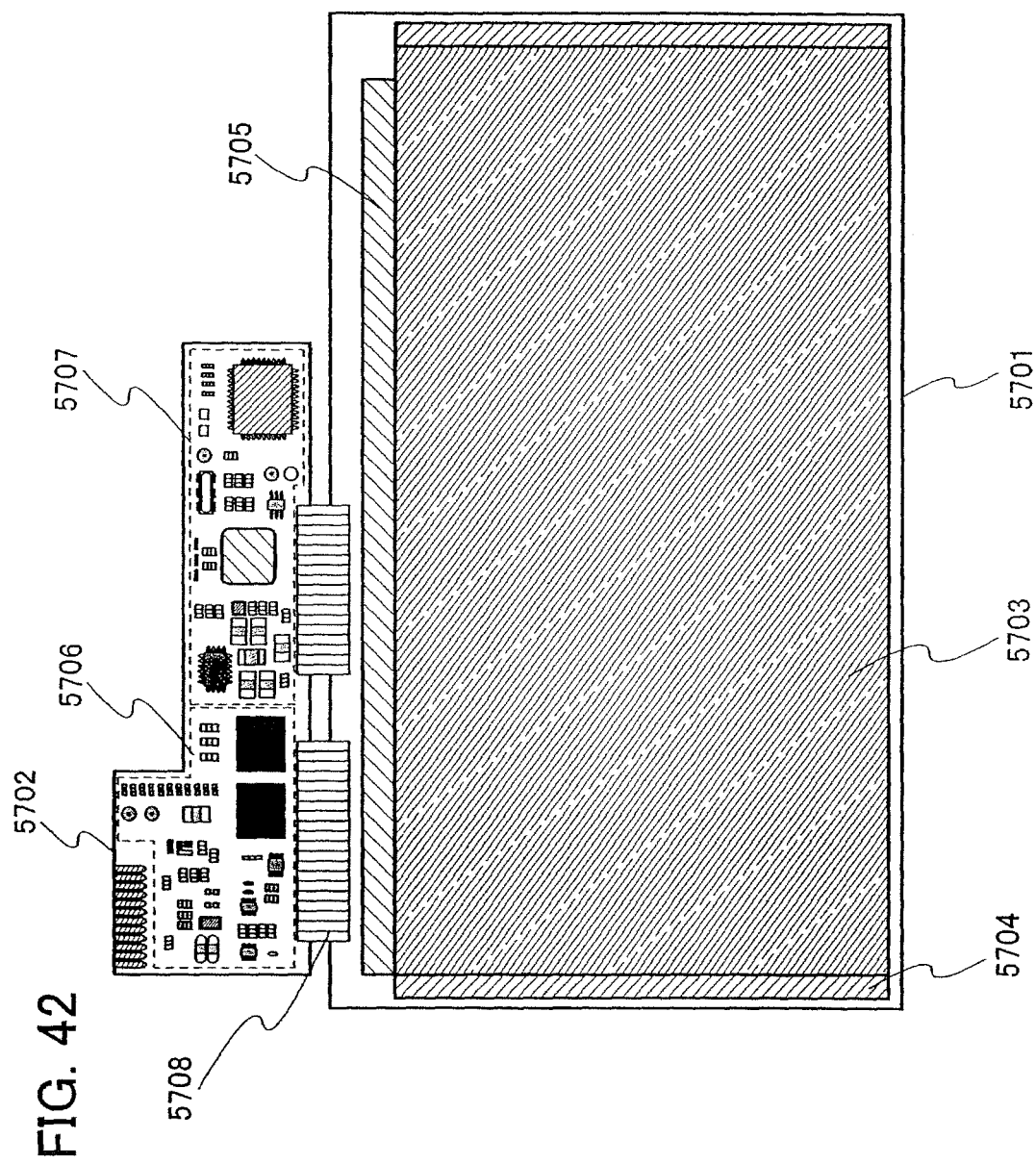

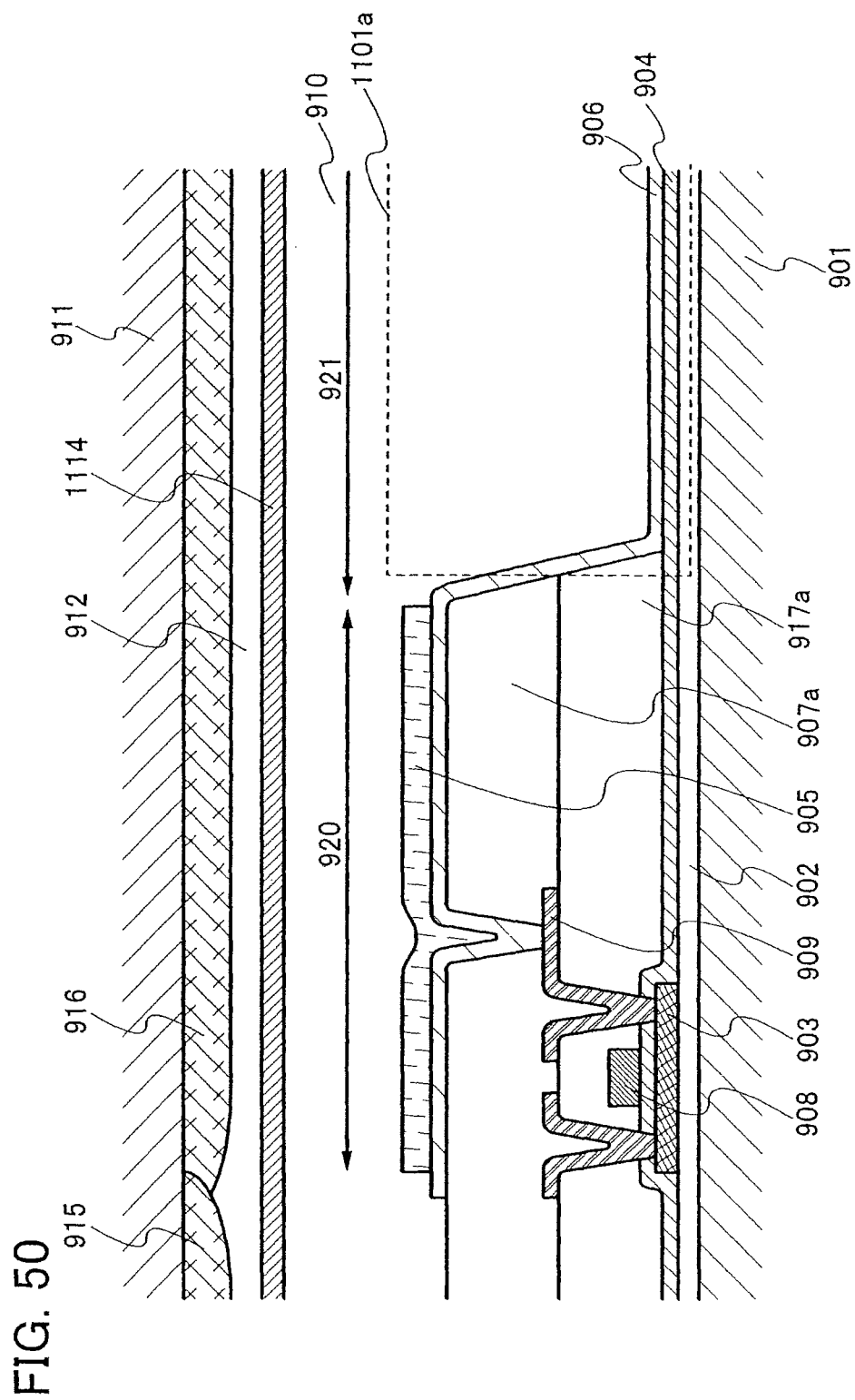

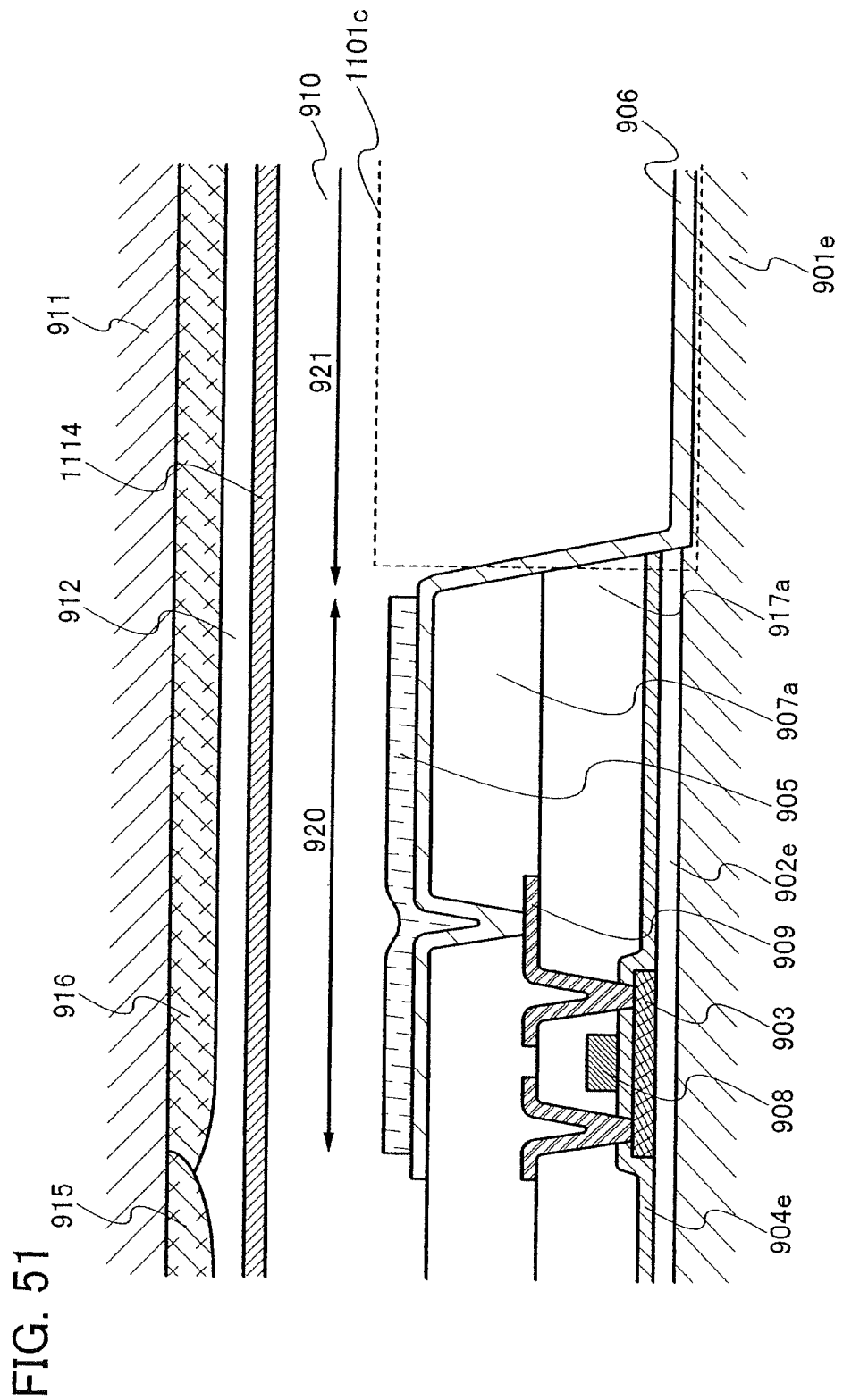

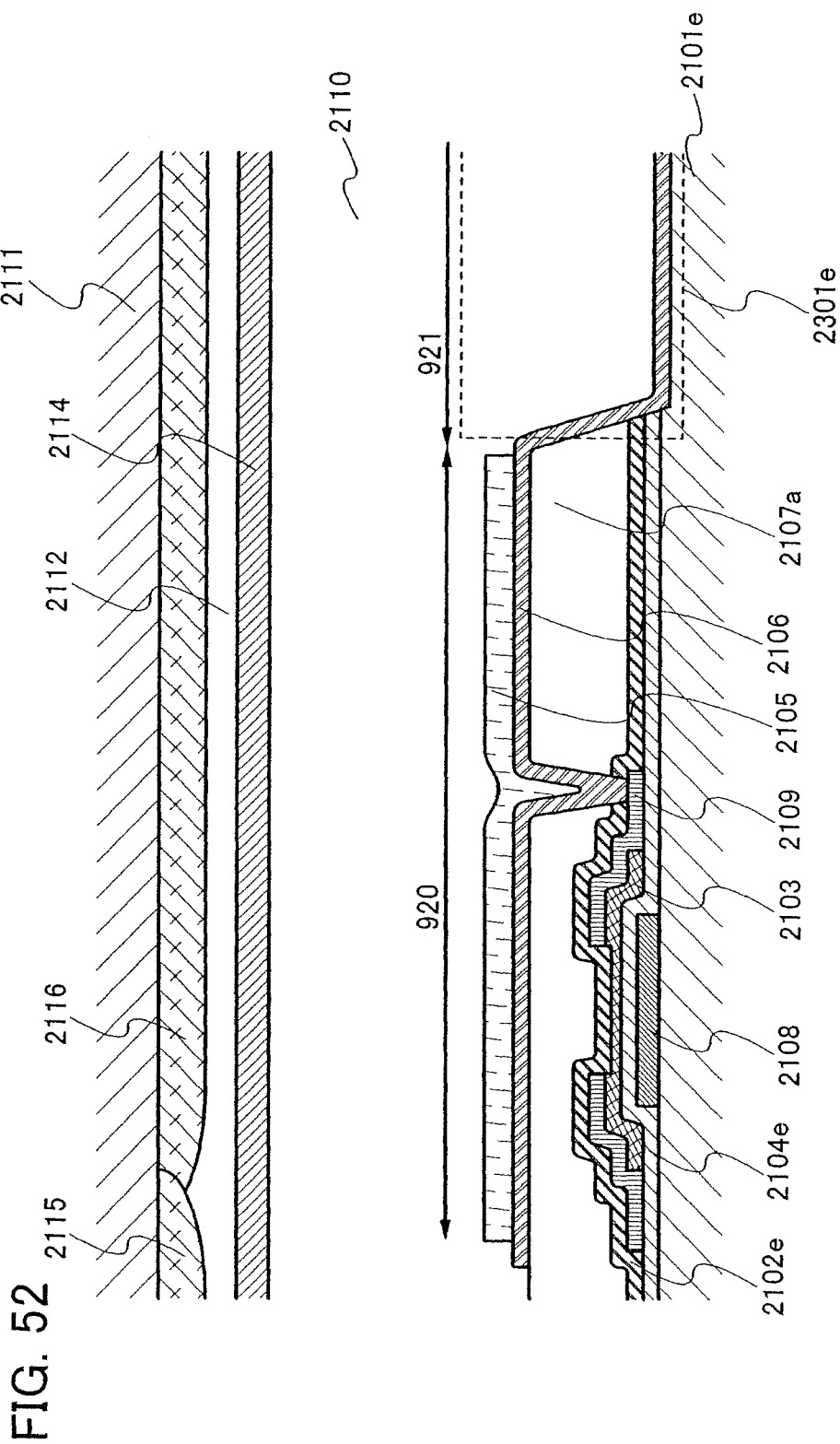

DISPLAY DEVICE AND MANUFACTURING METHOD THEREOF

CROSS-REFERENCE TO RELATED APPLICATIONS

This application is a continuation of U.S. application Ser. No. 14/153,163, filed Jan. 13, 2014, now pending, which is a continuation of U.S. application Ser. No. 12/730,566, filed Mar. 24, 2010, now U.S. Pat. No. 8,634,044, which is a continuation of U.S. application Ser. No. 11/614,809, filed Dec. 21, 2006, now U.S. Pat. No. 7,821,613, which claims the benefit of a foreign priority application filed in Japan as Serial No. 2005-378778 on Dec. 28, 2005, all of which are incorporated by reference.

BACKGROUND OF THE INVENTION

1. Field of the Invention

The present invention relates to a semiconductor device including a pixel electrode, and particularly to a display device. More particularly, the present invention relates to a semi-transmission type liquid crystal display device including a reflection region and a transmission region.

2. Description of the Related Art

A display device is divided into a self-light emitting display device and a non-light emitting display device. A liquid crystal display device is the most typical non-light emitting display device. In general, a liquid crystal display device performs a display by being irradiated with light from a backlight because it does not emit light.

In a transmission type liquid crystal display device which uses light from a backlight, although a display image is easy to see in a normal room, there is a problem that a display image is difficult to see under sunlight. Particularly electronic apparatuses which are frequently utilized outdoors such as a camera, a portable information terminal, and a mobile phone are greatly affected by this problem.

A semi-transmission type liquid crystal display device has been developed in order to display a favorable image both indoors and outdoors. A semi-transmission type liquid crystal display device includes a reflection region and a transmission region in one pixel. The transmission region includes a transparent electrode and transmits light so as to function as a transmission type liquid crystal display device. On the other hand, the reflection region includes a reflective electrode and reflects light so as to function as a reflection type liquid crystal display device. In this manner, a clear image can be displayed both indoors and outdoors.

As such a liquid crystal display device, there are a passive matrix type and an active matrix type. Generally, when manufacturing an active matrix type display device, a wiring which is connected to a semiconductor layer of a thin film transistor (TFT) is formed and a conductive film functioning as a pixel electrode is formed over the wiring.

As a pixel electrode, there are a reflective electrode in a reflection region and a transparent electrode in a transmission region. Each electrode has a different shape. Therefore, a resist mask for forming a reflective electrode and a resist mask for forming a transparent electrode have been required (for example, refer to Patent Documents 1 to 5).
[Patent Document 1]
  Japanese Published Patent Application No. 2002-229016
[Patent Document 2]
  Japanese Published Patent Application No. 2004-46223
[Patent Document 3]
  Japanese Published Patent Application No. 2005-338829
[Patent Document 4]
  Japanese Published Patent Application No. 2004-334205
[Patent Document 5]
  Japanese Published Patent Application No. 2004-109797

SUMMARY OF THE INVENTION

In a conventional semi-transmission type liquid crystal display device, a resist mask is required for each layer when forming a reflective electrode and a transparent electrode. That is, a resist mask for forming a reflective electrode and a resist mask for etching a transparent electrode and a stacked film are required, and the number of manufacturing steps is increased for that. Therefore, manufacturing cost of a semiconductor device such as a display device is high and manufacturing time for forming an electrode pattern is necessarily long.

Therefore, one of the objects of the invention is to reduce the number of resist masks to be used and reduce manufacturing steps.

One feature of the invention is to provide a display device including a transistor, a transparent electrode which is electrically connected to the transistor, a reflective electrode which is electrically connected to the transparent electrode, and a storage capacitor which is electrically connected to the transistor. At least a part of the storage capacitor is formed below the reflective electrode. An entire under surface of the reflective electrode is in contact with a top surface of the transparent electrode.

Another feature of the invention is to provide a display device including a transistor, a transparent electrode which is electrically connected to the transistor, and a reflective electrode which is electrically connected to the transparent electrode. At least one of the transparent electrode and the reflective electrode has a slit. An entire under surface of the reflective electrode is in contact with a top surface of the transparent electrode.

Another feature of the invention is to provide a display device including a transistor, a transparent electrode which is electrically connected to the transistor, a reflective electrode which is electrically connected to the transparent electrode, and a storage capacitor which is electrically connected to the transistor. At least one of the transparent electrode and the reflective electrode has a slit. At least a part of the storage capacitor is formed below the reflective electrode. An entire under surface of the reflective electrode is in contact with a top surface of the transparent electrode.

Another feature of the invention is to provide a display device including a transistor, a transparent electrode which is electrically connected to the transistor, a reflective electrode which is electrically connected to the transparent electrode, and a storage capacitor which is electrically connected to the transistor. At least a part of the storage capacitor is formed below the reflective electrode. At least a part of the transistor is formed below the reflective electrode. An entire under surface of the reflective electrode is in contact with a top surface of the transparent electrode.

Another feature of the invention is to provide a display device including a transistor and a pixel electrode which is electrically connected to the transistor. The pixel electrode includes a transparent electrode and a reflective electrode. An entire under surface of the reflective electrode is in contact with a top surface of the transparent electrode. A film thickness of the transparent electrode in a region in contact with the reflective electrode is thicker than a film thickness of the transparent electrode in a region not in contact with the reflective electrode.

In the invention, in the aforementioned structure, the display device is provided with a liquid crystal layer between the reflective electrode and an opposite electrode.

Another feature of the invention is to provide a manufacturing method for a display device. A transistor is formed over a substrate. An insulating film is formed over the transistor. A transparent conductive film is formed over the insulating film. A reflective conductive film is formed over the transparent conductive film. A resist pattern which includes a region having a thick film thickness and a region having a thinner film thickness than the aforementioned region is formed over the reflective conductive film by using a light exposure mask including a semi-transmission portion. A transparent electrode formed of the transparent conductive film and a reflective electrode formed of the reflective conductive film are formed by using the resist pattern.

Another feature of the invention is to provide a manufacturing method of a display device. A transistor is formed over a substrate. An insulating film is formed over the transistor. A transparent conductive film is formed over the insulating film. A reflective conductive film is formed over the transparent conductive film. A resist pattern which includes a region having a thick film thickness and a region having a thinner film thickness than the aforementioned region is formed over the reflective conductive film by using a light exposure mask including a semi-transmission portion. The reflective conductive film and the transparent conductive film are etched by using the resist pattern. A part of the resist pattern is removed. The reflective conductive film is etched by using the resist pattern a part of which is removed.

As described above, a transparent electrode and a reflective electrode which is in contact with a part of the transparent electrode can be formed by using one resist pattern. Since two patterns of the transparent electrode and the reflective electrode can be formed by using one resist pattern, manufacturing steps can be reduced and the display device with low cost can be realized.

Note that in the invention, various kinds of transistors can be applied and are not limited to a specific transistor. A thin film transistor (TFT) using a non-monocrystalline semiconductor film typified by amorphous silicon or polycrystalline silicon, a transistor formed using a semiconductor substrate or an SOI substrate, a MOS transistor, a junction type transistor, a bipolar transistor, a transistor using a compound semiconductor such as ZnO or a-InGaZnO, a transistor using an organic semiconductor or a carbon nanotube, or other transistors can be used. In addition, the kind of a substrate over which a transistor is provided is not limited, and a monocrystalline substrate, an SOI substrate, a glass substrate, a plastic substrate, or the like can be employed.

Note that a structure of a transistor is not limited to a specific structure. For example, a multi-gate structure where the number of gates is two or more may be employed. Gate electrodes may be provided over and under a channel. A gate electrode may be provided over or under the channel. A forward staggered structure or an inverted staggered structure may be employed. A channel region may be divided into a plurality of regions, or connected in parallel or in series. A source electrode or a drain electrode may overlap with a channel (or a part thereof). An LDD region (low concentration impurity region) may be provided.

Note that in the invention, being connected is synonymous with being electrically connected. Therefore, in addition to a predetermined relation of connection, another element which enables an electrical connection (for example, a switch, a transistor, a capacitor, a resistor element, a diode, or the like) may be provided in a structure disclosed in the invention.

Note that a switch shown in the invention is not limited to a specific switch. An electrical switch or a mechanical switch can be applied. Any element which can control a flow of current can be employed. A transistor, a diode (a PN diode, a PIN diode, a Schottky diode, a diode-connected transistor, or the like), or a logic circuit combined therewith may be employed. When a transistor is used as a switch, a polarity (conductivity type) thereof is not specifically limited since the transistor is operated as a mere switch. However, in the case where OFF current is preferably small, a transistor having a polarity with smaller OFF current is preferably used. As a transistor with small OFF current, a transistor provided with an LDD region, a transistor with a multi-gate structure, or the like may be used. In addition, an n-channel transistor is preferably used when operating in a state where a potential of a source terminal of the transistor, which operates as a switch, is close to a low potential side power source (Vss, GND, 0 V, or the like), whereas a p-channel transistor is preferably used when operating in a state where a potential of a source terminal of the transistor is close to a high potential side power source (Vdd or the like). This is because the transistor can easily function as a switch since an absolute value of a gate-source voltage thereof can be made to be large. Note that a CMOS type switch may also be applied by using both n-channel and p-channel transistors.

Note that an element provided in a pixel is not limited to a specific display element. A display element provided in a pixel is, for example, a display medium in which contrast is changed by an electromagnetic effect, such as an EL element (an organic EL element, an inorganic EL element, or an EL element containing an organic compound and an inorganic compound), an electron emitting element, a liquid crystal element, electronic ink, a grating light valve (GLV), a plasma display (PDP), a digital micromirror device (DMD), a piezoelectric ceramic display, or a carbon nanotube. Note that a display device using an EL element includes an EL display; a display device using an electron emitting element includes a field emission display (FED), an SED type flat panel display (Surface-conduction Electron-emitter Display), and the like; a display device using a liquid crystal element includes a liquid crystal display; and a display device using electronic ink includes electronic paper.

Note that in the invention, one pixel corresponds to one color element. Therefore, in the case of a full-color display device formed of color elements of R (red), G (green), and B (blue), the smallest unit of an image is formed of three pixels of an R pixel, a G pixel, and a B pixel. Note that the number of color elements is not limited to three colors, and color elements may be formed of more than three colors such as RGBW (W is white). Note that in the case where a pixel is referred to as one pixel (three colors), three pixels of RGB is considered as one pixel.

Note that in the invention, the case where pixels are arranged in matrix corresponds to the case where dots of the three color elements are arranged in a so-called delta pattern in the case of performing a full color display with three color elements (for example, RGB), as well as the case where pixels are arranged in a so-called stripe pattern. Note that a color element is not limited to three colors and may be more than three colors such as RGBW. Further, a region of each dot of a color element may have a different size.

Note that a transistor is an element having at least three terminals including a gate electrode, a drain region (or a drain electrode), and a source region (or a source electrode) and includes a channel forming region between the drain region and the source region. Here, it is difficult to precisely define the source region and the drain region since they depend on a structure, operating conditions, and the like of the transistor. Therefore, in this specification, a region which functions as a source region or a drain region is referred to as a first terminal or a second terminal.

Note that in the invention, a semiconductor device corresponds to a device having a circuit which includes a semiconductor element (a transistor, a diode, or the like). Further, a semiconductor device may be a general device which can be operated by using semiconductor characteristics. A display device may be a main body of a display panel in which a plurality of pixels including a display element such as a liquid crystal element or an EL element and a peripheral driver circuit for driving the pixels are formed over a substrate, and may also be a main body of a display panel provided with a flexible printed circuit (FPC) or a printed wiring board (PWB). A light emitting device is a display device using particularly a self-light emitting display element used for an EL element, an electron emitting element, or the like.

According to the present invention, manufacturing steps can be reduced with respect to conventional art and manufacturing cost of a semiconductor device and a display device can be lowered.

BRIEF DESCRIPTION OF DRAWINGS

FIGS. 3A and 3B are cross sectional views showing a manufacturing step of a semiconductor device of the invention.

FIG. 5 is a cross sectional view showing a semiconductor device of the invention.

FIG. 6 is a cross sectional view showing a semiconductor device of the invention.

FIGS. 7A and 7B are cross sectional views showing a manufacturing step of a semiconductor device of the invention.

FIGS. 8A and 8B are cross sectional views showing a manufacturing step of a semiconductor device of the invention.

FIG. 42 is a view showing a semiconductor device of the invention.

FIG. 50 is a cross sectional view showing a semiconductor device of the invention.

FIG. 51 is a cross sectional view showing a semiconductor device of the invention.

FIG. 52 is a cross sectional view showing a semiconductor device of the invention.

DETAILED DESCRIPTION OF THE INVENTION

Figure 1A:
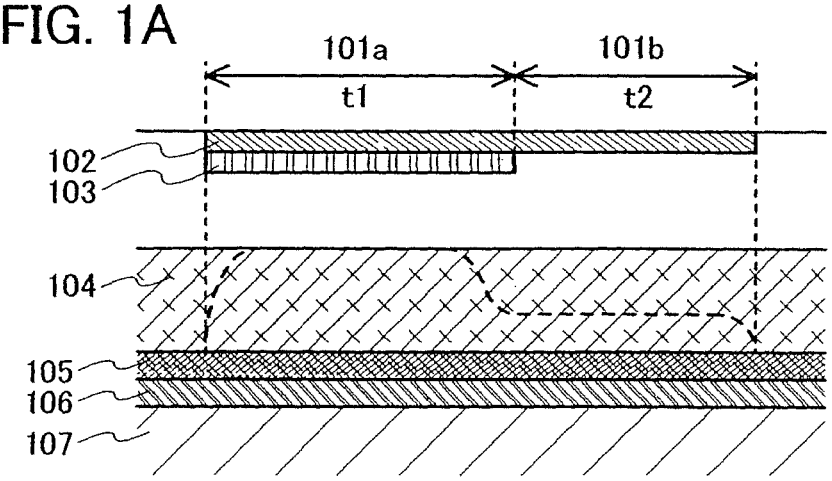
FIGS. 1A to 1C are cross sectional views showing a manufacturing step of a semiconductor device of the invention.

Hereinafter, embodiment modes of the invention are described. Note that the present invention can be implemented in various embodiments within the range of enablement and it is easily understood by those who are skilled in the art that modes and details herein disclosed can be modified in various ways without departing from the purpose and the scope of the invention. Therefore, it should be noted that description of embodiment modes is not be interpreted as limiting the invention. Further, any of the embodiment modes to be given below can be combined as appropriate.

Embodiment Mode 1

Description is made of a manufacturing method for forming a reflective electrode and a transparent electrode with reference to FIGS. 1A to 1C and 2A to 2C.

First, a conductive film 106 is formed over an insulating film 107 by a sputtering method, a printing method, a CVD method, an ink-jet method, or the like. The conductive film 106 may be a transparent conductive film or have a reflecting property. In the case of a transparent conductive film, an indium tin oxide (ITO) film in which tin oxide is mixed in indium oxide, an indium tin silicon oxide (ITSO) film in which silicon oxide is mixed in indium tin oxide (ITO), an indium zinc oxide (IZO) film in which zinc oxide is mixed in indium oxide, a zinc oxide film, a tin oxide film, silicon (Si) containing phosphorus or boron can be used, for example. Note that IZO is a transparent conductive material formed by sputtering using a target in which 2 to 20 wt % of zinc oxide (ZnO) is mixed in ITO; however, a composition ratio and the like are not limited to this.

The conductive film 106 is formed over the insulating film 107, and a conductive film 105 is formed over the conductive film 106. The conductive film 106 and the conductive film 105 can be formed continuously by sputtering, which can reduce the number of steps.

The conductive film 105 is preferably formed from a material with low resistance or a material with high reflectivity. For example, Ti, Mo, Ta, Cr, W, Al, Nd, Cu, Ag, Au, Pt, Nb, Si, Zn, Fe, Ba, Ge, or the like, or an alloy thereof can be used. A two-layer structure where the aforementioned materials are stacked may be employed. In this case, a stacked layer structure including two layers which uses a metal such as Ti, Mo, Ta, Cr, or W, and Al (or an alloy including Al as a main component) may be employed. A stacked layer structure of three layers may alternatively be employed. In this case, a three-layer structure where Al (or an alloy including Al as a main component) is sandwiched between metals such as Ti, Mo, Ta, Cr, and W may be employed. As described above, by arranging a metal such as Ti, Mo, Ta, Cr, or W adjacent to Al (or an alloy including Al as a main component), a defect can be decreased when another electrode or another wiring is connected. For example, if an ITO film or the like is connected to Al (or an alloy including Al as a main component), a defect such as electric erosion might happen. Further, if a Si film or the like is in contact with Al (or an alloy including Al as a main component), Al and the Si film might be reacted with each other. These problems can be reduced by a multilayer structure.

Note that when an ITO film is used as a conductive film, a step in which the ITO film is crystallized by heat treatment is required. In this case, it is preferable that the ITO film be formed by sputtering, and after baking, the conductive film 105 be formed. The number of steps can be reduced when an ITSO film is used since a step of crystallization is not required.

After a resist film 104 is formed (applied) over an entire surface of the conductive film 105, light exposure is performed using a light exposure mask shown in FIG. 1A.

In FIG. 1A, a light exposure mask includes a light shielding portion 101a in which exposure light is shielded and a semi-transmission portion 101b in which exposure light partially passes. The semi-transmission portion 101b is provided with a semi-transmission film 102 in which intensity of exposure light is reduced. The light shielding portion 101a is formed to superimpose a metal film 103 over the semi-transmission film 102. A width of the light shielding portion 101a is referred to as t1, and a width of the semi-transmission portion 101b is referred to as t2. Here, although an example where the semi-transmission film is used in the semi-transmission portion, the invention is not limited to this. Any semi-transmission portion is acceptable as long as it can reduce intensity of exposure light. In addition, a diffraction grating pattern may be used for the semi-transmission portion.

That is, a half-tone mask or a gray-tone mask may used for the semi-transmission portion.

When the resist film is exposed to light using the light exposure mask shown in FIG. 1A, a light-unexposed region and a light-exposed region are formed. When light exposure is performed, light is passed around the light shielding portion 101a or passes through the semi-transmission portion 101b; therefore, the exposure region is formed.

Figure 1B:
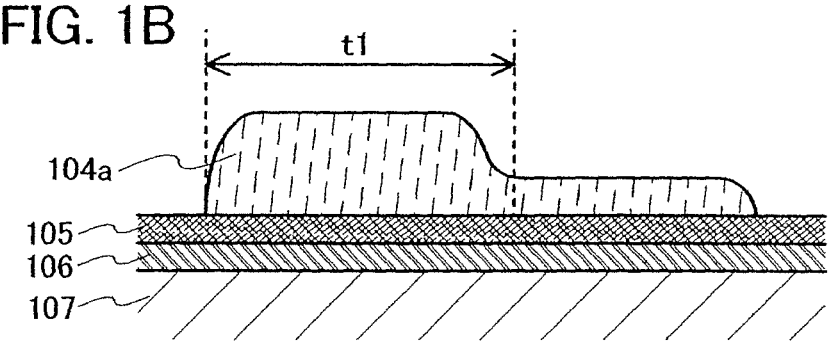

When development is performed, the exposure region is removed, and a resist pattern 104a having two main film thicknesses can be obtained over the conductive film 105 as shown in FIG. 1B. The resist pattern 104a includes a region having a thick film thickness and a region having a film thickness thinner than the aforementioned region. The film thickness of the region having a thin film thickness can be adjusted by adjusting light exposure energy or transmittance of the semi-transmission film 102.

Next, the conductive film 105 and the conductive film 106 are etched by dry etching. Dry etching is performed by a dry etching apparatus using a high density plasma source such as ECR (Electron Cyclotron Resonance) or ICP (Inductively Coupled Plasma).

Figure 1C:
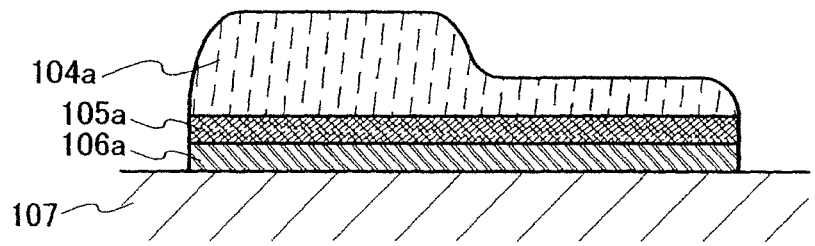

Therefore, a conductive film 105a and a conductive film 106a are formed as shown in FIG. 1C.

Here, although an example of using an ICP etching apparatus is shown, the invention is not limited to this, and for example, a parallel plate type etching apparatus, a magnetron etching apparatus, an ECR etching apparatus, or a helicon-type etching apparatus may also be employed.

Note that the conductive film 105 and the conductive film 106 may be etched by wet etching. However, dry etching is suitable for microfabrication; therefore, dry etching is preferable. A material for the conductive film 105 and the conductive film 106 is greatly different from a material for the insulating film 107; therefore, high etching selectivity of the insulating film 107 with respect to the conductive film 105 and the conductive film 106 can be obtained even if dry etching is performed. At least a top layer of the insulating film 107 may be formed of a silicon nitride film in order to make etching selectivity thereof further high.

In this manner, a pattern formed by stacking the conductive film 106a and the conductive film 105a is formed over the insulating film 107 as shown in FIG. 1C.

Figure 2A:
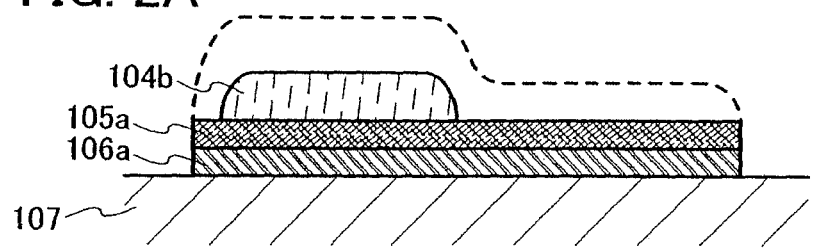
FIGS. 2A to 2C are cross sectional views showing a manufacturing step of a semiconductor device of the invention.
Figure 2B:
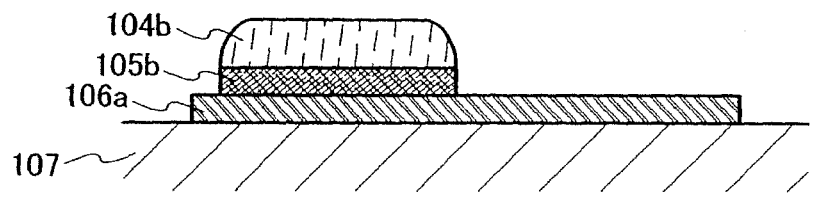

Next, (a part of) the resist pattern 104a is ashed or etched (FIG. 2A). In accordance with this step, the region having a thin film thickness in the resist pattern 104a is etched and a film thickness of the whole resist pattern 104a is decreased by a film thickness of the region having a thin film thickness. Then, a resist pattern 104b is formed. The resist pattern 104a is etched in a width direction as well as a film thickness direction; therefore, a width of the resist pattern 104b is narrower than widths of the conductive films 105a and 106a. Therefore, a side surface of the resist pattern 104b is not aligned with a side surface of the conductive film in a lower layer, and the side surface of the resist pattern 104b is recessed. In FIG. 2B, the resist pattern 104b is left-right asymmetric.

Next, the conductive film 105a is etched using the resist pattern 104b so as to form a conductive film 105b (FIG. 2B). A material of the conductive film 105a preferably has high etching selectivity with respect to the conductive film 106a in order that the conductive film 106a is not unnecessarily etched simultaneously at this time. For example, Ti, Mo, Cr, Al, Nd, or the like or an alloy thereof is preferably used for the conductive film 105a, and a stacked layer structure of the aforementioned materials may be employed. Then, the conductive film 105b of which pattern is smaller than the conductive film 106a is formed.

Although etching for forming the conductive film 105b shown in FIGS. 2A and 2B may be performed by either dry etching or wet etching, FIGS. 2A and 2B show the case of dry etching. A side surface of the conductive film 105b is formed so as to be generally aligned with the side surface of the resist pattern 104b. One side surface of the conductive film 105b is on the same plane as one side surface of the resist pattern 104b, and the other side surface thereof corresponds to the other side surface of the resist pattern 104b.

Microfabrication can be realized by performing dry etching. However, the conductive film 106a is also partially etched when the conductive film 105b is formed.

On the other hand, when the conductive film 105b is formed by wet etching, etching proceeds isotropically, and the conductive film 105b smaller than the resist pattern 104b is formed. The side surface of the resist pattern 104b and the side surface of the conductive film 105b do not correspond to each other. Therefore, even if the same resist pattern 104b is used as a mask, the conductive film 105b is formed smaller by wet etching than in the case of by dry etching.

Sufficiently high etching selectivity can be obtained by performing wet etching.

When the conductive film 106a is formed by dry etching, a side surface thereof has an angle $\theta_1$, which is almost perpendicular or close to 90° with respect to a substrate surface. On the other hand, when the conductive film 105b is formed by wet etching, the side surface thereof has an acute angle $\theta_2$ with respect to the substrate surface because of isotropic etching. Therefore, $\theta_1 > \theta_2$ is satisfied when the angle $\theta_1$ of the side surface of the conductive film 106a and the angle $\theta_2$ of the side surface of the conductive film 105b are compared with each other. Note that the angle $\theta_1$ is an inclined angle of the conductive film 106a with respect to a surface of a substrate (or the insulating film 107), and the angle $\theta_2$ is an inclined angle of the side surface of the conductive film 105b with respect to the surface of the substrate (or the insulating film 107). Each of the angles $\theta_1$ and $\theta_2$ is in a range of 0 to 90°.

In the case where the conductive film 105b and the conductive film 106a have a stacked layer structure, an etching rate is different in each layer in some cases. Accordingly, the angles formed by the side surfaces of the layers with respect to the substrate surface are different from each other in some cases. Therefore, in that case, an angle formed by the side surface of a film in a lowest layer with respect to the substrate surface is denoted by $\theta_2$.

Note that the side surfaces of the conductive film 105b and the conductive film 106a are not smooth but uneven in some cases. In this case, the angle $\theta_1$ and the angle $\theta_2$ can be determined as appropriate. For example, the angle $\theta_1$ and the angle $\theta_2$ can be determined using a rough straight line or curved line drawn with respect to uneven side surfaces. Further, a plurality of angles $\theta_1$ and angles $\theta_2$ can be calculated based on uneven side surfaces, and average values thereof can be taken as the angle $\theta_1$ and the angle $\theta_2$. The most rational method may be employed.

As described above, the conductive film 105b is formed by either a dry etching method or a wet etching method. The conductive film 105b which includes the side surface recessed with respect to the side surface of the conductive film 106a can be formed by either one of the etching methods. One of factors is that the size of the resist pattern 104a, which is a mask for forming the conductive film 106a, and the size of the resist pattern 104b, which is a mask for forming the conductive film 105b, are different from each other, and the resist pattern 104b is smaller than the resist pattern 104a.

Figure 2C:
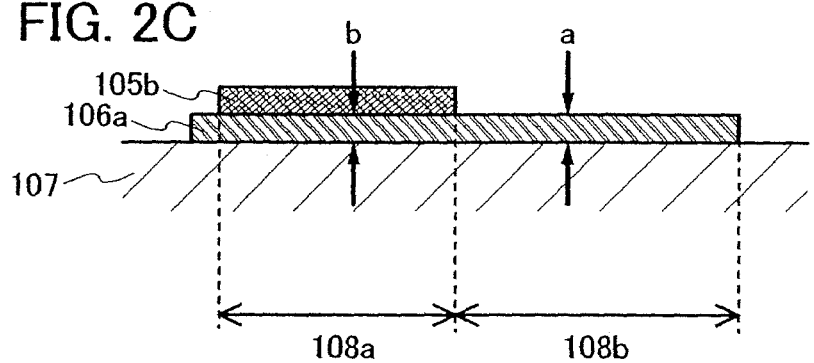

Subsequently, the resist pattern 104b is removed (FIG. 2C). Accordingly, an electrode formed of the conductive film 105b and the conductive film 106a is formed. The conductive film 106a and the conductive film 105b function as a pixel electrode. However, the invention is not limited to this.

More preferably, the conductive film 105b is formed of a reflective conductive film so as to function as a reflective electrode and the conductive film 106a is formed of a transparent conductive film so as to function as a transparent electrode. In addition, the conductive film 106a is required to be provided below the conductive film 105b, and an entire under surface of the conductive film 105b is in contact with a top surface of the conductive film 106a.

A reflection portion 108a is provided with a reflective electrode, and a transmission portion 108b is provided with a transparent electrode. Therefore, a reflective electrode and a transparent electrode can be manufactured with a small number of steps, and a semi-transmission type display device can be easily manufactured. Microfabrication is not required for a reflective electrode and a transparent electrode. Accordingly, there is no big problem if a reflective electrode and a transparent electrode are slightly misaligned with each other. For example, if a reflective electrode is slightly smaller and the transparent electrode is slightly larger, display is not greatly affected. Therefore, manufacturing yield is unlikely to be reduced even when such a manufacturing method is performed, and beneficial effects on cost reduction, reduction in the number of manufacturing days, or the like can be obtained.

In the case where a stacked layer of the conductive film 105b and the conductive film 106a is formed using the resist pattern 104a of the invention, which includes regions having different film thicknesses, when the conductive film 105b is formed, that is, when etching is performed using the resist pattern 104b as a mask, a part of a surface of the conductive film 106a is etched to some extent. In particular, when the conductive film 105b is formed by dry etching, selectivity between the conductive film 105b and the conductive film 106a in the lower layer is difficult to obtain; therefore, a part of the surface of the conductive film 106a is easily etched. Thus, when a film thickness a of the conductive film 106a (a film thickness of the conductive film 106a in a portion where a top surface thereof is in contact with the conductive film 105b) and a film thickness b (a film thickness of the conductive film 106a in a portion where a top surface thereof is not in contact with the conductive film 105b) are compared with each other in FIG. 2C, the film thickness a<the film thickness b is satisfied. Note that the film thickness a refers to an average film thickness of the conductive film 106a in a portion which is not overlapped with the conductive film 105b, and the film thickness b refers to an average film thickness of the conductive film 106a in a portion which is overlapped with the conductive film 105b.

The side surface of the conductive film 105b formed in this embodiment mode is inclined in some cases. Therefore, in the case where the conductive film is used for a liquid crystal display device, rubbing can be smoothly performed to the side surface of the conductive film 105b when rubbing is performed from the inclined surface side of the conductive film 105b. When rubbing is performed from a direction where the side surface of the conductive film 105b is perpendicular, rubbing is incomplete because of stress on a rubbing cloth in a perpendicular side surface portion, and orientation is incomplete in some cases. Therefore, rubbing is preferably performed from a side where the side surface of the conductive film 105b is inclined.

In addition, in the case where the conductive film 105b of which both side surfaces are inclined is formed by wet etching, rubbing can be smoothly performed from both directions, which is more effective.

Note that as shown in FIGS. 1A and 1B, a resist, of which part irradiated with light is dissolved, is referred to as a positive type resist. However, it is not limited to a positive type resist, and a negative type resist may be used. A negative type resist is a resist, of which part not irradiated with light is dissolved.

FIGS. 3A and 3B show views in the case of using a negative type resist. FIG. 1A corresponds to FIG. 3A, and FIG. 1B corresponds to FIG. 3B. Other than that, there are few differences between positive type and negative type. As shown in FIG. 3A, a transparent portion 101c is provided above a part of a resist 304 which is expected to be left. The light shielding portion 101a is provided above a part of the resist 304 which is expected to be removed. The semi-transmission portion 101b is provided above a part of the resist 304, a small portion of which is expected to be left. As a result, as shown in FIG. 3B, a resist 304a is formed.

Description is made with reference to various drawings in this embodiment mode. One drawing consists of various components. Therefore, another structure can be made by combining each of the components from each drawing.

Embodiment Mode 2

In Embodiment Mode 1, description is made of the case where a pixel electrode is formed over the insulating film 107. However, actually a pixel electrode is connected to another wiring, transistor, storage capacitor, or the like. Therefore, if required, the insulating film 107 is provided with a contact hole so that the pixel electrode is connected to a wiring or the like.

Figure 4:
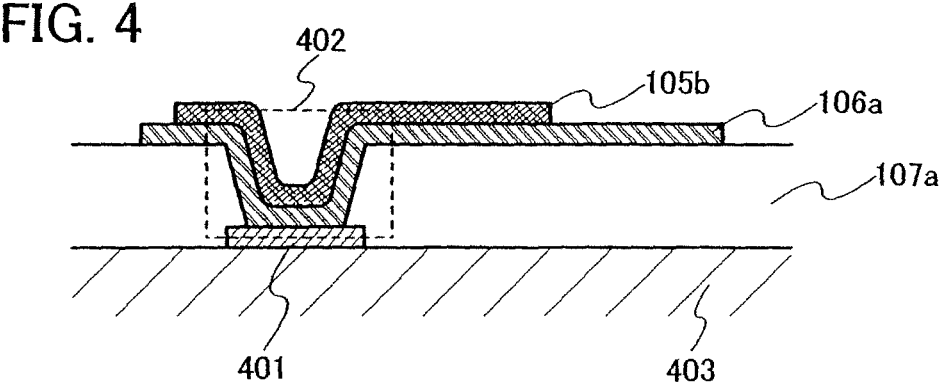
FIG. 4 is a cross sectional view showing a semiconductor device of the invention.

Thus, FIG. 4 shows a cross sectional view of that case. An insulating film 107a is provided with a contact hole 402. A wiring 401 is formed below the contact hole 402. The wiring 401 is connected to one of a source or a drain of a transistor in many cases. Alternatively, in many cases, the wiring 401 itself is one of the source or the drain of the transistor, or an electrode of a storage capacitor.

In this case, the conductive film 106a is required to be formed below the conductive film 105b since the manufacturing method described in Embodiment Mode 1 is used. Therefore, the conductive film 105b is also formed over the conductive film 106a which is formed so as to cover the contact hole 402.

A transistor, a wiring, and a storage capacitor are formed below the conductive film 105b. In the case where the conductive film 105b is a reflective electrode and the conductive film 106a is a transparent electrode, a transmission region is preferably made as large as possible since it is where light is transmitted in order to perform display. On the other hand, in a reflection region, display is not affected even when some element is provided below the reflective electrode. Therefore, a transistor, a wiring, and a storage capacitor are formed below the conductive film 105b, so that a layout can be efficiently designed.

Note that although the whole area of the transistor and the storage capacitor is preferably formed below the reflective electrode, the invention is not limited to this. A part of the transistor and the storage capacitor may be formed on the outside of the reflective electrode (the outside of the reflection region).

Next, description is made of unevenness of the reflective electrode. The reflective electrode is provided to reflect external light in order to perform display. External light is preferably diffusely reflected by the reflective electrode in order to utilize external light entering the reflective electrode efficiently and improve display luminance.

Here, as shown in FIG. 5, an insulating film 107b may be provided with unevenness 501, so that the reflective electrode can be made uneven. Note that the insulating film 107b may have a stacked layer structure. Further, as shown in FIG. 6, a contact hole 501a may be used for forming unevenness. In this case, the contact hole 501a functions to connect the wiring 401 and the conductive film 106a as well.

Next, an example of a forming method of unevenness of the insulating film and the reflective electrode is shown. In FIGS. 1A to 1C and 3A and 3B, description is made of a method for forming the resist by using the light exposure mask including the light shielding portion 101a in which exposure light is shielded and the semi-transmission portion 101b in which exposure light partially passes. This manufacturing method may be applied to a method for forming unevenness of the insulating film and the reflective electrode; and a contact hole in the insulating film with a small number of steps. Therefore, further reduction in the number of steps can be realized.

In addition, production equipment is already available since this manufacturing method is used for forming the transparent electrode and the reflective electrode. Therefore, there is no special requirement for using this manufacturing method in order to form unevenness of the transparent electrode and the reflective electrode.

Accordingly, it is greatly advantageous to form both the transparent electrode and the reflecting electrode and the unevenness thereof by this manufacturing method.

There is no big problem if the unevenness is slightly misaligned. Microfabrication is not required for the unevenness. Therefore, the unevenness can be manufactured without reducing manufacturing yield.

In FIG. 7A, a light exposure mask includes a light shielding portion 701a in which exposure light is shielded, a semi-transmission portion 701b in which exposure light partially passes, and a transparent portion 701c in which exposure light passes. The semi-transmission portion 701b is provided with a semi-transmission film 702, which reduces intensity of exposure light. The light shielding portion 701a is formed by superimposing a metal film 703 over the semi-transmission film 702. Here, although an example where the semi-transmission film is used for the semi-transmission portion is described, the invention is not limited to this. The semi-transmission portion is acceptable as long as it reduces intensity of exposure light. Further, a diffraction grating pattern may be used for the semi-transmission portion.

An electrode 705 is provided over an insulating film 707. A film 704 which is sensitive to light (for example, photosensitive acryl) is provided thereover. When the film 704 is exposed to light by using the light exposure mask shown in FIG. 7A, a light-unexposed region, a light-exposed region, and a semi light-exposed region are formed. A part of the film 704 which is irradiated with light is removed, thereby forming a film 704a as shown in FIG. 7B, and a contact hole 706a and unevenness 706 are formed simultaneously.

Note that although the unevenness other than the contact hole is formed in FIGS. 7A and 7B, the invention is not limited to this. A plurality of holes such as contact holes may be formed in order to form unevenness. In this case, a wiring is not required to be provided below the holes since an electrical connection is not necessarily required. In the case where there is no electrical problem, a wiring may be provided.

Note that although a part of the film 704 which is irradiated with light is removed in FIGS. 7A and 7B, the invention is not limited to this. On the contrary, a part of the film 704 which is not irradiated with light may be removed.

Note that although a resist is not used in FIGS. 7A and 7B, the invention is not limited to this. Unevenness and a contact hole may be formed by dry etching or wet etching using a resist after forming a film.

Note that a thickness (a cell gap) of a liquid crystal in the transmission region is made thicker than a thickness of a liquid crystal in the reflection region in some cases. This is because light passes twice in the reflective region, while light passes only once in the transmission region. A cell gap in the transmission region may be made thicker by adjusting the cell gap. FIGS. 8A and 8B show that case. The film 704 is removed so as to form a film 704b; therefore, a depressed portion 801 in the transmission region as well as a contact hole can be formed. A cell gap in the depressed portion 801 becomes thick. Therefore, this part may be used as a transmission region.

In this case, no additional step is required for thickening a cell gap; therefore, cost can be reduced.

Note that this embodiment mode shows an example in the case where a part of the description in Embodiment Mode 1 is transformed. Therefore, the description in Embodiment Mode 1 can be applied to this embodiment mode or combined with this embodiment mode.

In addition, description is made with reference to various drawings in this embodiment mode. One drawing consists of various components. Therefore, another structure can be made by combining each of the components from each drawing.

Embodiment Mode 3

Next, description is made of a specific example in the case where a transistor is provided. Note that a transistor is not necessarily required and a so-called passive matrix type can also be applied.

Figure 9:
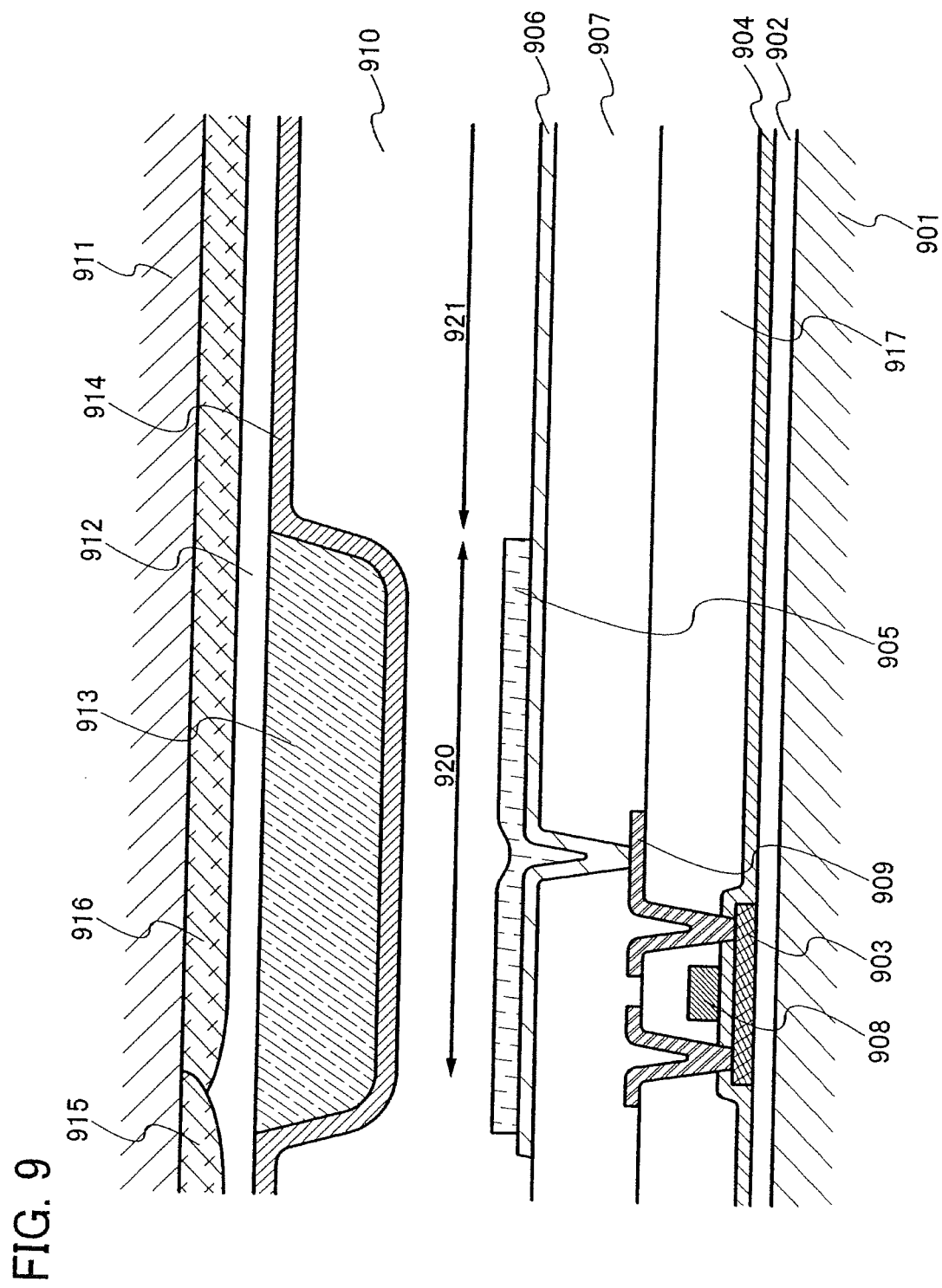
FIG. 9 is a cross sectional view showing a semiconductor device of the invention.

First, description is made of a method for forming a top gate type TFT over a substrate 901 with reference to FIG. 9. The substrate 901 is a substrate having a light transmitting property, such as a quartz substrate, a glass substrate, or a plastic substrate. Note that the substrate 901 may be a substrate having a light shielding property, and a semiconductor substrate or an SOI (Silicon On Insulator) substrate may be used.

An insulating film 902 is formed over the substrate 901 as a base film. As the insulating film 902, a single layer of an insulating film such as a silicon oxide film, a silicon nitride film, or a silicon oxynitride ($SiO_xN_y$) film; or a stacked layer of at least two films of the aforementioned films is used.

Note that a silicon oxide film is preferably used for a part in contact with a semiconductor. As a result, an electron trap in the base film or hysteresis in transistor characteristics can be suppressed. Further, at least one film containing a large amount of nitrogen is preferably provided as the base film; therefore, impurities from glass can be reduced.

Next, an island-shaped semiconductor film 903 is formed over the insulating film 902.

The island-shaped semiconductor film 903 is formed by forming a semiconductor film over an entire surface of the insulating film 902 by a sputtering method, an LPCVD method, a plasma CVD method, or the like, and subsequently processing the shape of the semiconductor film using a mask which is formed by a photolithography method or the like. When the island-shaped semiconductor film 903 is formed of a crystalline semiconductor film, there are a method for forming a crystalline semiconductor film directly over the substrate 901; and a method in which an amorphous semiconductor film is formed over the substrate 901 and is thereafter crystallized by heat treatment so as to form a crystalline semiconductor film. As for heat treatment in crystallization for the latter method, a heating furnace, laser irradiation, irradiation with light emitted from a lamp instead of laser light (hereinafter referred to as lamp annealing), or a combination thereof is employed.

A crystalline semiconductor film may be formed by a thermal crystallization method in which nickel or the like is added to an amorphous semiconductor film, and subsequently, the aforementioned heat treatment is performed. Note that when the crystalline semiconductor film is obtained by performing crystallization by a thermal crystallization method using nickel, gettering treatment in which nickel is removed is preferably performed after crystallization.

When the crystalline semiconductor film is formed through crystallization by laser irradiation, a continuous wave (CW) laser beam or a pulsed laser beam (a pulse laser beam) can be used. As a usable laser beam, a beam emitted from one or plural kinds of the following lasers can be used: a gas laser such as an Ar laser, a Kr laser, or an excimer laser; a laser using single crystalline YAG, $YVO_4$, forsterite ($Mg_2SiO_4$), $YAlO_3$, or $GdVO_4$, or polycrystalline (ceramic) YAG, $Y_2O_3$, $YVO_4$, $YAlO_3$, or $GdVO_4$ as a medium, doped with one or more of Nd, Yb, Cr, Ti, Ho, Er, Tm, and Ta as a dopant; a glass laser; a ruby laser; an alexandrite laser; a Ti:sapphire laser; a copper vapor laser; and a gold vapor laser. Crystals with a large grain size can be obtained by irradiation with a laser beam having a fundamental wave of such a laser beam or second to fourth harmonic waves thereof. For example, the second harmonic wave (532 nm) or the third harmonic wave (355 nm) of an Nd:YVO$_4$ laser (fundamental wave is 1064 nm) can be used. This laser can be emitted by a CW or a pulsed oscillation. When emitted by a CW laser, the power density of the laser of approximately 0.01 to 100 MW/cm$^2$ (preferably 0.1 to 10 MW/cm$^2$) is required. The irradiation is performed at a scanning rate of approximately 10 to 2000 cm/sec.

Note that a laser using single crystalline YAG, YVO$_4$, forsterite (Mg$_2$SiO$_4$), YAlO$_3$, or GdVO$_4$; or polycrystalline (ceramic) YAG Y$_2$O$_3$, YVO$_4$, YAlO$_3$, or GdVO$_4$ as a medium, doped with one or more of Nd, Yb, Cr, Ti, Ho, Er, Tm, and Ta as a dopant; an Ar ion laser; or a Ti:sapphire laser can be continuously oscillated. Further, pulse oscillation thereof can be performed at a repetition rate of equal to or more than 10 MHz by carrying out Q-switch operation or mode locking. When a laser beam is oscillated at a repetition rate of equal to or more than 10 MHz, a semiconductor film is irradiated with a next pulse while the semiconductor film is melted by the laser beam and solidified. Accordingly, unlike in the case of using a pulsed laser with a low repetition rate, a solid-liquid interface can be continuously moved in the semiconductor film; therefore, crystal grains which continuously grow in a scanning direction can be obtained.

When ceramic (polycrystal) is used as a medium, the medium can be formed to have a free shape in a short time at low cost. When a single crystal is used, a columnar medium with several mm in diameter and several tens of mm in length is usually used. In the case of using ceramic, a medium can be made much larger.

Concentration of a dopant such as Nd or Yb in a medium, which directly contributes to a light emission, cannot be changed largely in both of the single crystal and the polycrystal; therefore, there is a limitation to some extent in improvement in output of a laser by increasing the concentration. However, in the case of the ceramic, the size of a medium can be made significantly large as compared with the single crystal; therefore, drastic improvement in output of a laser can be realized.

Further, in the case of the ceramic, a medium with a parallelepiped shape or a rectangular parallelepiped shape can be easily formed. When a medium having such a shape is used and oscillated light is made to travel in a zigzag manner inside the medium, a path of the oscillated light can be made long. Therefore, amplitude is increased and a laser beam can be oscillated at a high output. Furthermore, a cross section of a laser beam, which is emitted from a medium having such a shape, is a quadrangular shape; therefore, as compared with a laser beam with a circular shape, the laser beam with the quadrangular shape in cross section has an advantage to be formed into a linear beam. By shaping a laser beam emitted in the aforementioned manner using an optical system, a linear beam with 1 mm or less in length of a shorter side and several mm to several m in length of a longer side can be easily obtained. In addition, a medium is uniformly irradiated with excited light, so that a linear beam is emitted with uniform energy distribution in a long side direction.

By irradiating the semiconductor film with such a linear beam, an entire surface of the semiconductor film can be more uniformly annealed. In the case where uniform annealing is required from one end to the other end of the linear beam, ingenuity such as arrangement of slits on both ends of the linear beam so as to shade an attenuated portion of energy from light is required.

When the semiconductor film is annealed using a linear beam with uniform intensity obtained in the aforementioned manner and an electronic apparatus is manufactured using this semiconductor film, characteristics of the electronic apparatus are favorable and uniform.

Next, if necessary, the semiconductor layer is doped with a very small amount of an impurity element (boron or phosphorus) in order to control a threshold value of a TFT. Here, an ion doping method is used, in which plasma excitation is performed without mass separation of diborane (B$_2$H$_6$). However, mass separation may be performed so as to precisely control the amount of dopant. Therefore, a threshold voltage can be precisely controlled.

The island-shaped semiconductor film 903 is formed to have a thickness of 25 to 80 nm (preferably 30 to 70 nm). Although a material for the semiconductor film is not limited, the semiconductor film is preferably formed from silicon, a silicon-germanium (SiGe) alloy, or the like.

Next, a gate insulating film 904 is formed so as to cover the island-shaped semiconductor film 903. As the gate insulating film 904, a single layer structure or a stacked layer structure of a thermal oxide film, a silicon oxide film, a silicon nitride film, a silicon oxynitride film, or the like can be used. A silicon oxide film is preferably used for the gate insulating film which is in contact with the island-shaped semiconductor film 903. This is because a trap level at an interface between the gate insulating film and the island-shaped semiconductor film can be lowered. Further, when a gate electrode is formed from Mo, a silicon nitride film is preferably used for the gate insulating film which is in contact with the gate electrode. This is because Mo is not oxidized by a silicon nitride film.

Here, as the gate insulating film 904, a silicon oxynitride film (composition ratio: Si=32%, O=59%, N=7%, and H=2%) having a thickness of 115 nm is formed by a plasma CVD method.

Next, a conductive layer is formed over the gate insulating film 904 and the shape of the conductive layer is processed using a mask formed by a photolithography method or the like so as to form a gate electrode 908 and a gate wiring. A wiring and an electrode for a storage capacitor may be formed as well. As a material for these conductive layer, Ti, Mo, Ta, Cr, W, Al, Nd, Cu, Ag, Au, Pt, Nb, Si, Zn, Fe, Ba, Ge, or the like, an alloy of these elements, or the like is used. Alternatively, a stacked layer structure of the aforementioned elements or an alloy thereof may be used. Here, the gate electrode is formed from Mo. Mo is preferable because it can be easily etched and is resistant to heat. Next, the island-shaped semiconductor film 903 is doped with an impurity element using the gate electrode 908 or a resist as a mask in order to form a channel forming region and impurity regions functioning as a source region and a drain region.

At this time, an LDD region may be formed.

Next, an insulating film 917 is formed using an inorganic material having a light transmitting property (silicon oxide, silicon nitride, silicon oxynitride, or the like), an organic compound material having a low dielectric constant (a photosensitive or nonphotosensitive organic resin material), or a stacked layer thereof. Alternatively, the insulating film 917 (or a part thereof) may be formed using a material containing siloxane. Siloxane is a material including a skeleton formed by a bond of silicon (Si) and oxygen (O) and includes an organic group containing at least hydrogen (such as an alkyl group or an aromatic hydrocarbon) as a substituent. Alternatively, a fluoro group may be used as the substituent. Further alternatively, a fluoro group and an organic group containing at least hydrogen may be used as the substituent. The insulating film 917 may have a stacked layer structure.

Next, a mask is formed of a resist by using a photomask. The insulating film 917 and the gate insulating film 904 are selectively etched using the mask so as to form a contact hole. Then, the mask made of a resist is removed.

A conductive film is formed over the insulating film 917 by a sputtering method, a printing method, a CVD method, or an ink-jet method. The shape of the conductive film is processed using a mask formed by a photolithography method or the like so as to form a drain electrode 909, a source electrode, and a source wiring. As for a material, Ti, Mo, Ta, Cr, W, Al, Nd, Cu, Ag, Au, Pt, Nb, Si, Zn, Fe, Ba, Ge, or the like, an alloy of these elements, or the like is used. Alternatively, the drain electrode 909 or the like may have a stacked layer structure of the aforementioned elements or an alloy thereof. Here, the drain electrode and the source wiring are formed to have a three-layer structure where a layer of Al is interposed between layers of Mo.

The drain electrode 909 corresponds to the wiring 401 in FIGS. 4 and 6 and the electrode 705 in FIGS. 7A, 7B, 8A, and 8B.

An insulating film 907 is formed thereover. The insulating film 907 is often formed using an organic material since it preferably has high planarity and good coverage. Note that the insulating film 907 may have a multilayer structure where an organic material is formed over an inorganic material (silicon oxide, silicon nitride, silicon oxynitride, or the like). The insulating film 907 corresponds to the insulating film 107 in FIGS. 1A to 1C, 2A to 2C, 3A and 3B.

After a contact hole is formed in the insulating film 907, a conductive film is formed thereover by a sputtering method, a printing method, a CVD method, or an ink-jet method.

A conductive film 906 in FIG. 9 corresponds to the conductive film 106a in FIGS. 2C and 4 to 6. A conductive film 905 in FIG. 9 corresponds to the conductive film 105b in FIGS. 4 to 6.

The conductive film 906 is a part of a pixel electrode and is a transparent electrode which transmits light. The conductive film 905 is a part of the pixel electrode and is a reflective electrode which reflects light. An entire under surface of the reflective electrode is in contact with a top surface of the transparent electrode.

As for the transparent electrode, for example, an indium tin oxide (ITO) film in which tin oxide is mixed in indium oxide, an indium tin silicon oxide (ITSO) film in which silicon oxide is mixed in indium tin oxide (ITO), an indium zinc oxide (IZO) film in which zinc oxide is mixed in indium oxide, a zinc oxide film, a tin oxide film, or the like can be used. Note that IZO is a transparent conductive material formed by a sputtering method using a target in which 2 to 20 wt % of zinc oxide (ZnO) is mixed in ITO. However, the invention is not limited to this.

As for the reflective electrode, for example, Ti, Mo, Ta, Cr, W, Al, Nd, Cu, Ag, Au, Pt, Nb, Si, Zn, Fe, Ba, Ge, or the like, an alloy thereof, or the like can be used. A two-layer structure where Al is stacked with Ti, Mo, Ta, Cr or W; or a three-layer structure where a layer of Al is interposed between layers of a metal such as Ti, Mo, Ta, Cr, or W may be employed.

The conductive film 905 and the conductive film 906 are formed by the method described in Embodiment Modes 1 and 2.

Although not shown in the figure, an alignment film is often formed over the conductive film 905 and the conductive film 906.

A color filter 916, a black matrix 915, a planarizing film 912, an opposite electrode 914, and the like are formed over an opposite substrate 911. A liquid crystal layer 910 is provided between the opposite substrate 911 and the substrate 901.

In a part (reflection portion) 920 where light is reflected in order that display is performed, light passes through the liquid crystal layer 910 twice. That is, external light enters the liquid crystal layer 910 from an opposite substrate side, is reflected by the conductive film 905, passes the liquid crystal layer 910 again, and goes out from the opposite substrate side; therefore, light passes the liquid crystal layer 910 twice.

On the other hand, in a part (transmission portion) 921 where light is transmitted in order that display is performed, light enters the liquid crystal layer 910 through the conductive film 906 and goes out from the opposite substrate. That is, light passes through the liquid crystal layer 910 once.

Since the liquid crystal layer 910 has refractive index anisotropy, polarization of light is changed in accordance with a distance traveled by the light in the liquid crystal layer 910, and thereby when an image is displayed, display is not performed appropriately. Therefore, polarization of light is required to be adjusted. As a method for adjusting polarization of light, a thickness (so-called cell gap) of the liquid crystal layer 910 in the part (reflection portion) 920 where light is reflected in order that display is performed may be made thin; therefore, the distance cannot be too long for light to pass the liquid crystal layer 910 twice.

A film for adjusting a thickness (a film for adjusting a cell gap, also referred to as a thickness adjusting film, a cell gap adjusting film or the like) may be provided in order to thin the thickness (so-called cell gap) of the liquid crystal layer 910. The film corresponds to an insulating film 913 in FIG. 9. That is, the insulating film 913 is provided for adjusting the thickness of the liquid crystal layer in the part (reflection portion) 920 where light is reflected in order that display is performed. By providing the insulating film 913, the thickness of the liquid crystal layer in the reflection portion 920 can be made thinner than a thickness of the liquid crystal layer in the transmission portion 921.

Note that the thickness of the liquid crystal layer 910 in the reflection portion 920 is preferably half the thickness of the liquid crystal layer 910 in the transmission portion 921. Here, "half" may include a difference unrecognized by a human eye.

Light does not enter only from a direction perpendicular to the substrate, that is, a normal direction. Light often enters obliquely. By putting these cases together, a distance traveled by the light in the reflection portion 920 may be made substantially approximately the same as a distance traveled by the light in the transmission portion 921. Therefore, the thickness of the liquid crystal layer 910 in the reflection portion 920 is preferably equal to or more than one third of the thickness of the liquid crystal layer 910 in the transmission portion 921 and equal to or less than two thirds thereof.

As described above, the film for adjusting a thickness is easily formed by being provided on the opposite substrate 911 side. The film for adjusting a thickness is preferably formed using an organic material such as acrylic or polyimide.

Note that light scattering particles may be mixed in the film for adjusting a thickness. Therefore, light is scattered and luminance can be improved. The light scattering particles are formed of a material having a refractive index different from that of a cell gap adjusting film and formed from a resin material having a light transmitting property. A film for adjusting a cell gap may be formed so as to contain such light scattering particles.

Note that the opposite electrode 914 is preferably formed over the insulating film 913 (a side near the liquid crystal layer 910). Therefore, a sufficiently high electric field can be applied to the liquid crystal layer 910.

Figure 10:
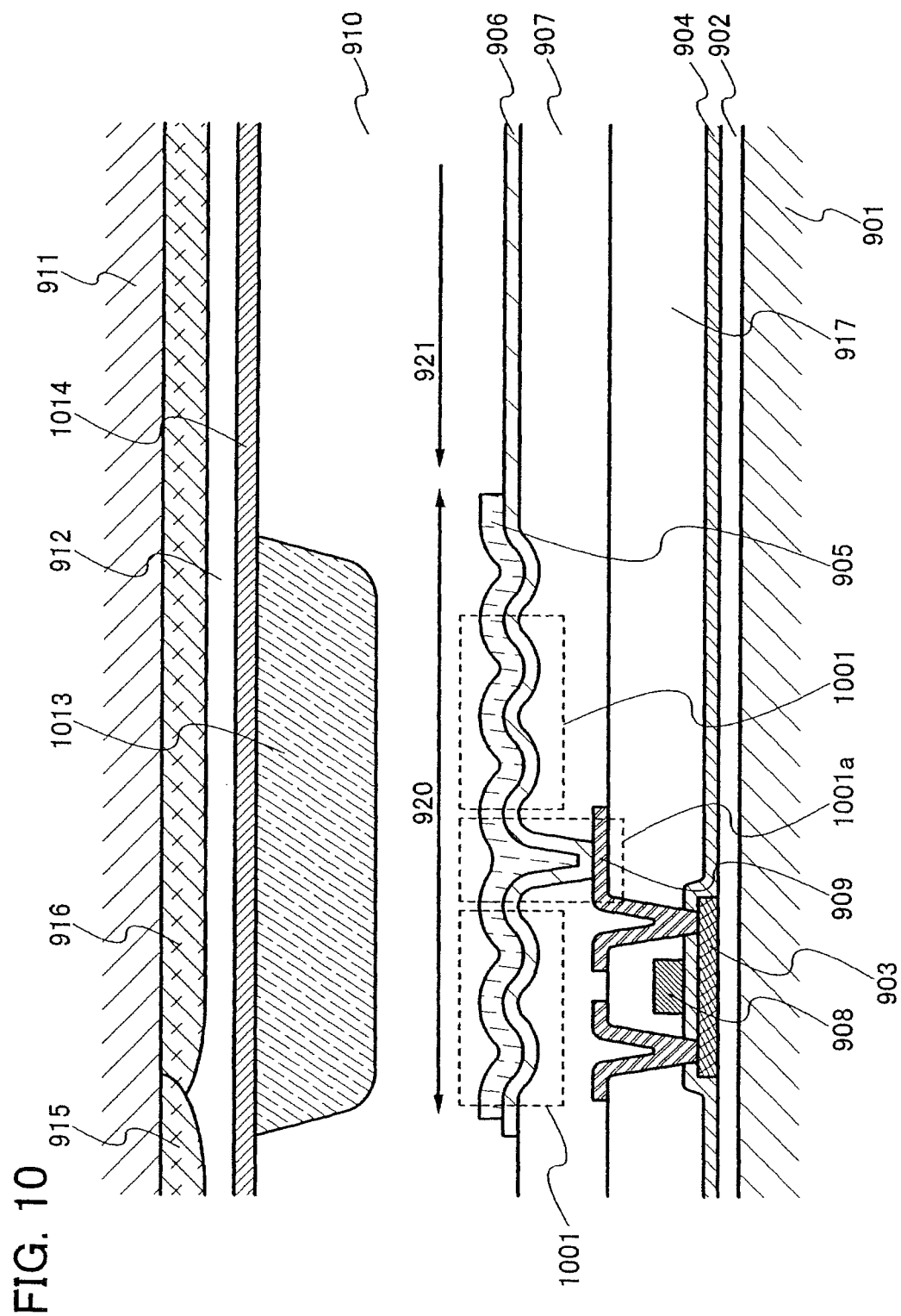
FIG. 10 is a cross sectional view showing a semiconductor device of the invention.

However, the invention is not limited to this. As shown in FIG. 10, an insulating film 1013 may be formed over an electrode 1014 (a side near the liquid crystal layer 910). Disconnection of the electrode 1014 can be prevented since the insulating film 1013 is very thick.

Note that although in FIG. 9, the reflective electrode is not provided with unevenness in the reflection portion 920, unevenness may be formed as shown in FIGS. 5 and 6. This case is shown in FIG. 10. Unevenness may be formed by the method described in FIGS. 7A and 7B. Light can be diffused by unevenness 1001 and a contact hole 1001a.

Figure 11:
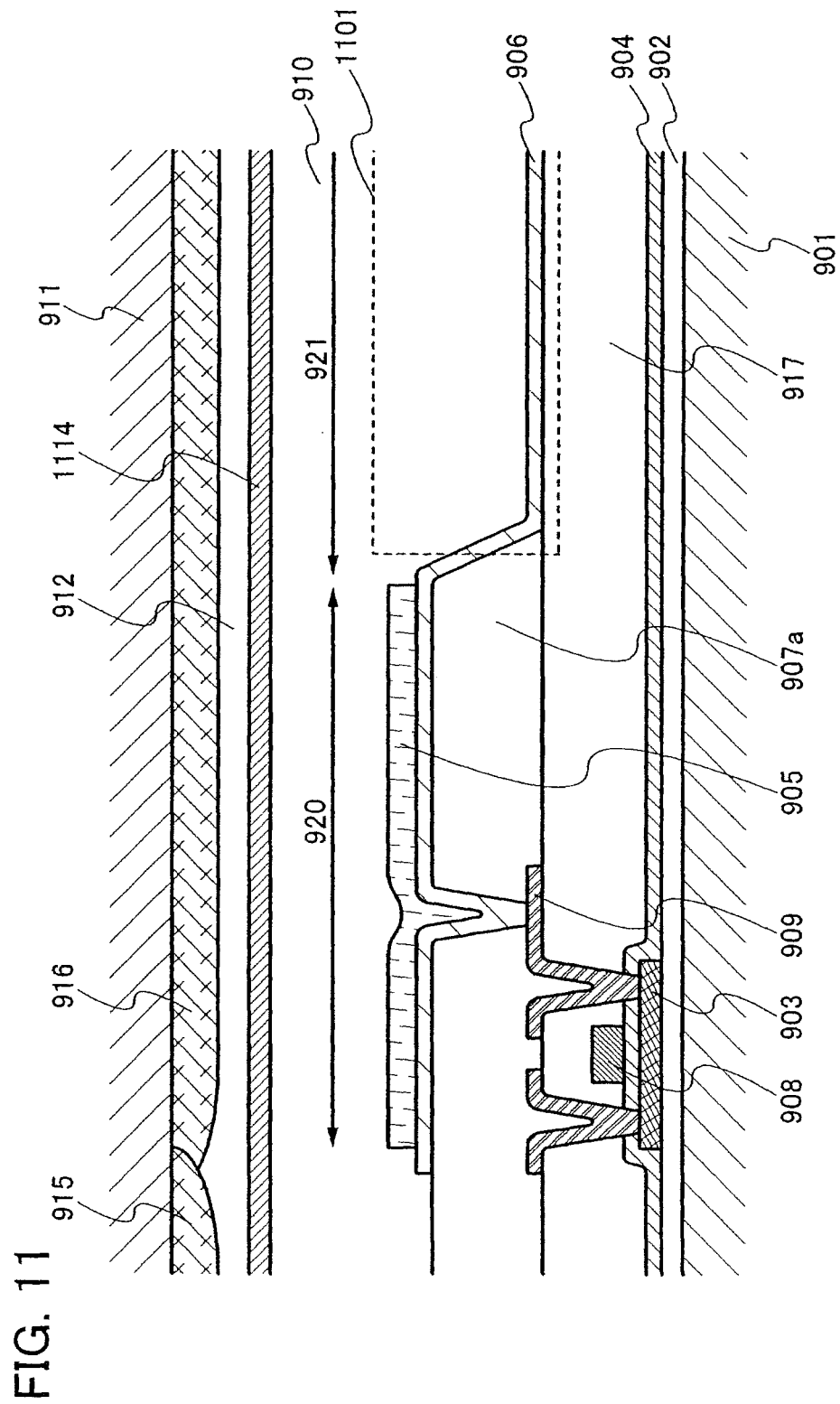
FIG. 11 is a cross sectional view showing a semiconductor device of the invention.
Figure 12:
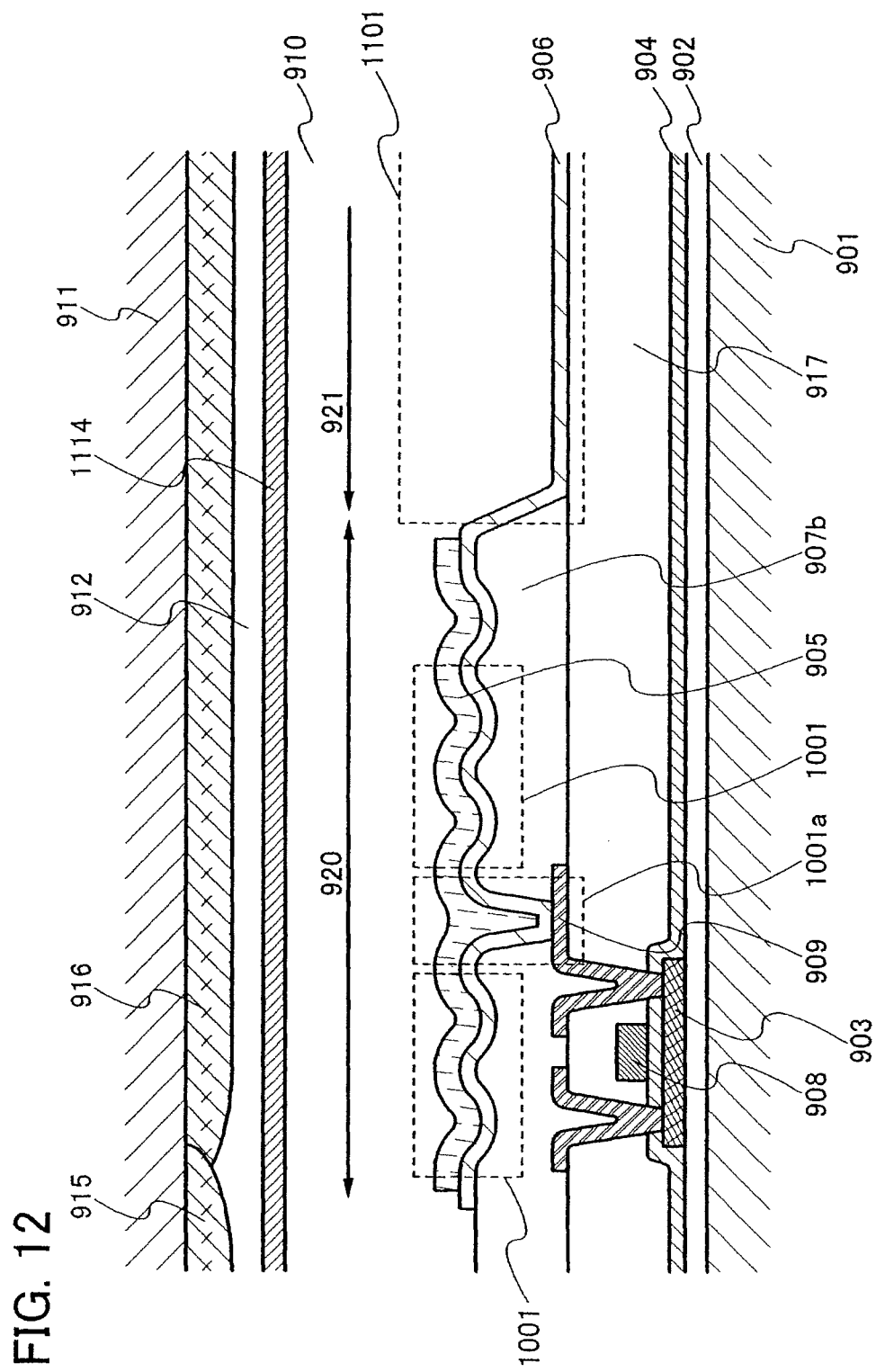
FIG. 12 is a cross sectional view showing a semiconductor device of the invention.

Note that although a thickness adjusting film is provided on the opposite substrate side in FIGS. 9 and 10, the invention is not limited to this. The thickness adjusting film may be provided on a side where a transistor is formed. This case is shown in FIG. 11. A part of an insulating film 907a is removed to form the thickness adjusting film. Note that FIG. 10 may be combined with FIG. 11. An example of this case is shown in FIG. 12. A depressed portion 1101 corresponds to the depressed portion 801 in FIG. 8B. As described above, the depressed portion 1101 is provided in the transmission portion 921; therefore, a cell gap in the transmission portion 921 can be made larger than a cell gap in the reflection portion 920.

Note that both of a depressed portion and a thickness adjusting film may be provided. Both may serve to control a thickness; therefore, each thickness is not required to be made very large, which leads to easy manufacturing.

Note that although in FIG. 11, a part of the insulating film 907a is removed in order to form the depressed portion 1101, the invention is not limited to this. Other insulating films may be removed. For example, FIG. 50 shows the case where a part of an insulating film 917a as well as the insulating film 907a is removed. Therefore, a difference in cell gaps between the reflection portion 920 and the transmission portion 921 can be easily made. As compared with the case where only the insulating film 907a is removed, a thickness of the insulating film 907a can be made thinner, and thereby deficiency such as a warp of the substrate can be reduced.

FIG. 51 shows the case where an insulating film 902e, a gate insulating film 904e, a substrate 901e, and the like are further partially removed. The insulating film 902e, the gate insulating film 904e, the substrate 901e, and the like are formed from films having similar components in some cases; therefore, a depressed portion 1101c can be formed more deeply.

Figure 13:
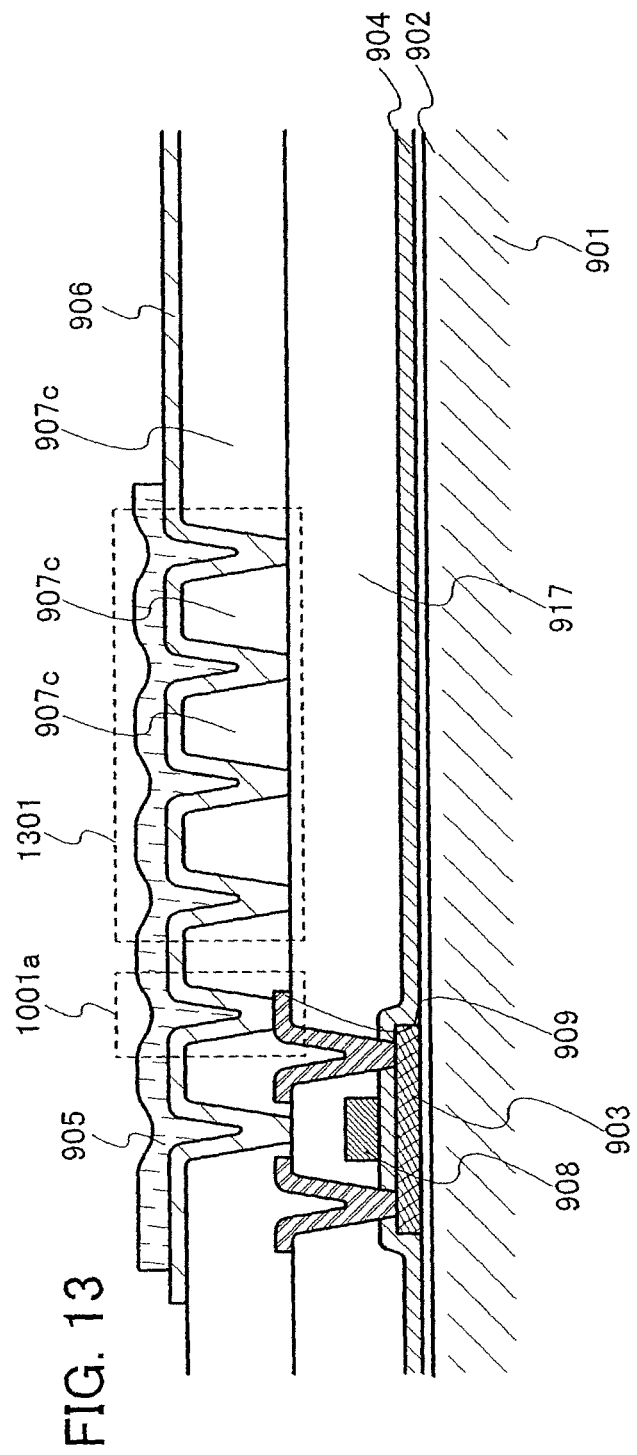
FIG. 13 is a cross sectional view showing a semiconductor device of the invention.

Note that unevenness may be formed using a contact hole. This case is shown in FIG. 13. Unevenness is formed using a contact hole 1301 provided in a part where the conductive film 906 is not connected to the drain electrode 909. A plurality of contact holes 1301 are formed in order that surfaces of a wiring and an electrode are made uneven, but not in order to connect wirings. Note that in the contact hole 1301, similarly in the contact hole 1001a, the conductive film 906 may be in contact with the drain electrode 909.

Figure 14:
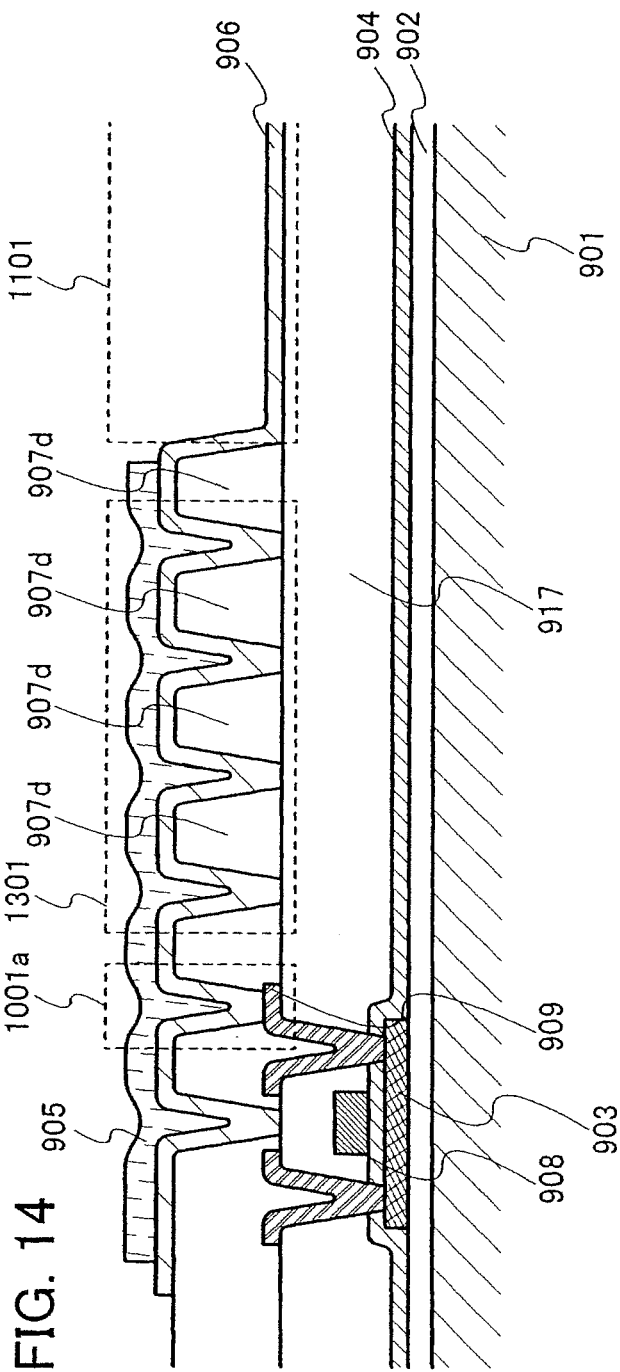
FIG. 14 is a cross sectional view showing a semiconductor device of the invention.

FIG. 14 shows the case where the depressed portion 1101 is provided in the case of FIG. 13.

As described above, there are a plurality of methods for each of presence of unevenness, a forming method of unevenness, and an adjusting method of a cell gap (thickness adjustment is performed on an opposite substrate side or a TFT substrate side). Therefore, any of them may be selected and combined.

Note that in the case where the conductive film 905 is a reflective electrode, a transistor, a wiring, and a storage capacitor are preferably formed below the conductive film 905. In the case where the conductive film 905 is a reflective electrode and the conductive film 906 is a transparent electrode, the transmission region is preferably provided as large as possible. This is because light is transmitted through the transmission region in order that display is performed. On the other hand, in the reflection region, display is not affected even when some element is provided below the reflective electrode. Therefore, a transistor, a wiring, and a storage capacitor are provided below the conductive film 905, and thereby layout can be efficiently designed.

Note that although the whole area of the transistor and the storage capacitor is preferably provided below the reflective electrode, the invention is not limited to this. A part of the transistor or the storage capacitor may be provided outside the reflective electrode (outside the reflection portion).

Figure 47:
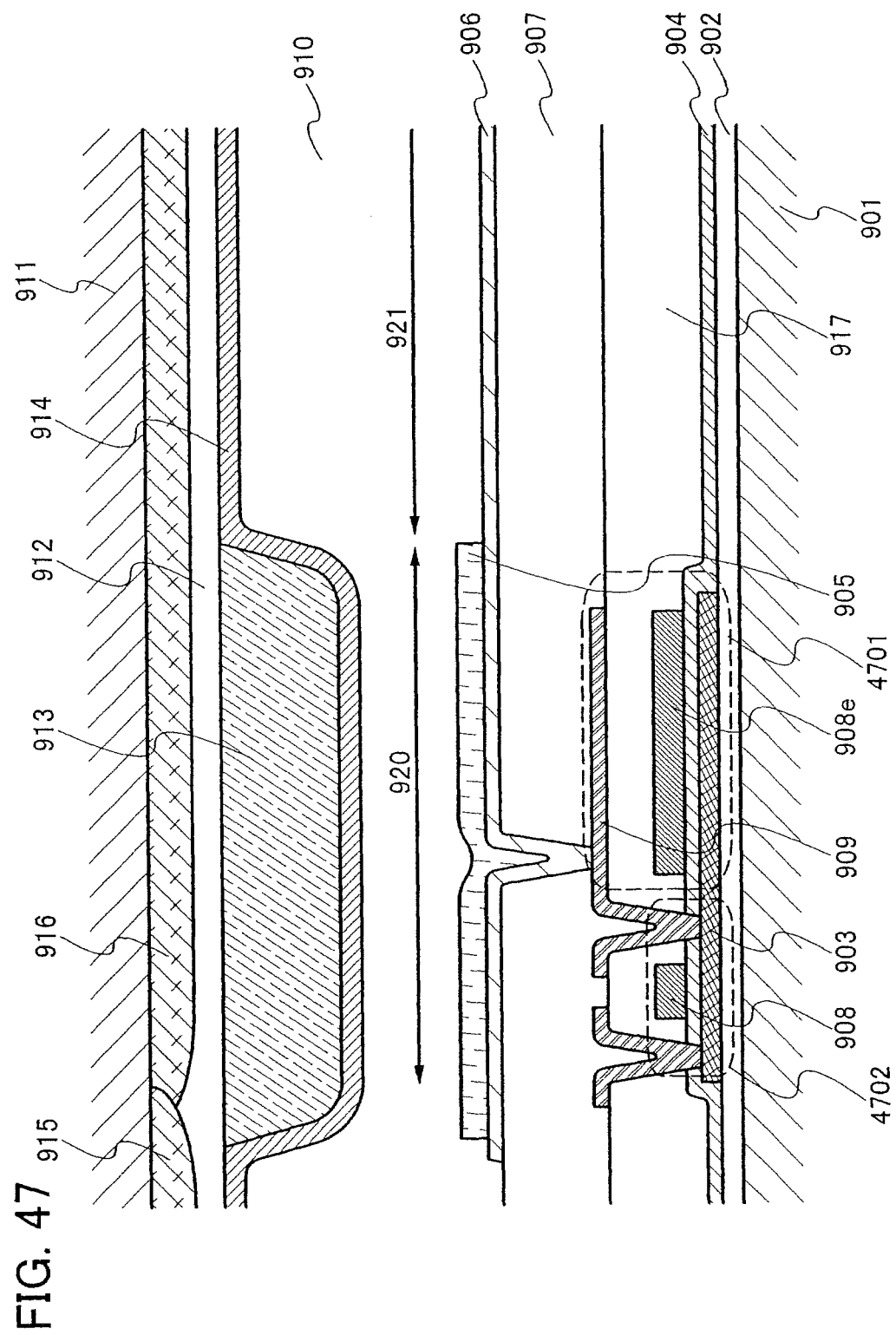
FIG. 47 is a cross sectional view showing a semiconductor device of the invention.
Figure 48:
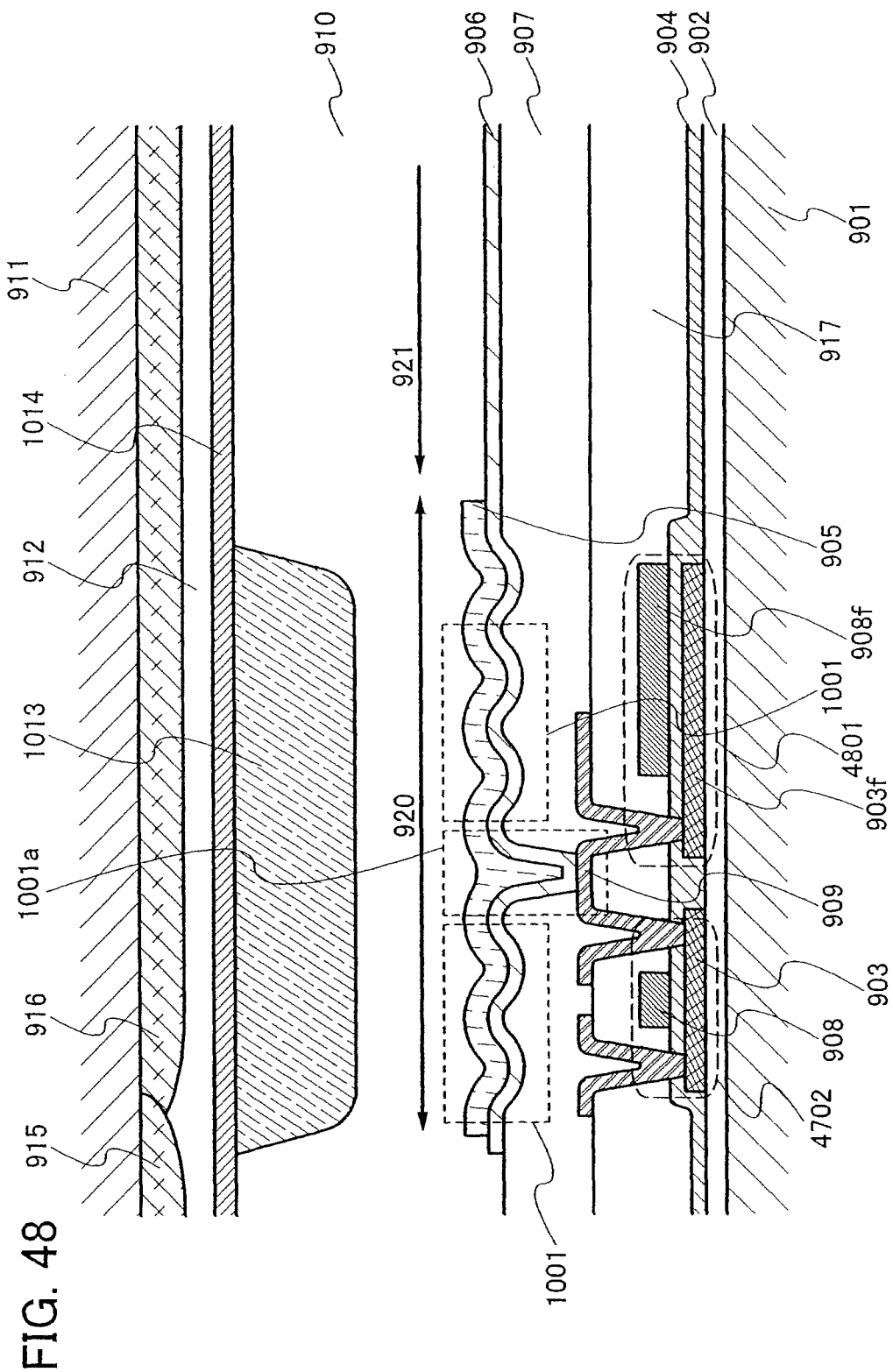
FIG. 48 is a cross sectional view showing a semiconductor device of the invention.
Figure 49:
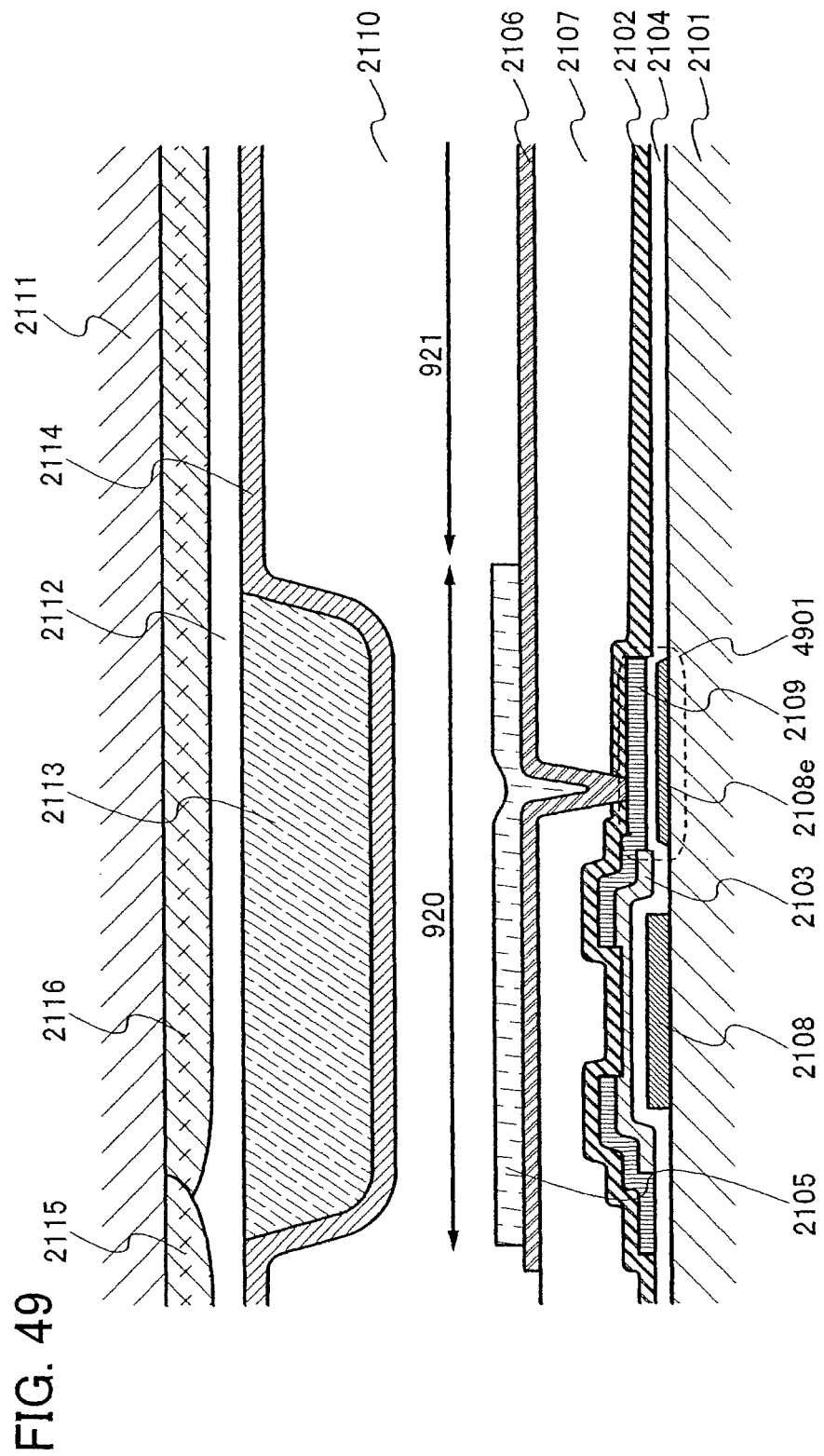
FIG. 49 is a cross sectional view showing a semiconductor device of the invention.

FIGS. 47 and 48 show cross sectional views in the case where the transistor and the storage capacitor are provided below the reflective electrode. In FIG. 47, one electrode of a storage capacitor 4701 is formed using a part of a semiconductor layer which is used as an active layer for a transistor 4702. In FIG. 47, the storage capacitor 4701 is formed between the island-shaped semiconductor film 903 and a storage capacitor wiring 908e using the gate insulating film 904 as an insulator; and between a part of the drain electrode 909 and the storage capacitor wiring 908e using the insulating film 917 as an insulator. In FIG. 48, a storage capacitor 4801 is formed between a storage capacitor wiring 908f and a semiconductor layer 903f other than the semiconductor layer used as an active layer for the transistor 4702, using the gate insulating film 904 as an insulator. The semiconductor layer 903f is connected to the drain electrode 909 through a contact hole.

Figure 15:
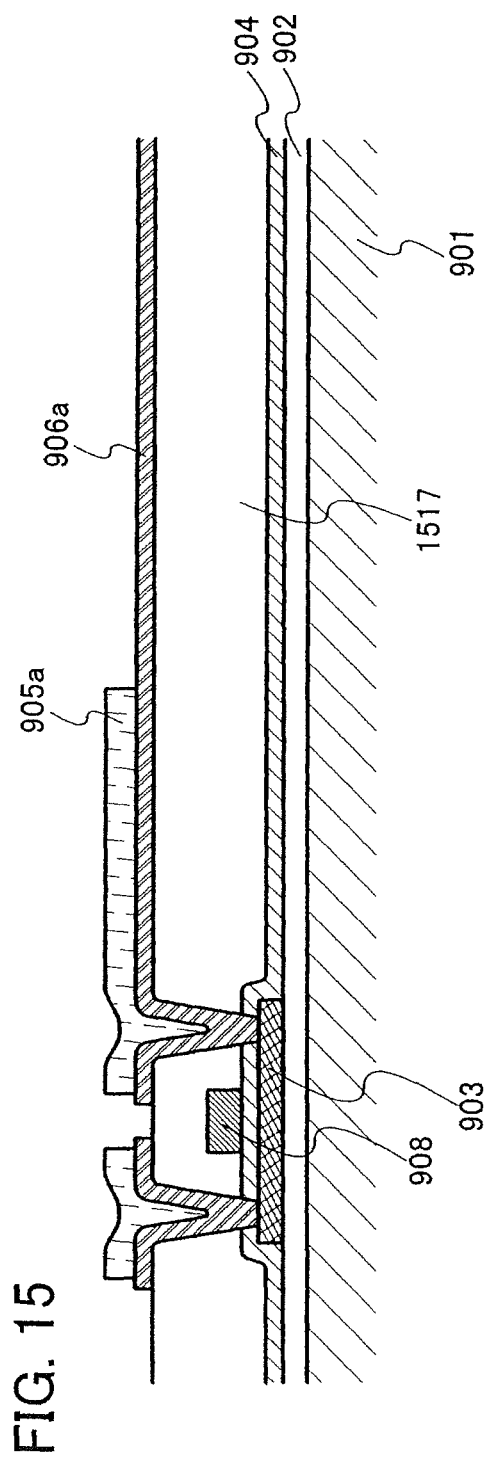
FIG. 15 is a cross sectional view showing a semiconductor device of the invention.
Figure 16:
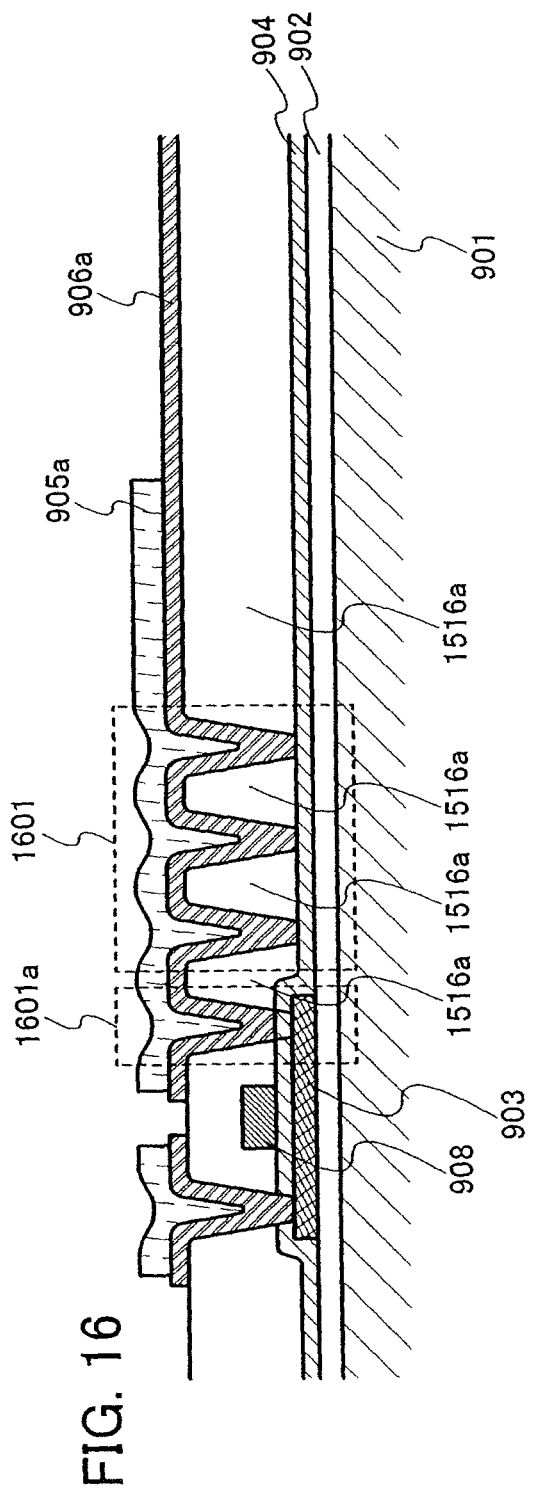
FIG. 16 is a cross sectional view showing a semiconductor device of the invention.

Note that although an insulating film is provided over the drain electrode in FIGS. 9 to 14, and 47 and 48, the invention is not limited to this. A transparent electrode 906a may be provided below a drain electrode 905a functioning as a reflective electrode, and a pixel electrode may be provided over an insulating film 1517 which is formed over the gate electrode. This case is shown in FIG. 15. Note that in the case of FIG. 15, a surface of a reflective electrode may also be made uneven, or a thickness adjusting film and a depressed portion may be formed to adjust a cell gap. As an example, FIG. 16 shows the case where unevenness of a reflective electrode is formed using contact holes 1601 and 1601a.

Note that although each of FIGS. 9 to 16 and 47 and 48 shows the case where the gate electrode is provided over a channel, that is, the case of a so-called top gate type transistor, the invention is not limited to this. The invention can also be applied to the case where a gate electrode is provided below a channel, that is, the case of a so-called bottom gate type transistor.

Figure 17:
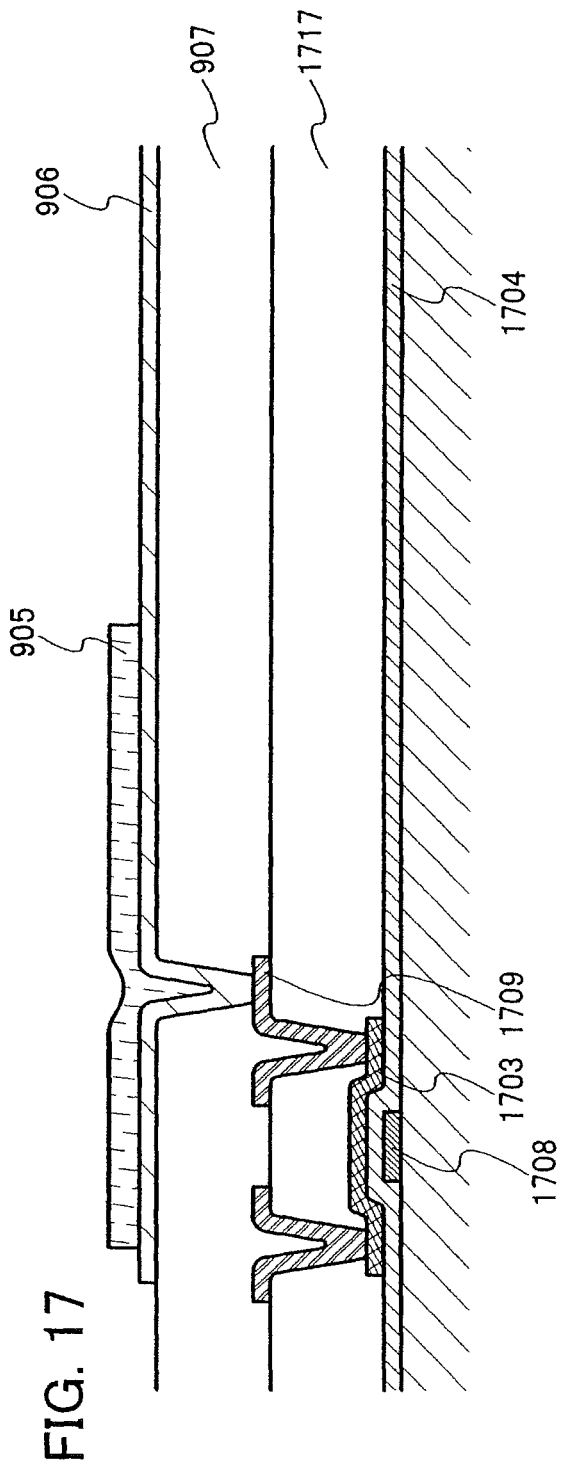
FIG. 17 is a cross sectional view showing a semiconductor device of the invention.

FIG. 17 shows the case of a bottom gate type transistor. A gate insulating film 1704 is formed over a gate electrode 1708. An island-shaped semiconductor film 1703 is formed thereover. An insulating film 1717 is formed thereover. A contact hole is formed, over which a drain electrode 1709 and a source signal line are formed. A structure over the drain electrode 1709 and the source signal line is similar to the case of a top gate structure. Therefore, in the case of a bottom gate type transistor, a surface of a reflective electrode may also be made uneven, or a thickness adjusting film and a depressed portion may be formed to adjust a cell gap. Unevenness of a reflective electrode may be formed using a contact hole.

Note that this embodiment mode shows an example in the case where the description in Embodiment Modes 1 and 2 is concretely realized. Therefore, the description in Embodiment Modes 1 and 2 can also be applied to this embodiment mode or combined with this embodiment mode.

In addition, description is made with reference to various drawings in this embodiment mode. One drawing consists of various components. Therefore, another structure can be made by combining each of the components from each drawing.

Embodiment Mode 4

The liquid crystal layer 910 can be provided with liquid crystal molecules of various modes.

A TN (Twisted Nematic) liquid crystal is taken as an example. When the TN liquid crystal is used, a pixel electrode is not required to be provided with a slit. That is, the pixel electrode can be provided all over one pixel. A common electrode formed over an opposite substrate can be formed over all pixels. Therefore, the pixel electrode (the transparent electrode and the reflective electrode) described in Embodiment Modes 1 to 3 can be used.

As a liquid crystal other than the TN liquid crystal, there are an MVA (Multi-domain Vertical Alignment) mode and a PVA (Patterned Vertical Alignment) mode in which liquid crystal molecules are arranged in a vertical direction. In the case of an MVA mode or a PVA mode, in order to control tilt of liquid crystal molecules, a pixel electrode is provide with a slit or divided so as to be arranged at intervals, or a projection is provided.

Figure 18:
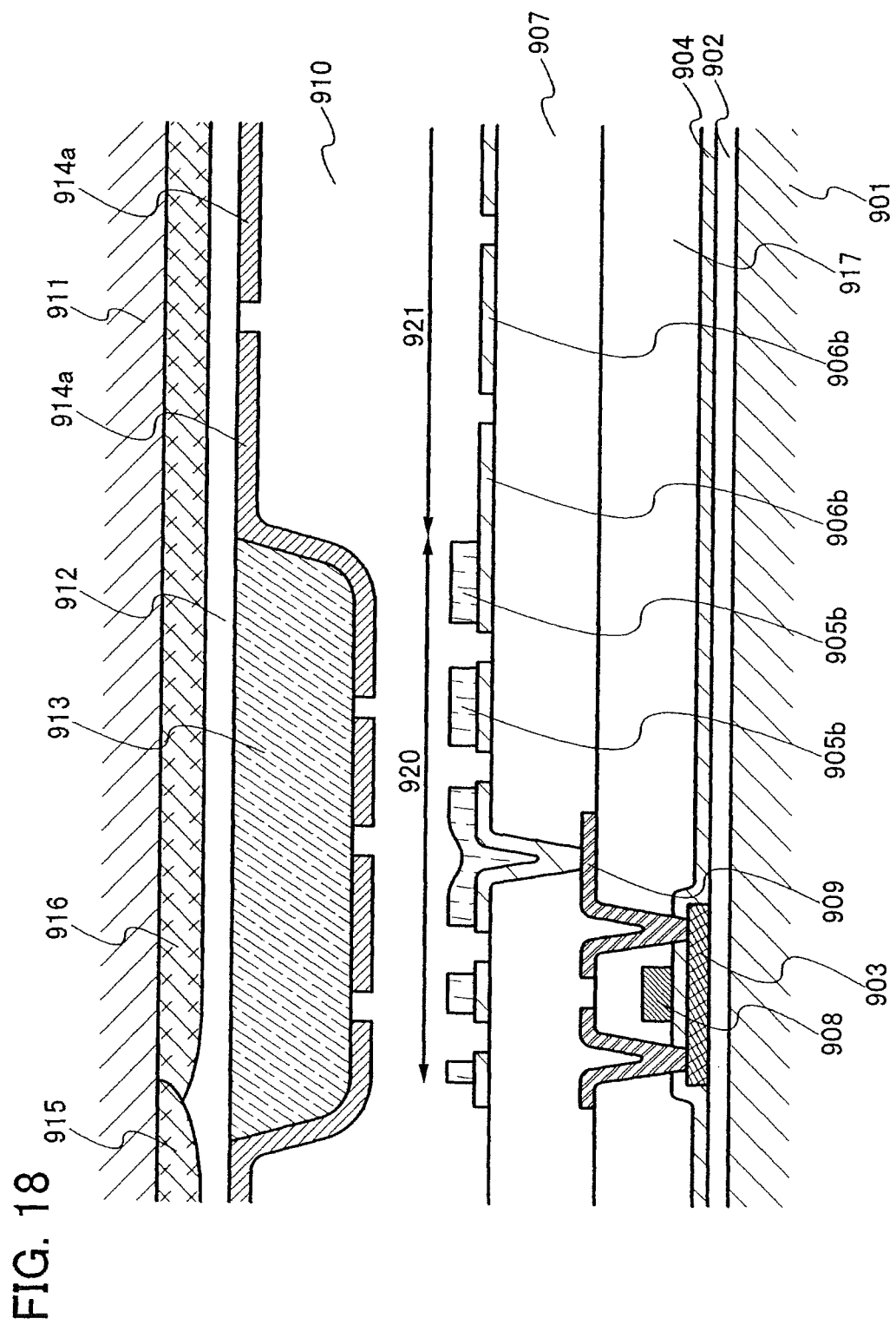
FIG. 18 is a cross sectional view showing a semiconductor device of the invention.
Figure 19:
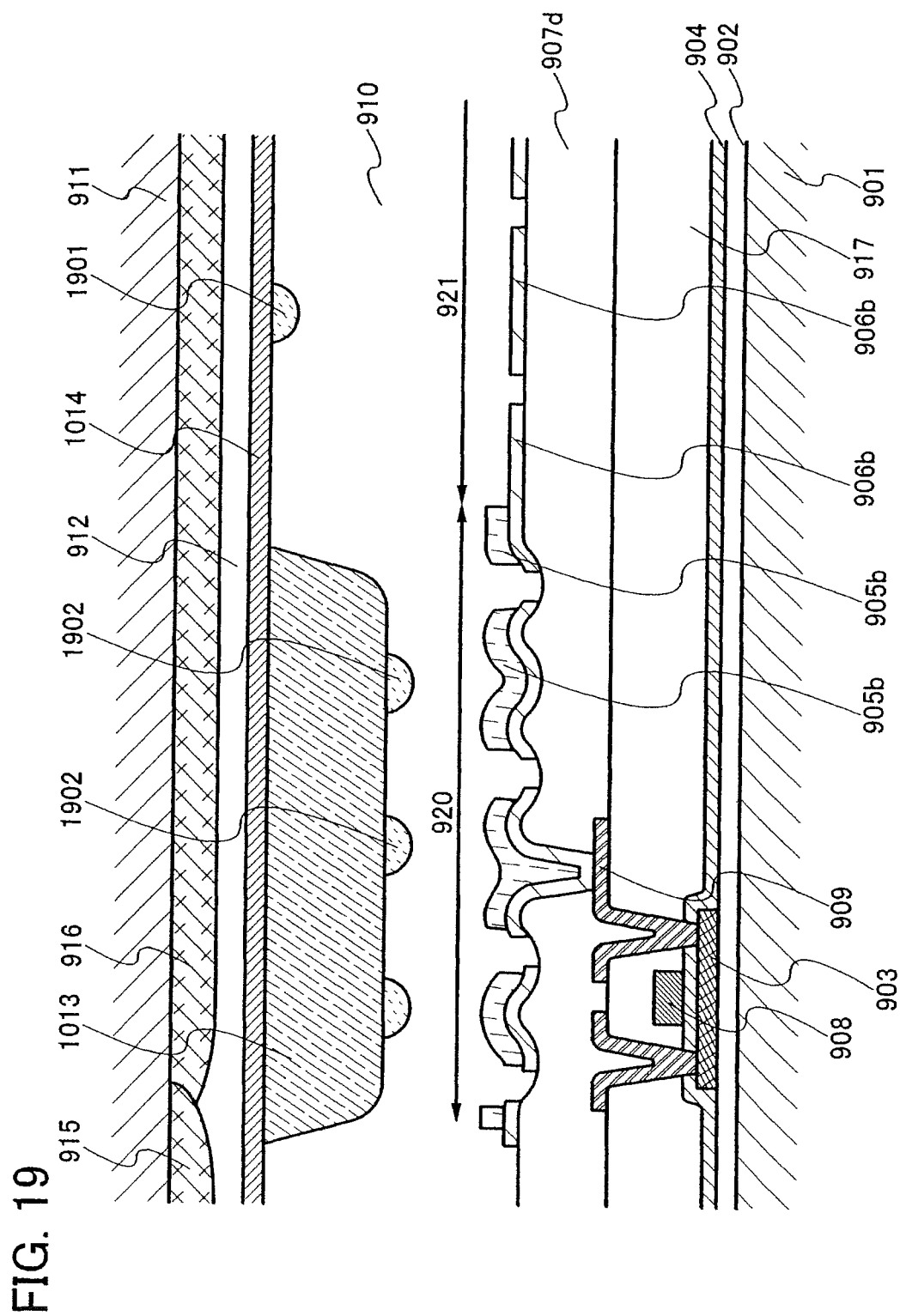
FIG. 19 is a cross sectional view showing a semiconductor device of the invention.

FIG. 18 is a cross sectional view in the case where the pixel electrode is provided with a slit. As shown in FIG. 18, a structure where an opposite electrode is also provided with a slit or the like is the PVA mode. As shown in FIG. 19, a structure where an opposite electrode is provided with projections 1901 and 1902 is the MVA mode.

When a manufacturing method of the invention is used, a side surface of a conductive layer 906b and a side surface of a conductive film 905b are not aligned with each other. The side surface of the conductive film 905b is recessed with respect to the side surface of the conductive layer 906b. An entire under surface of a reflective electrode is in contact with a top surface of a transparent electrode. This is caused by a manufacturing method of the invention, such as the shape of a resist which is used when each conductive layer is etched.

Viewing angle characteristics are improved by using the MVA mode or the PVA mode. Therefore, visibility is improved and an image with less color unevenness even when seen from any angle can be displayed. Further, luminance in a black state can be made extremely low since a normally black mode can be used. Therefore, a contrast ratio can be improved.

Note that this embodiment mode shows an example in the case where the description in Embodiment Modes 1 to 3 is concretely realized. Therefore, the description in Embodiment Modes 1 to 3 can be applied to this embodiment mode or combined with this embodiment mode.

In addition, description is made with reference to various drawings in this embodiment mode. One drawing consists of various components. Therefore, another structure can be made by combining each of the components from each drawing.

Embodiment Mode 5

Next, description is made of the case of a transistor using amorphous silicon. Note that as for a TFT described in this embodiment mode, Embodiment Modes 1 to 4 can be referred to for the kind of a substrate, a forming method, a material of each layer, and the like.

Also in the case of a transistor using amorphous silicon, a bottom gate type (inversed staggered type) transistor, a top gate type (staggered type) transistor, and the like can be realized. Here, description is made of the case of using an inversed staggered type transistor.

Figure 21:
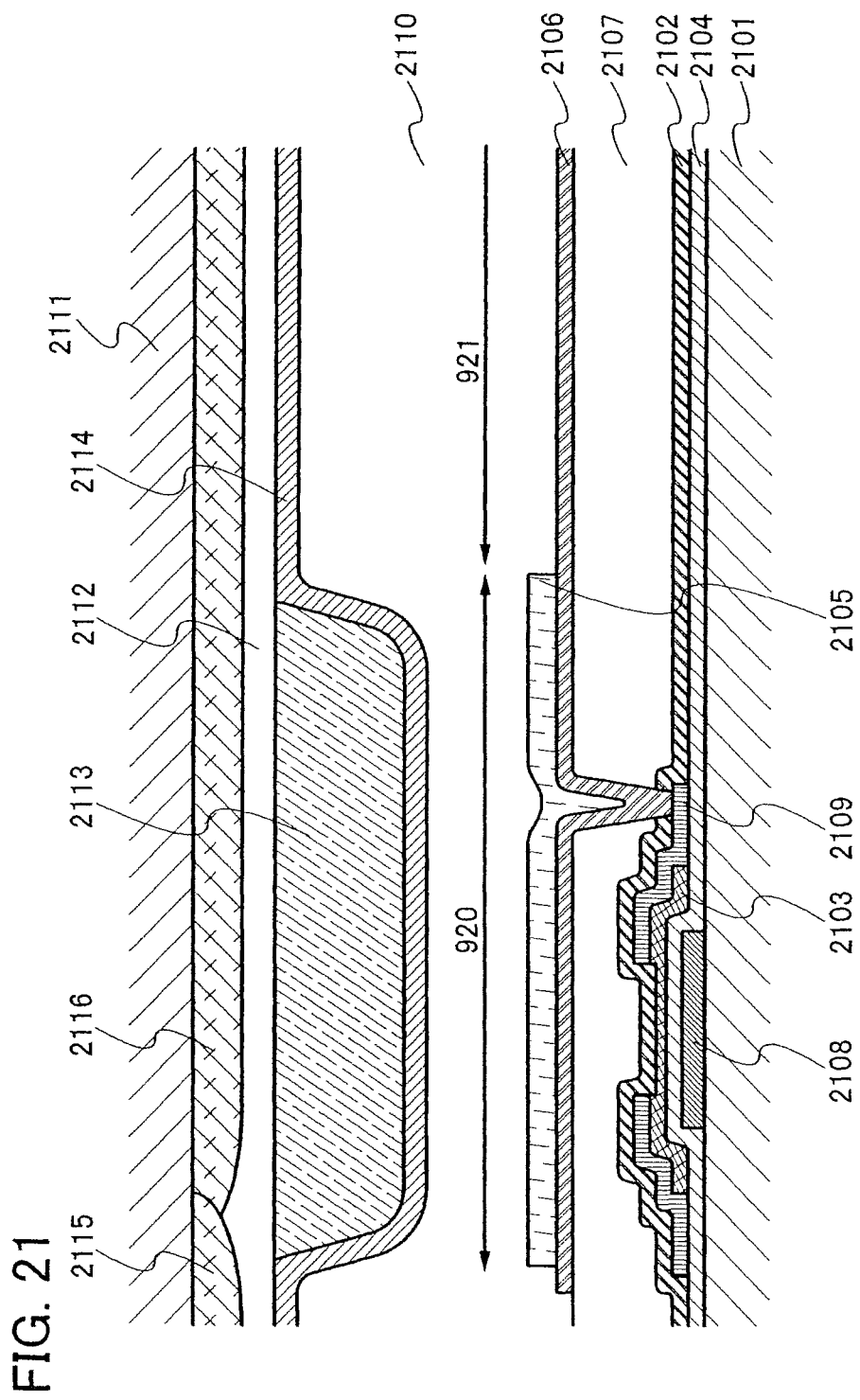
FIG. 21 is a cross sectional view showing a semiconductor device of the invention.

FIG. 21 is a cross sectional view. An insulating film is formed over a substrate 2101 as a base film. Note that a base film is not required to be provided. Next, a conductive layer is formed over the insulating film or the substrate 2101 and the shape thereof is processed using a mask formed by a photolithography method or the like so as to form a gate electrode 2108 and a gate wiring. A storage capacitor wiring and an electrode may be formed as well.

A gate insulating film 2104 is formed so as to cover the gate electrode 2108. The gate insulating film 2104 is formed using a silicon nitride film, a silicon oxide film, a stacked layer structure thereof, or the like. An amorphous semiconductor film is formed over the gate insulating film 2104. Although a material of the amorphous semiconductor film is not limited, the amorphous semiconductor film is preferably formed of silicon, a silicon-germanium (SiGe) alloy, or the like. Next, a conductive layer is formed over the amorphous semiconductor film. As the conductive layer, an amorphous silicon film containing phosphorus can be used, for example. The shapes of the amorphous semiconductor film and the conductive layer are processed using a mask formed by a photolithography method or the like so as to form an island-shaped amorphous semiconductor film and an island-shaped conductive layer. These are generally a semiconductor layer 2103 containing silicon as a main component.

A conductive layer is formed to be stacked over the semiconductor layer 2103 and the shape thereof is processed using a mask formed by a photolithography method or the like so as to form a drain electrode 2109.

The conductive layer of the semiconductor layer 2103 is etched using the drain electrode 2109 or the like as a mask, and thereby a source and a drain are separated. Such a structure is generally referred to as a channel etch type.

The drain electrode 2109 corresponds to the wiring 401 in FIGS. 4 and 6 and the electrode 705 in FIGS. 7A, 7B, 8A, and 8B.

An insulating film 2102 is formed thereover. The insulating film 2102 is preferably formed of a silicon nitride film since a silicon nitride film can prevent various impurities from entering the transistor. Note that a silicon oxide film or a stacked layer film including a silicon oxide film may be used.

Next, an insulating film 2107 is formed to absorb unevenness of the wiring and the like to be made even. The insulating film 2107 is made using an organic film such as acrylic or polyimide. A photosensitive material may be used as well.

The insulating film 2107 and the insulating film 2102 correspond to the insulating film 107 in FIGS. 1A to 1C, 2A to 2C and 3A and 3B.

Next, a contact hole is formed in the insulating film 2102 and the insulating film 2107. A conductive film is formed thereover.

An electrode 2106 in FIG. 21 corresponds to the conductive film 106a in FIGS. 2C, and 4 to 6. An electrode 2105 in FIG. 21 corresponds to the conductive film 105b in FIGS. 2C, and 4 to 6.

The electrode 2106 is a part of a pixel electrode and is a transparent electrode which transmits light. The electrode 2105 is a part of a pixel electrode and is a reflective electrode which reflects light. An entire under surface of the reflective electrode is in contact with a top surface of the transparent electrode.

As for the transparent electrode, for example, an indium tin oxide (ITO) film in which tin oxide is mixed in indium oxide, an indium tin silicon oxide (ITSO) film in which silicon oxide is mixed in indium tin oxide (ITO), an indium zinc oxide (IZO) film in which zinc oxide is mixed in indium oxide, a zinc oxide film, a tin oxide film, or the like can be used. Note that IZO is a transparent conductive material formed by a sputtering method using a target in which 2 to 20 wt % of zinc oxide (ZnO) is mixed in ITO. However, the invention is not limited to this.

As for the reflective electrode, for example, Ti, Mo, Ta, Cr, W, Al, Nd, Cu, Ag, Au, Pt, Nb, Si, Zn, Fe, Ba, Ge, or the like, an alloy thereof, or the like can be used. A two-layer structure where Al is stacked with Ti, Mo, Ta, Cr or W; or a three-layer structure where a layer of Al is interposed between layers of a metal such as Ti, Mo, Ta, Cr, or W may be employed.

The conductive film 2105 and the conductive film 2106 are formed by the method described in Embodiment Modes 1 and 2.

Although not shown in the figure, an alignment film is often formed over the conductive film 2105 and the conductive film 2106.

Concerning the opposite electrode 2114, the insulating film 2113, the planarizing film 2112, the black matrix 2115, the color filter 2116, the opposite substrate 2111 and the liquid crystal layer 2110, although they are similar to those described in Embodiment Modes 1 to 4, description is made as an example.

Figure 22:
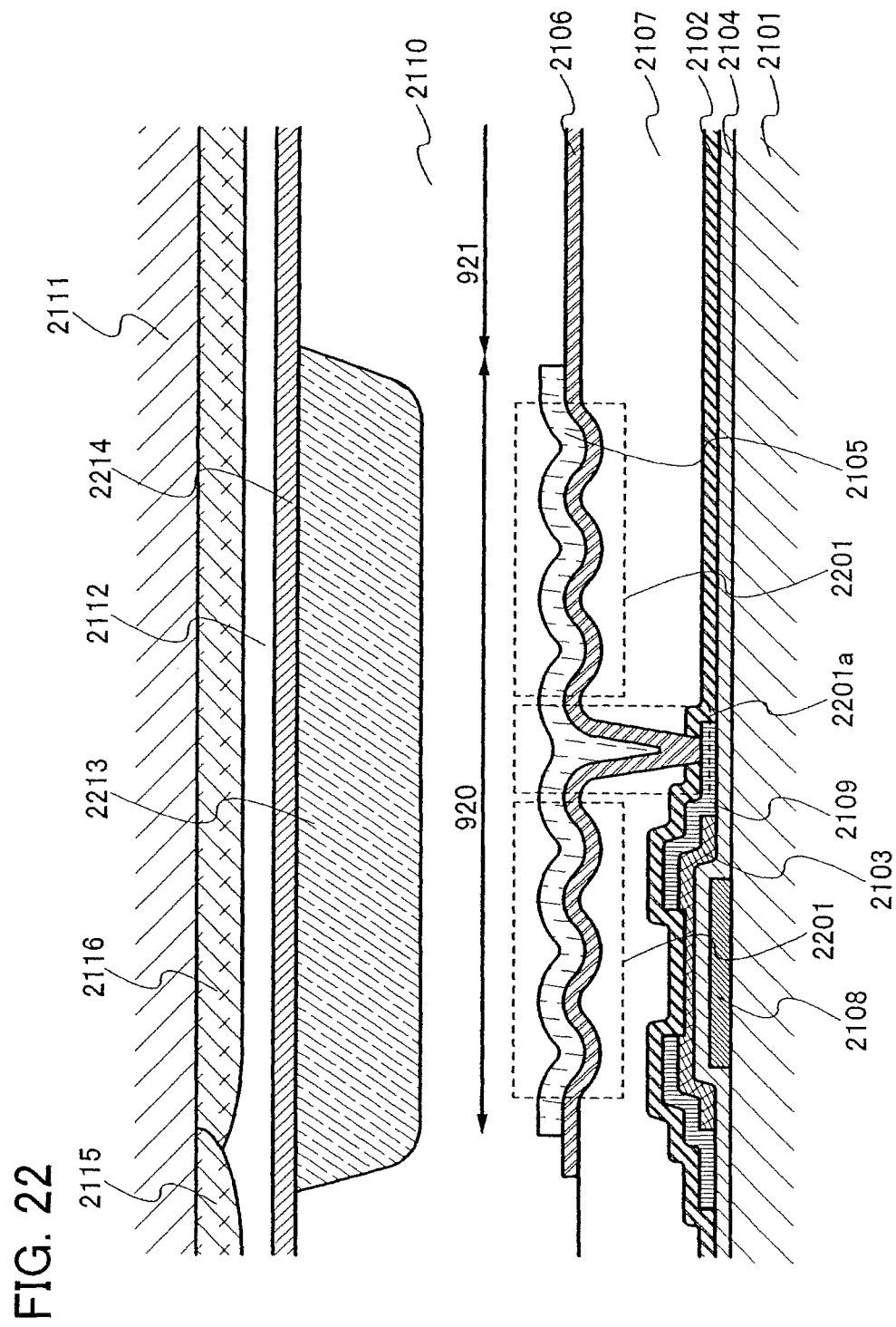
FIG. 22 is a cross sectional view showing a semiconductor device of the invention.

Note that although the reflective electrode is not provided with unevenness in the reflection portion 920 in FIG. 21, unevenness may be formed as shown in FIGS. 5 and 6. This case is shown in FIG. 22. Unevenness may be formed by the method described in FIGS. 7A and 7B. Light can be diffused by unevenness 2201 and a contact hole 2201a.

Note that light scattering particles may be mixed in films 2113 and 2213 for adjusting a thickness. Therefore, light is scattered and luminance can be improved. The light scattering particles are formed of a material having a refractive index different from that of a cell gap adjusting film and formed from a resin material having a light transmitting property. A film for adjusting a cell gap may be formed so as to contain such light scattering particles.

Figure 23:
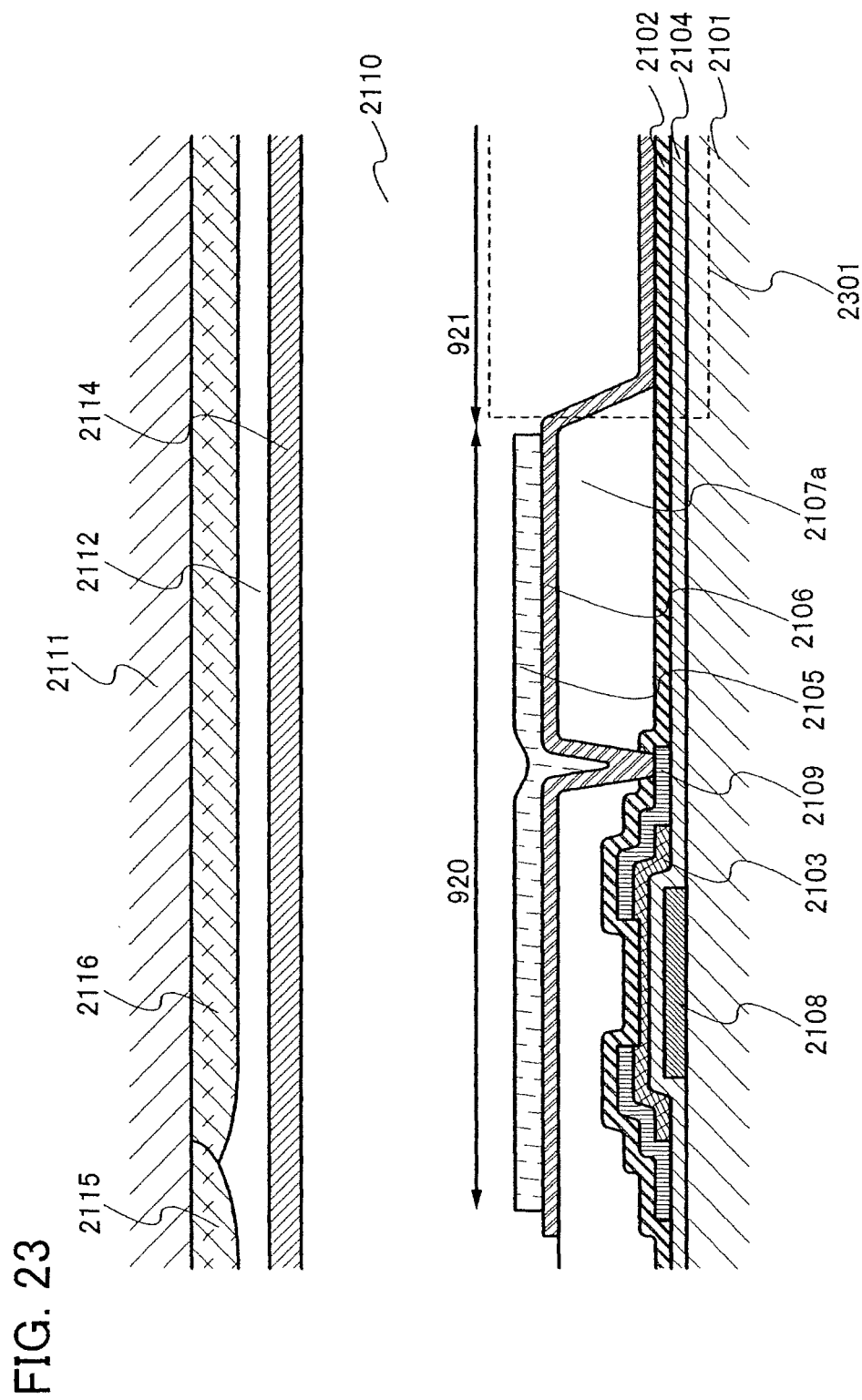
FIG. 23 is a cross sectional view showing a semiconductor device of the invention.
Figure 24:
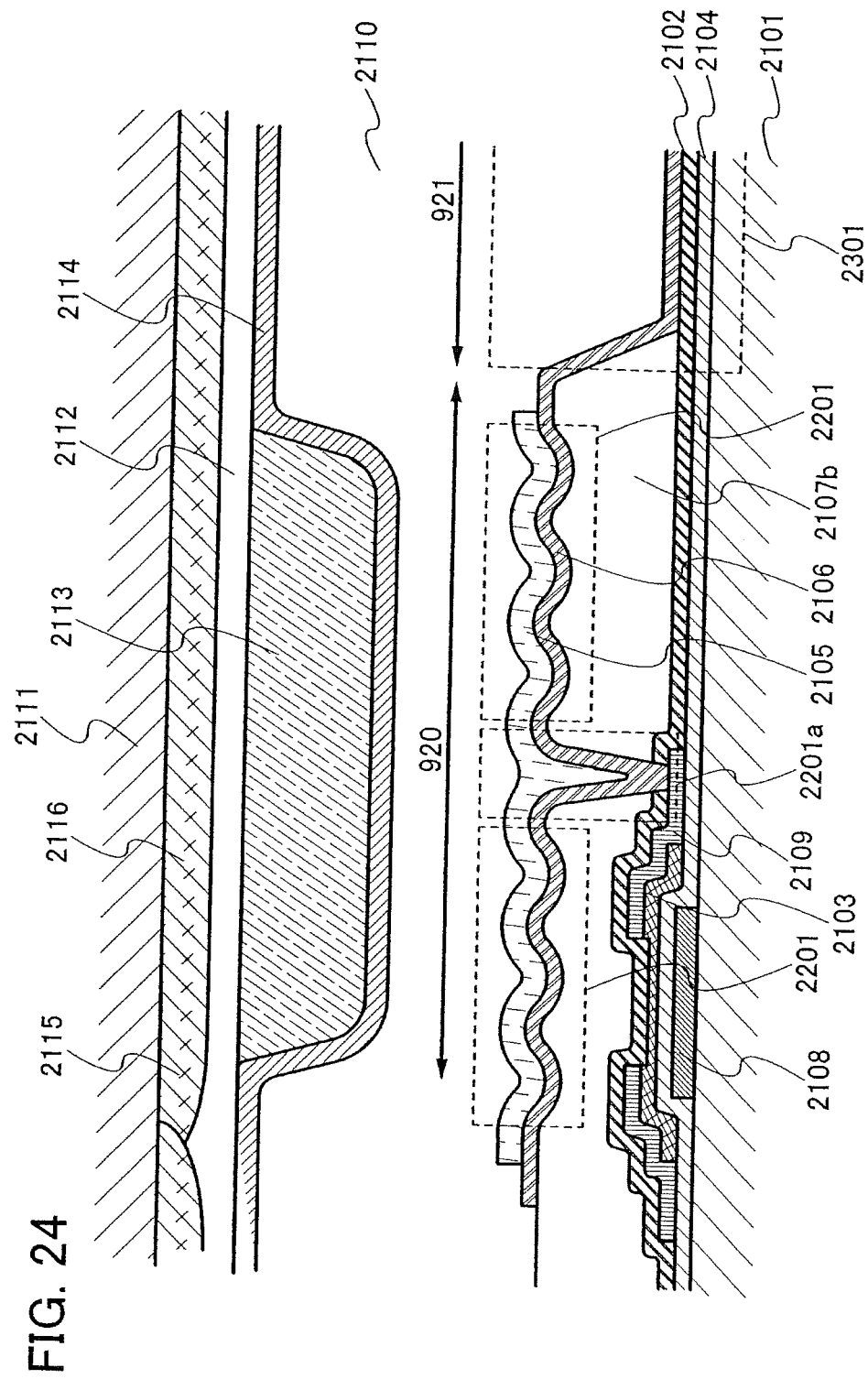
FIG. 24 is a cross sectional view showing a semiconductor device of the invention.

Note that although a thickness adjusting film is provided on the opposite substrate side in FIGS. 21 and 22, the invention is not limited to this. The thickness adjusting film may be provided on a side where a transistor is formed. This case is shown in FIG. 23. Note that FIG. 21 may be combined with FIG. 22. An example of this case is shown in FIG. 24. A depressed portion 2301 corresponds to the depressed portion 801 in FIG. 8. As described above, the depressed portion 2301 is provided in the transmission portion 921; therefore, a cell gap in the transmission portion 921 can be made larger than a cell gap in the reflection portion 920.

Note that although in FIG. 23, a part of an insulating film 2107a is removed in order that the depressed portion 2301 is formed, the invention is not limited to this. Other insulating films may also be removed. For example, a part of the insulating film 2102 as well as the insulating film 2107a may be removed. FIG. 52 shows the case where a part of a gate insulating film 2104e and a substrate 2101e are removed as well. Therefore, a difference in cell gaps between the reflection portion 920 and the transmission portion 921 can be easily made. An insulating film 2102e, the gate insulating film 2104e, the substrate 2101e, and the like may be formed from a film having a similar component in some cases; therefore, a depressed portion 2301e can be formed more deeply.

Note that although both the depressed portion and the thickness adjusting film are formed in FIG. 24, the invention is not limited to this. One of them may be formed. When both of them are provided, a thickness can be controlled by both of them; therefore, each thickness is not required to be made very large, which leads to easy manufacturing.

Figure 25:
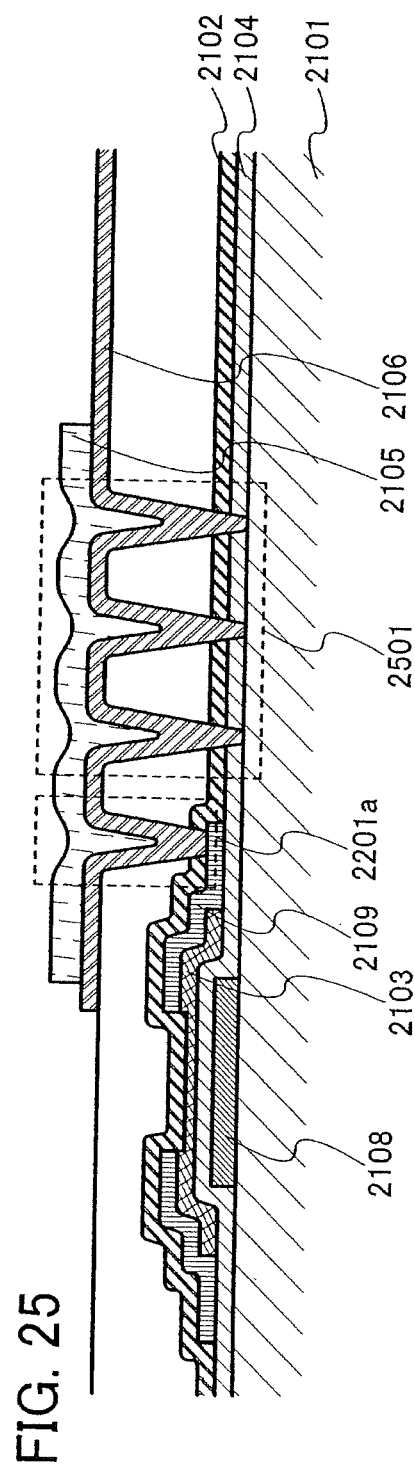
FIG. 25 is a cross sectional view showing a semiconductor device of the invention.

Note that unevenness may be formed using a contact hole. This case is shown in FIG. 25. Unevenness is formed using a contact hole 2501 which is provided in a part where the electrode 2106 is not connected to the drain electrode 2109. A plurality of contact holes 2501 are formed in order that surfaces of a wiring and an electrode are made uneven, but not in order to connect wirings. Note that in the contact hole 2501, similarly in a contact hole 2201a, the electrode 2106 may be in contact with the drain electrode 2109.

Note that the depressed portion 2301 may be provided in the case of FIG. 25.

Figure 26:
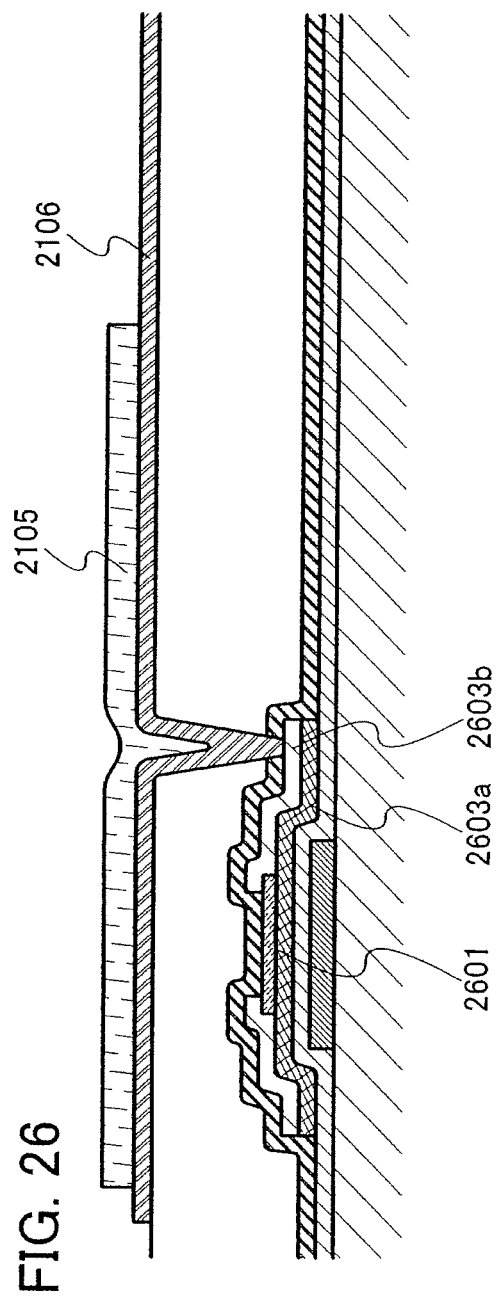
FIG. 26 is a cross sectional view showing a semiconductor device of the invention.

Note that although a channel etch type transistor is used in FIGS. 21 to 25, the invention is not limited to this. A channel protective type transistor may be used. As an example, FIG. 26 shows a cross sectional view when a channel protective type transistor is used in the case of FIG. 21. A channel protective film 2601 is formed over a semiconductor layer 2603a in which a channel is formed. A semiconductor layer and a conductive film (a drain electrode, a source signal line or the like) 2603b containing phosphorus is formed thereover. A channel protective type transistor can be applied to the case of FIGS. 22 to 25 and 49.

A TFT including the channel protective film 2601 has the following effects. The semiconductor layer 2603a can be formed thin since there is no fear that the semiconductor layer is etched, and characteristics of the TFT can be improved. Thus, a large current can be supplied to the TFT and signal writing time can be shortened, which is preferable.

Figure 27:
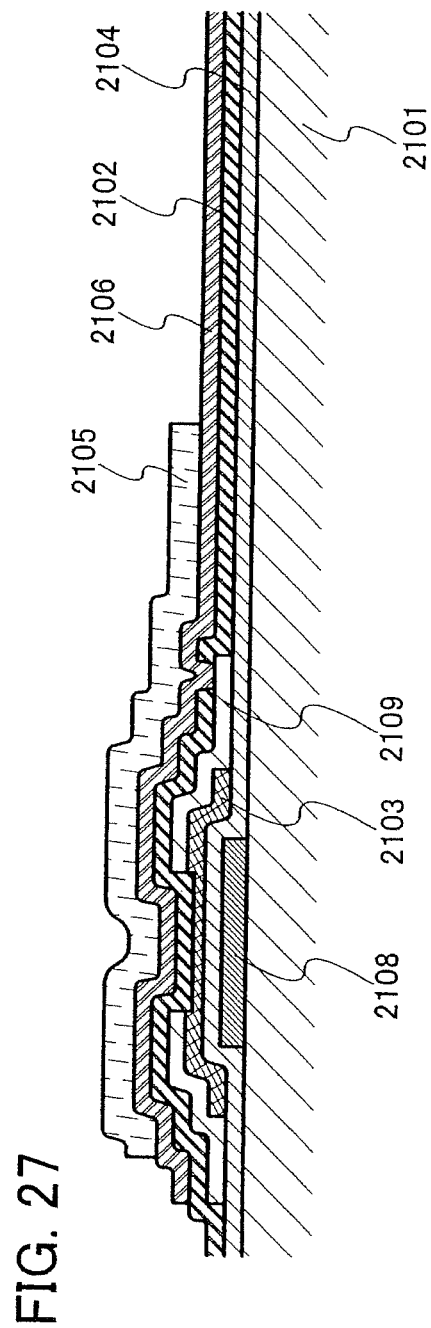
FIG. 27 is a cross sectional view showing a semiconductor device of the invention.

Note that although the insulating film 2107 is formed over the insulating film 2102 in FIGS. 21 to 26 and 49, the invention is not limited to this. The case where planarization is not required can also be realized. FIG. 27 shows a cross sectional view of this case. By not forming the insulating film 2107, the number of steps can be reduced and cost can be reduced. Note that in the case of FIG. 27, a surface of the reflective electrode may be uneven, a thickness adjusting film or a depressed portion may be provided so as to adjust a cell gap, or unevenness of the reflective electrode may be formed using a contact hole.

As described above, there are a plurality of methods for each of presence of unevenness, a forming method of unevenness, and an adjusting method of a cell gap (thickness adjusting is performed on an opposite substrate side or a TFT substrate side). Therefore, any of them may be selected and combined.

Note that this embodiment mode shows an example in the case where description in Embodiment Modes 1 to 4 is concretely realized and a part thereof is described in detail. Therefore, the description in Embodiment Modes 1 to 4 can be applied to this embodiment mode or combined with this embodiment mode.

In addition, description is made with reference to various drawings in this embodiment mode. One drawing consists of various components. Therefore, another structure can be made by combining each of the components from each drawing.

Embodiment Mode 6

Description has been made mainly with reference to cross sectional views so far. In this embodiment mode, a top plan view is described.

Figure 28:
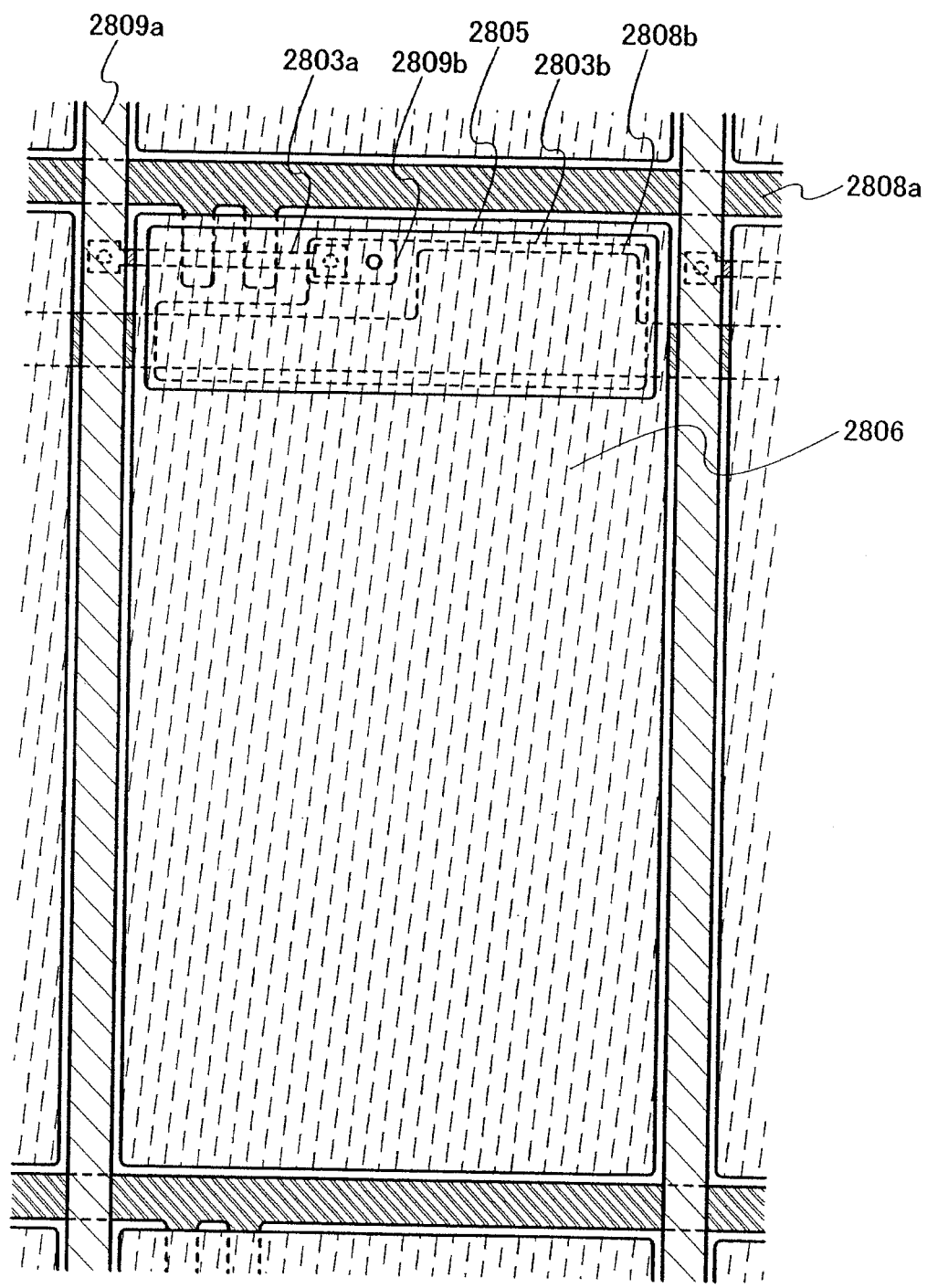
FIG. 28 is a top plan view showing a semiconductor device of the invention.

FIG. 28 is a top plan view which can be applied to the cases in FIGS. 9 and 47. FIG. 28 shows one pixel (one color element). A semiconductor layer 2803a is formed, over which a gate wiring 2808a and a capacitor line 2808b are formed. A transistor is formed by a gate electrode which is a film formed continuously with the gate wiring 2808a and is formed over the semiconductor layer 2803a. The semiconductor layer 2803b is provided below the capacitor line 2808b. A storage capacitor is formed by the capacitor line 2808b and the semiconductor layer 2803b. A capacitor is formed by upper and lower electrodes with a gate insulating film interposed therebetween. In this case, phosphorus or boron may be added, or not, to a region of the semiconductor layer 2803b which functions as an electrode of the capacitor. When phosphorus or boron is not added, a high voltage is applied to the capacitor 2808b. When phosphorus or boron is added, the capacitor line 2808b is often electrically connected to an opposite electrode. Therefore, the number of wirings can be reduced.

A source signal line 2809a and a drain electrode 2809b are formed thereover and connected to the semiconductor layer 2803a through a contact hole.

Note that the drain electrode 2809b may be largely provided so as to make a region which is overlapped with the capacitor line 2808b large; therefore, a capacitance value of the storage capacitor can be increased.

A transparent electrode 2806 is formed thereover and connected to the drain electrode 2809b through a contact hole. A reflective electrode 2805 is formed thereover.

The reflective electrode 2805 is formed over the transistor and the storage capacitor. Therefore, an aperture ration of the transmission portion can be increased and layout can be efficiently designed.

Note that although the capacitor line 2808b is provided, the invention is not limited to this. Instead of the capacitor line 2808b, a gate signal line of one preceding row may be used. That is, a potential of the gate signal line of one preceding row is constant in a non-selected state, thereby functioning as a storage capacitor line.

Figure 29:
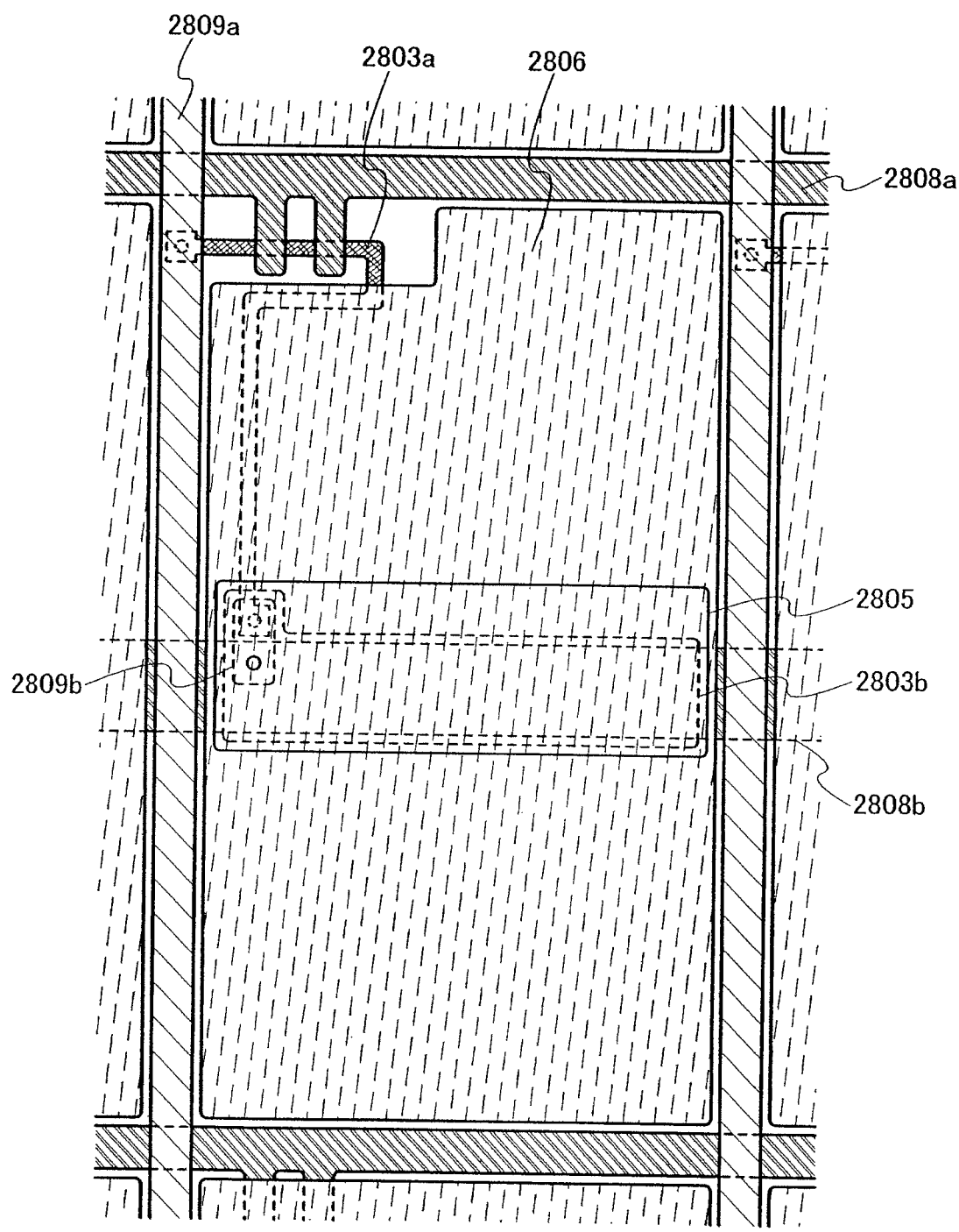
FIG. 29 is a top plan view showing a semiconductor device of the invention.

The storage capacitor is provided at the center part of a pixel electrode in FIG. 29, while the storage capacitor is provided in the vicinity of the transistor in FIG. 28. Therefore, a plurality of transmission regions can be provided in one pixel. Accordingly, a plurality of regions in which alignment states of liquid crystal molecules are different from each other can exist, and a multi-domain structure can be easily realized. A wide viewing angle can be obtained by having a multi-domain structure.

Figure 30:
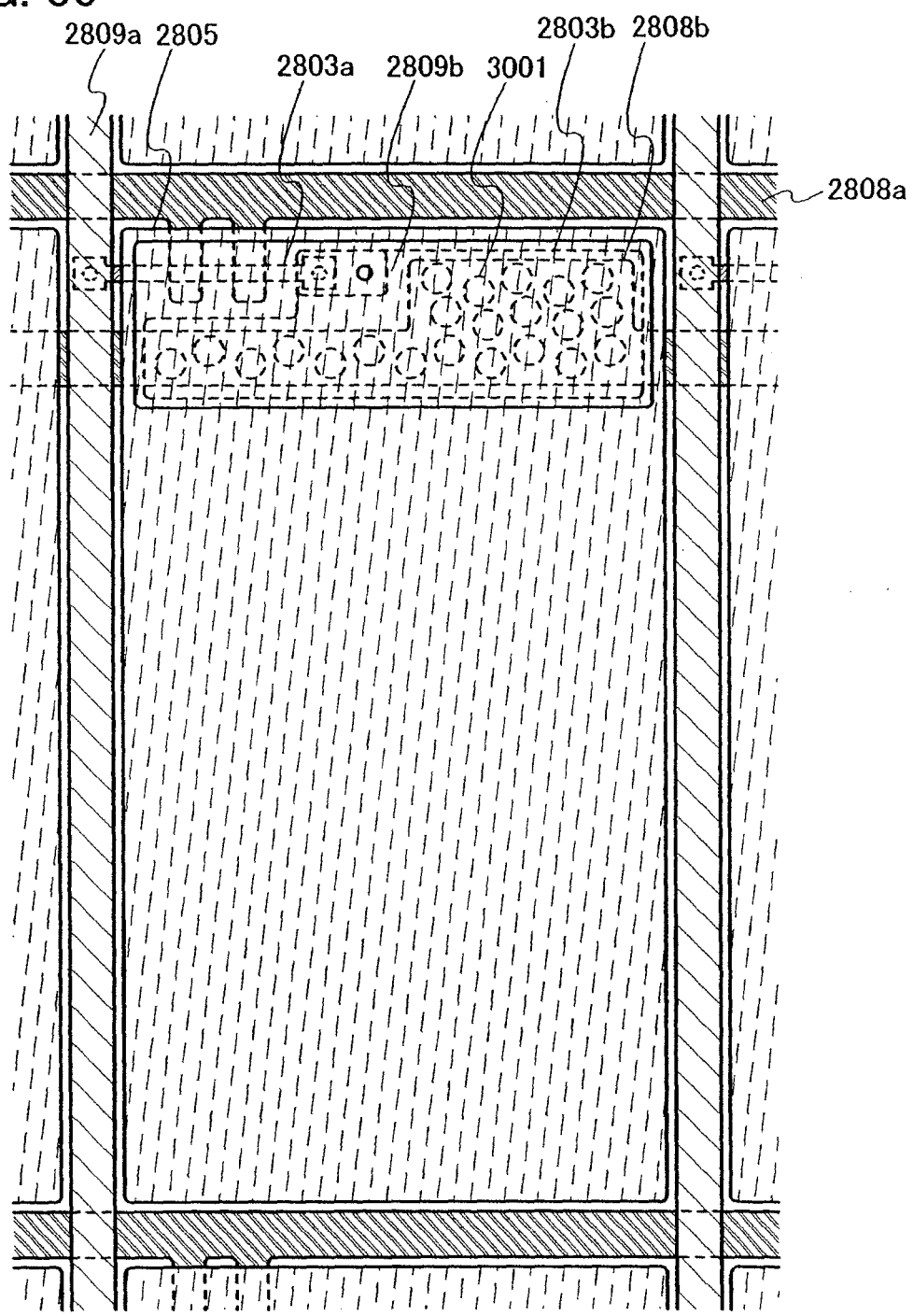
FIG. 30 is a top plan view showing a semiconductor device of the invention.

FIG. 30 shows the case where the reflective electrode is provided with unevenness 3001 with respect to the case of FIG. 27. This corresponds to FIGS. 10 and 13. The reflective electrode is provided with unevenness, so that light is scattered and luminance can be improved.

Figure 31:
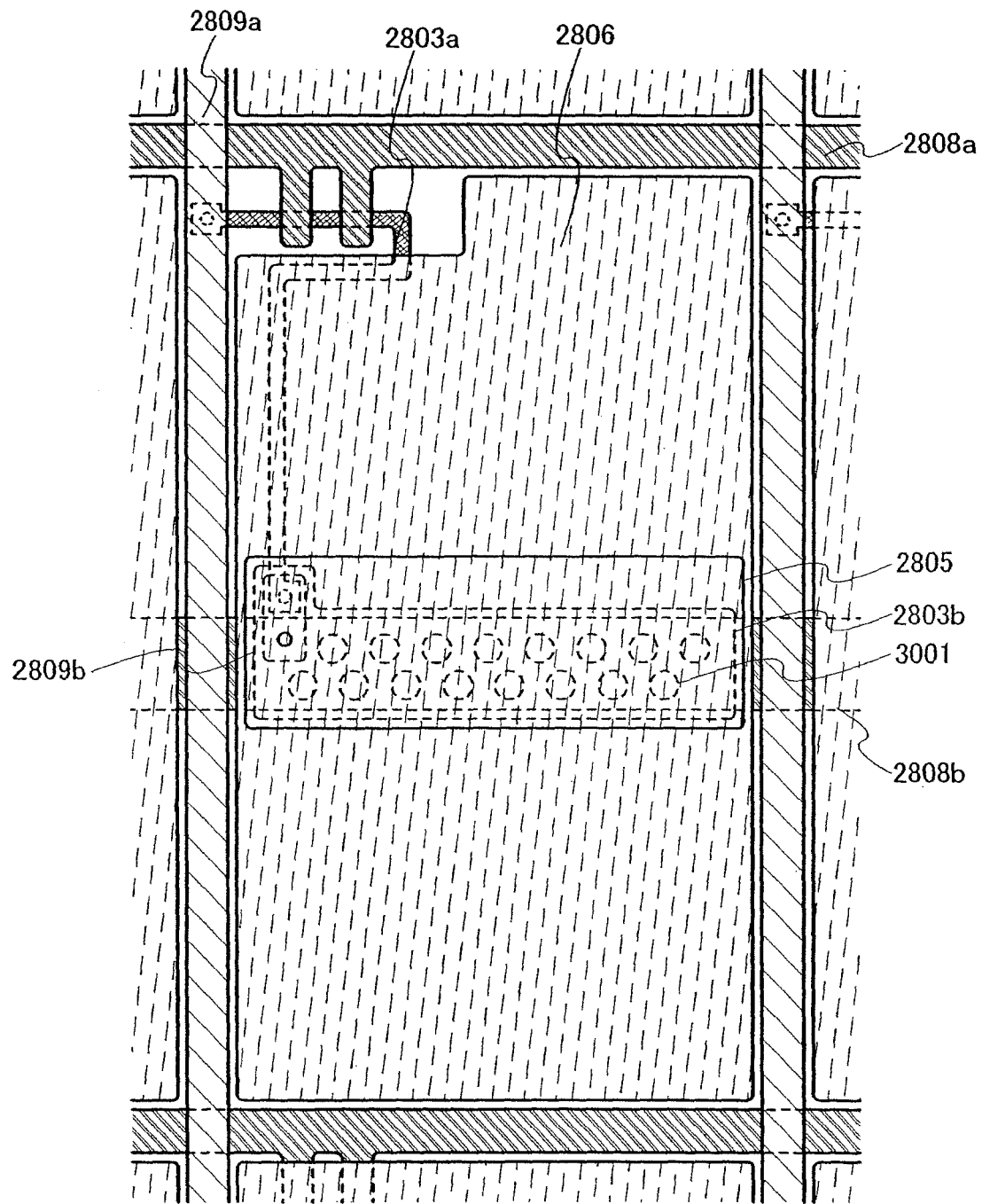
FIG. 31 is a top plan view showing a semiconductor device of the invention.

Similarly, FIG. 31 shows the case where the reflective electrode is provided with the unevenness 3001 with respect to the case of FIG. 29 where the storage capacitor is provided at the center part of the pixel electrode. The reflective electrode is provided with the unevenness, so that light is scattered and luminance can be improved. Further, a plurality of regions in which alignment states of liquid crystal molecules are different from each other can exist, and a multi-domain structure can be easily realized. By having a multi-domain structure, light transmittance can be prevented from decreasing when seen at a specific angle, and a wide viewing angle can be obtained.

Figure 32:
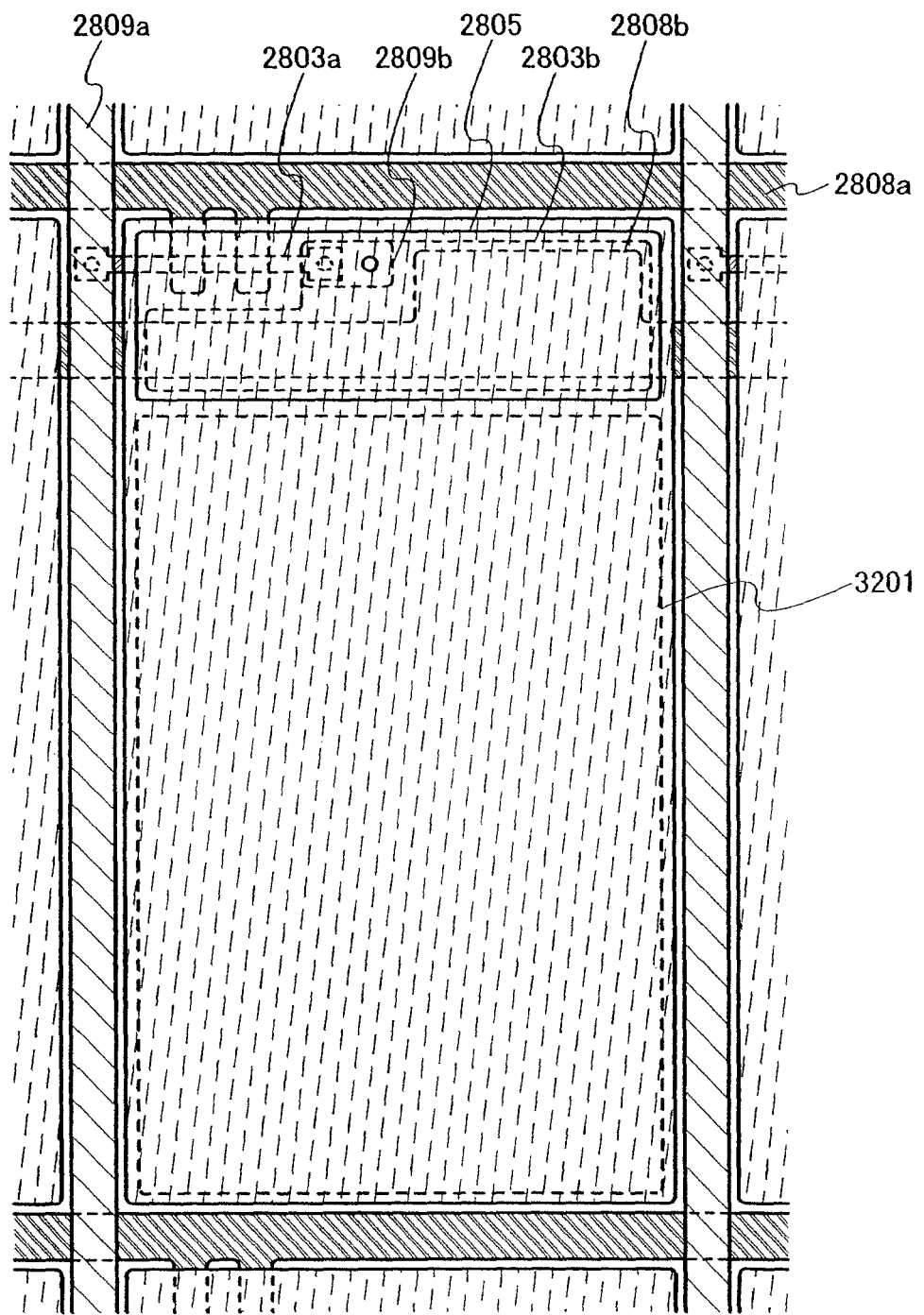
FIG. 32 is a top plan view showing a semiconductor device of the invention.

Next, FIG. 32 shows the case where a depressed portion 3201 is formed as shown in FIG. 11. By forming the depressed portion 3201, a cell gap in the reflection portion and a cell gap in the transmission portion can be easily differentiated; therefore, visibility can be improved and an image with less color unevenness can be displayed with appropriate gray scales. Further, cell gap adjustment can be realized simultaneously on a side of a substrate where the transistor, the capacitor, the wiring, and the like are provided; therefore, cell gap adjustment can be realized with a small number of steps and at low cost.

Figure 33:
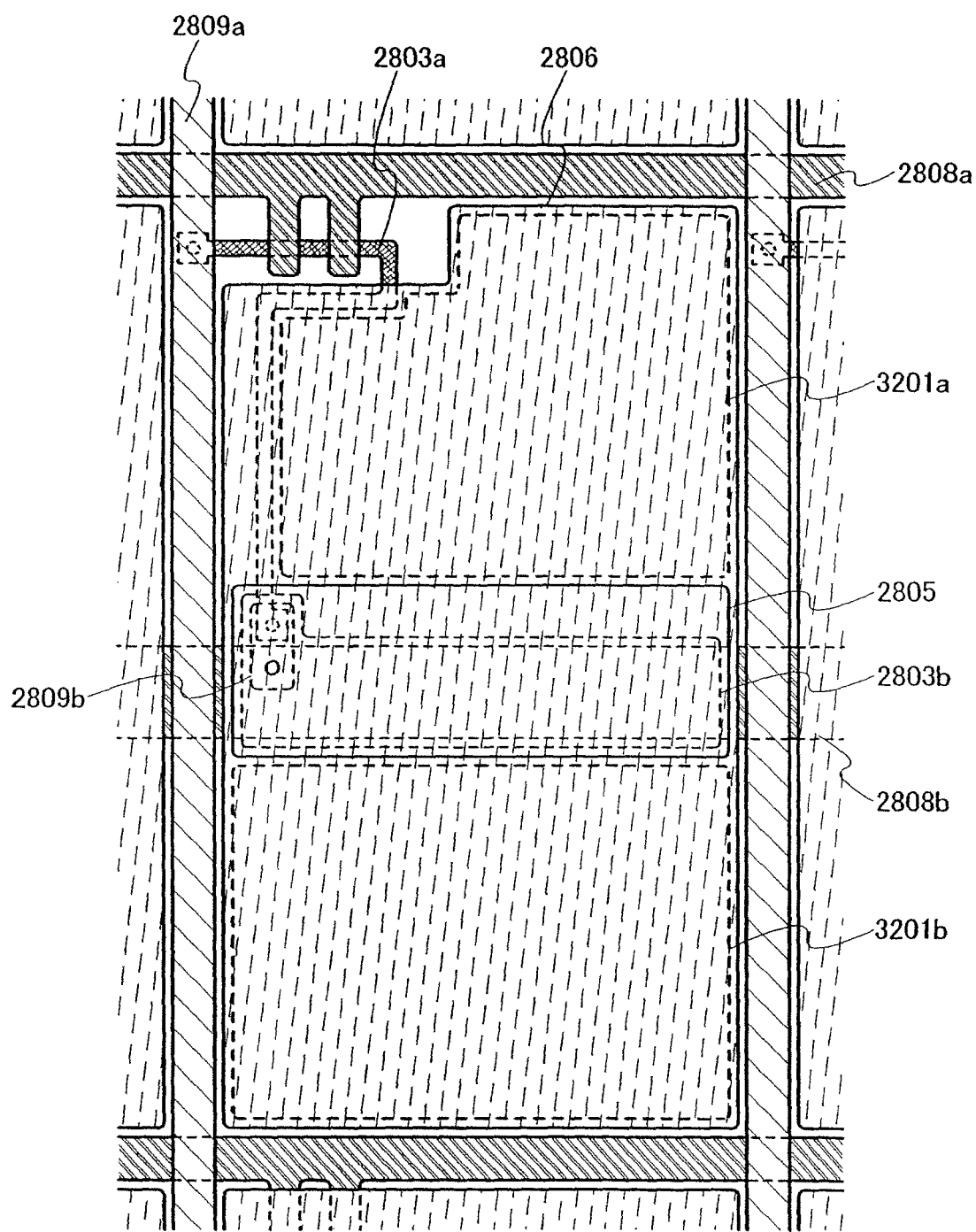
FIG. 33 is a top plan view showing a semiconductor device of the invention.

Similarly, FIG. 33 shows the case where unevenness 3201a and unevenness 3201b are formed with respect to the case of FIG. 29 where the storage capacitor is provided at the center part of the pixel electrode.

In FIGS. 28 to 33, description is made of the case where a pixel electrode is provided all over each pixel. This mainly corresponds to the case of being used as the TN liquid crystal.

As shown in FIGS. 18 and 19, the pixel electrode can be provided with a slit or divided so as to be arranged at intervals.

Figure 34:
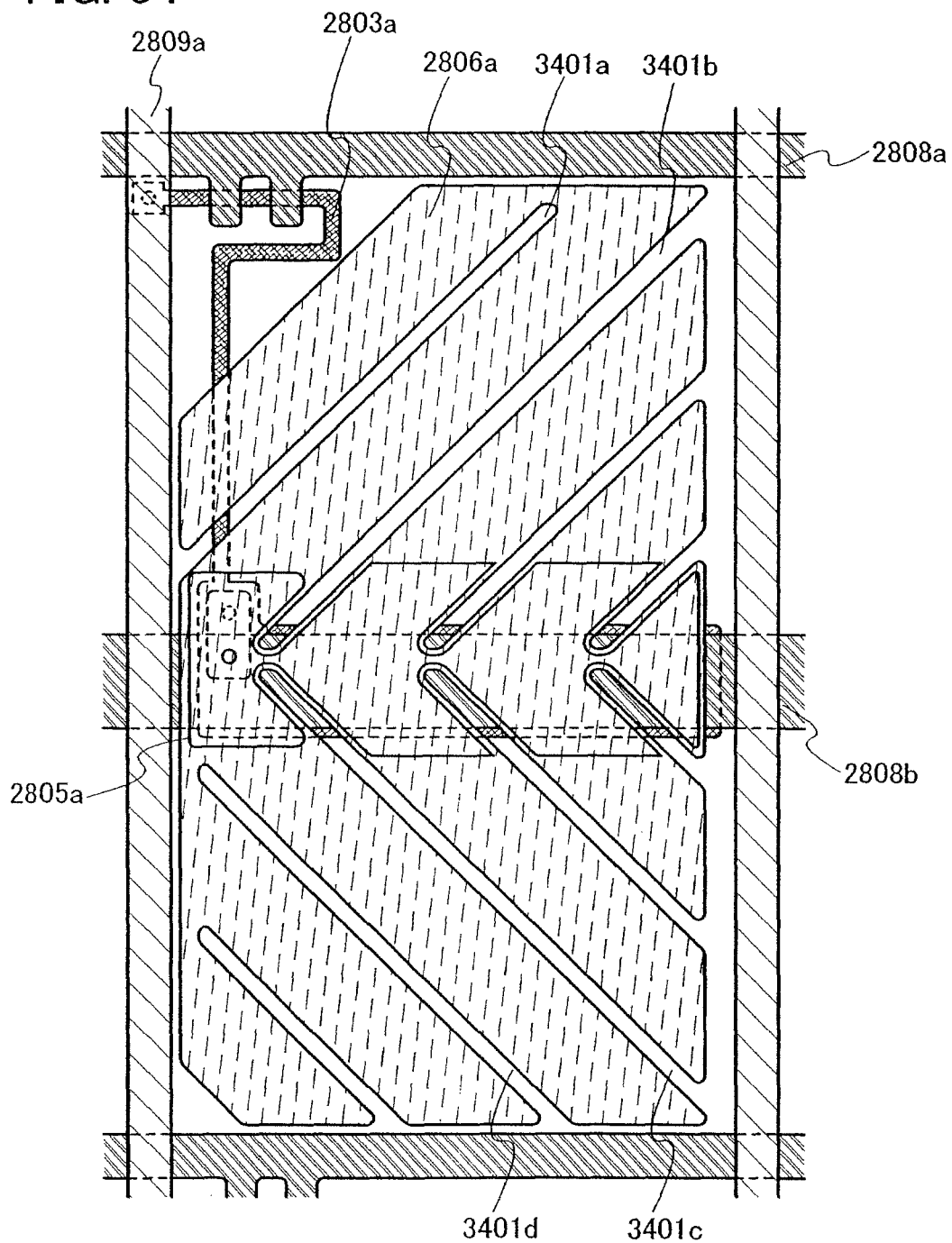
FIG. 34 is a top plan view showing a semiconductor device of the invention.

FIG. 34 is a top plan view, which corresponds to the MVA mode, the PVA mode, or the like by providing the pixel electrode with a slit or by dividing the pixel electrode so as to be arranged at intervals. Slits 3401a, 3401b, 3401c, 3401d, and the like are formed both in the transmission region and the reflection region, and thereby a direction of tilt of liquid crystal molecules can be determined.

A storage capacitor portion is provided below the reflection portion; therefore, an aperture ratio of the transmission portion can be increased and layout can be efficiently designed.

The reflection portion and the storage capacitor are provided in the center portion of the pixel electrode and transmission portions are provided adjacent thereto; therefore, a plurality of transmission portions can be provided in one pixel. Accordingly, a plurality of regions in which alignment states of liquid crystal molecules are different from each other can exist, and a multi-domain structure can be easily realized. By having a multi-domain structure, light transmittance can be prevented from decreasing when seen at a specific angle, and a wide viewing angle can be obtained.

Figure 35:
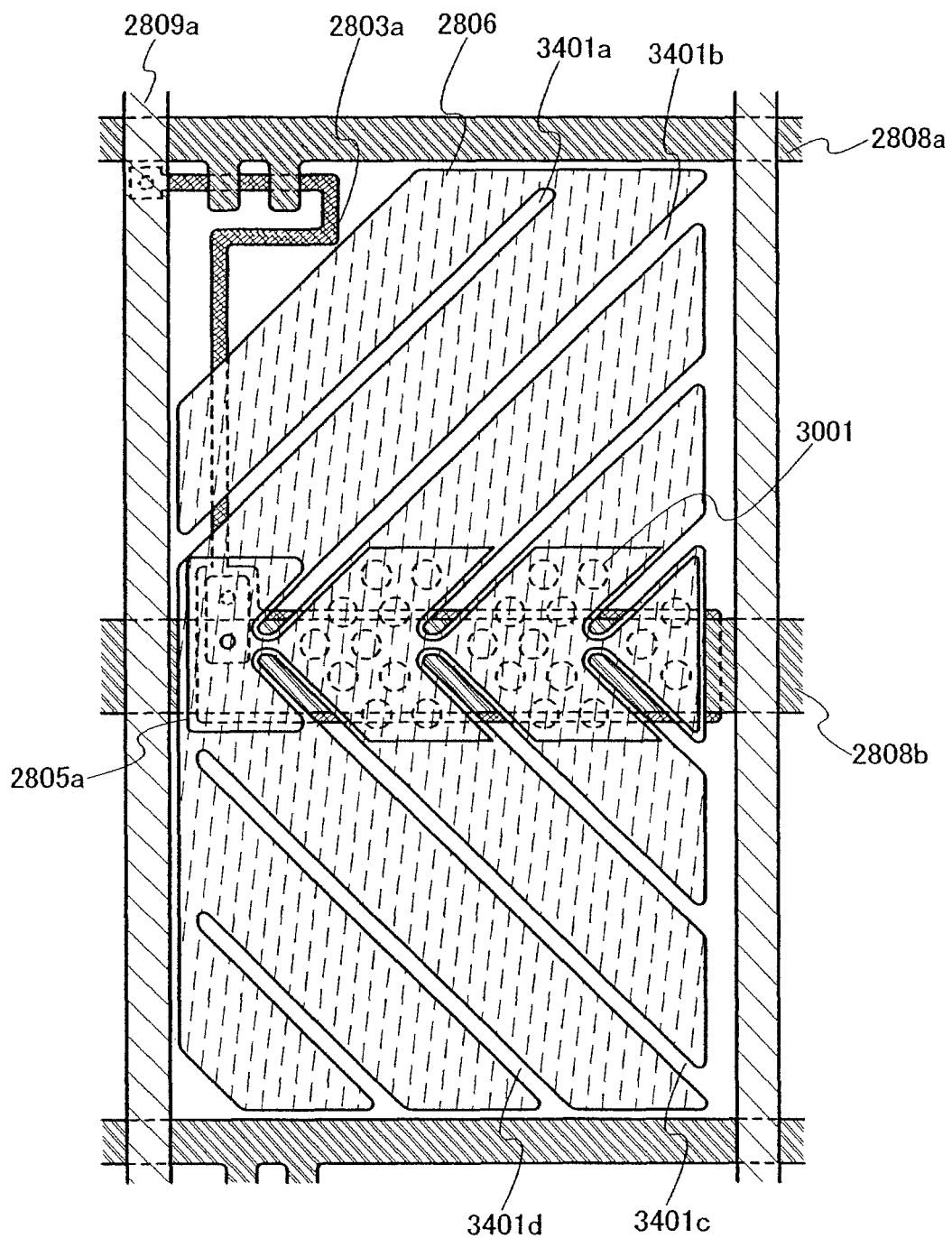
FIG. 35 is a top plan view showing a semiconductor device of the invention.

FIG. 35 shows the case where unevenness 3001 is formed in the transmission portion. The reflective electrode is provided with the unevenness, so that light is scattered and luminance can be improved.

As described above, the structure where the pixel electrode is provided with a slit or divided so as to be arranged at intervals can also be applied to FIGS. 28 to 33.

Note that a method of forming a slit is not limited to FIGS. 34 and 35, and various ways of arrangement can be employed.

Although FIGS. 28 to 35 show examples in the case of using a transistor with a top gate structure, the invention is not limited to these and a structure other than these can be employed. Next, an example of using a transistor with an inversed staggered structure is shown.

Figure 36:
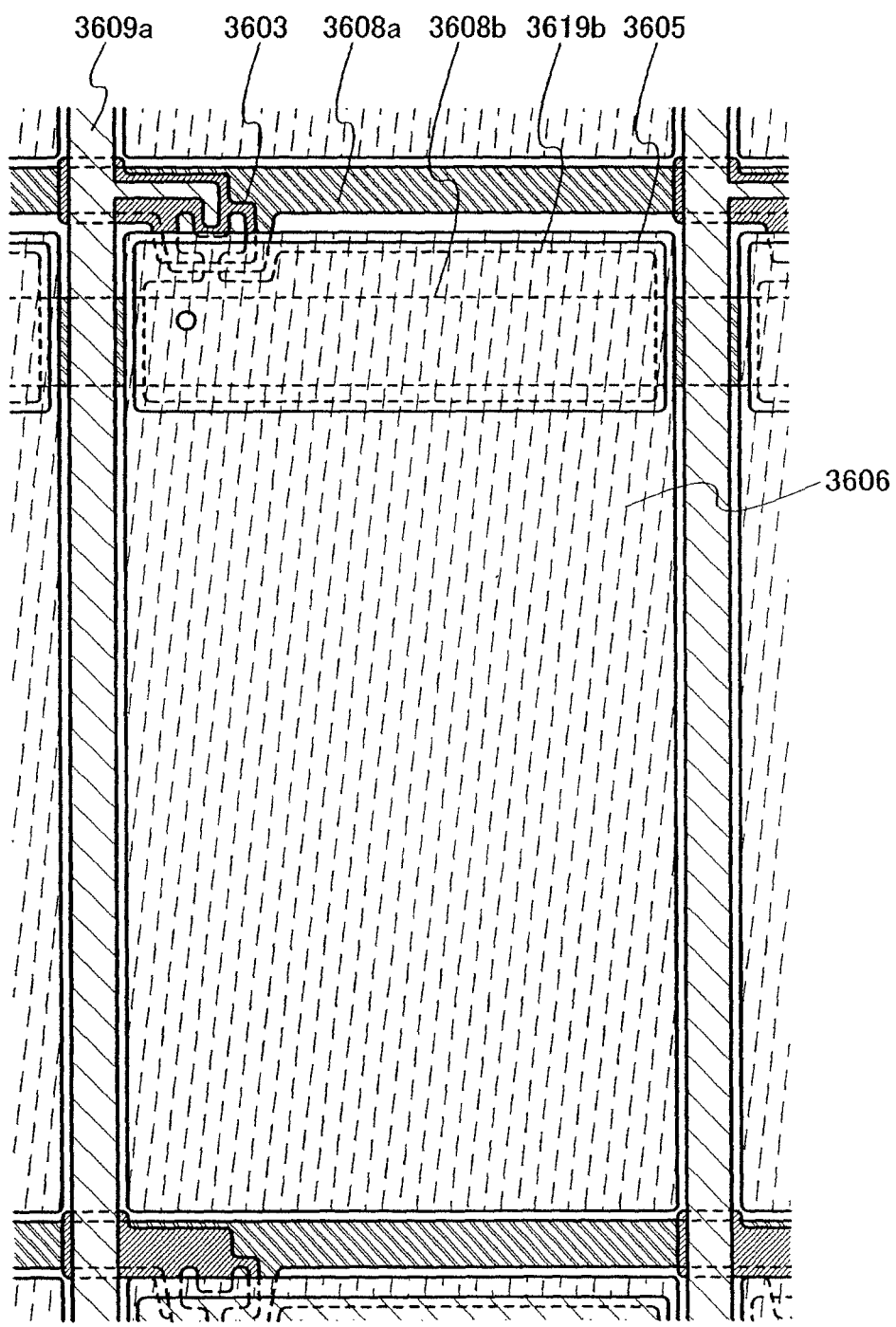
FIG. 36 is a top plan view showing a semiconductor device of the invention.

FIG. 36 corresponds to FIG. 21. A gate wiring 3608*a* and a capacitor line 3608*b* are formed. A semiconductor layer 3603 is formed thereover. A transistor is formed by a gate electrode which is a film formed continuously with the gate wiring 3608*a* and is formed below the semiconductor layer 3603. A source signal line 3609*a* and a drain electrode 3619*b* are formed thereover. The drain electrode 3619*b* is formed over the capacitor line 3608*b*, where the storage capacitor is formed. A capacitor is formed by upper and lower electrodes with a gate insulating film interposed therebetween. A transparent electrode 3606 is formed thereover and connected to the drain electrode 3619*b* through a contact hole. A reflective electrode 3605 is formed thereover.

The reflective electrode 3605 is formed over the transistor and the storage capacitor. Therefore, an aperture ratio of the transmission portion can be increased and layout can be efficiently designed.

Although the storage capacitor is provided in the vicinity of the transistor in FIG. 36, the storage capacitor may be provided at the center part of the pixel electrode. Therefore, a plurality of transmission portions can be provided in one pixel. Accordingly, a plurality of regions in which alignment states of liquid crystal molecules are different from each other can exist, and a multi-domain structure can be easily realized. By having a multi-domain structure, light transmittance can be prevented from decreasing when seen at a specific angle, and a wide viewing angle can be obtained.

Figure 37:
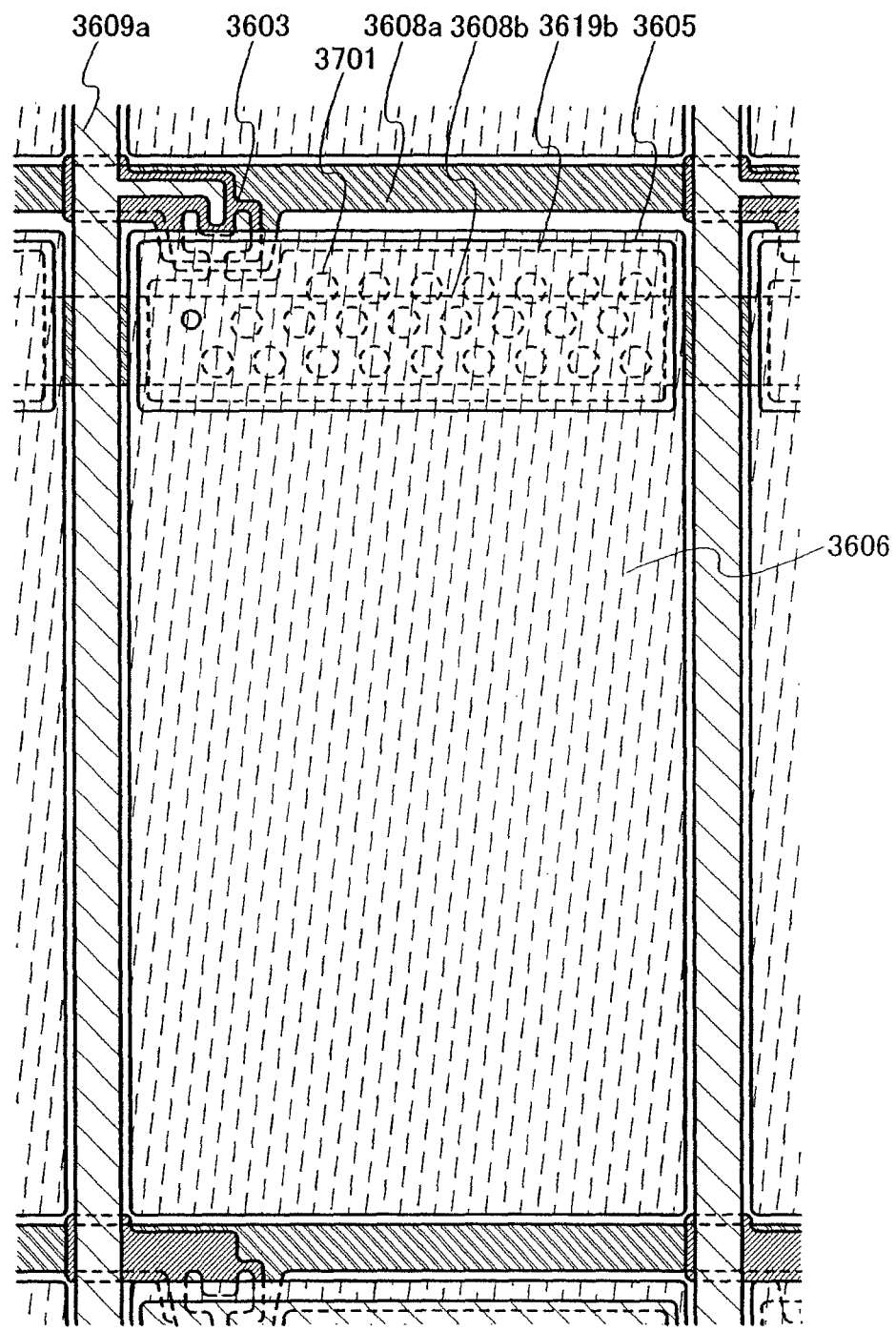
FIG. 37 is a top plan view showing a semiconductor device of the invention.

FIG. 37 shows the case where the reflective electrode is provided with unevenness 3701 with respect to FIG. 36. By forming unevenness over the reflective electrode, light is scattered and luminance can be improved.

Figure 38:
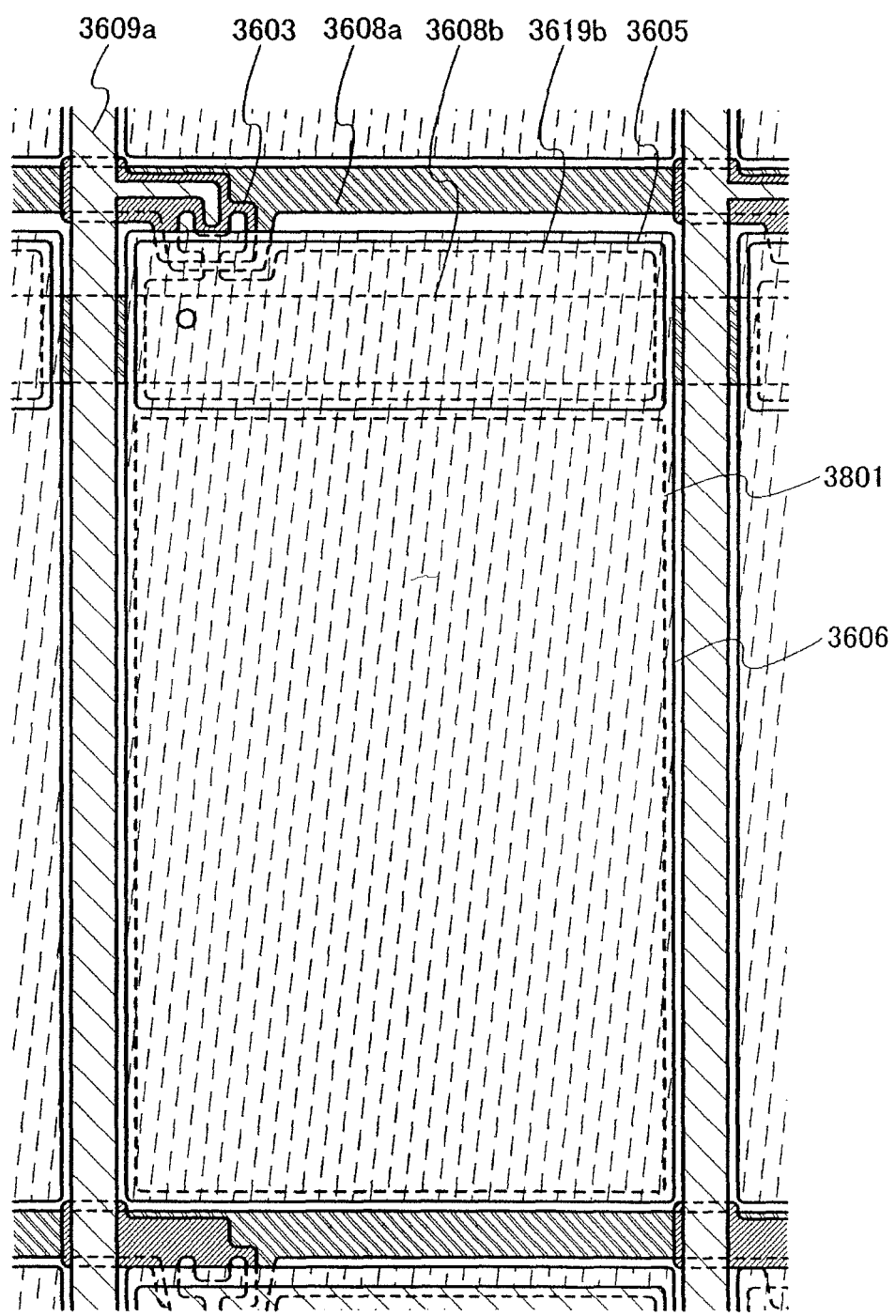
FIG. 38 is a top plan view showing a semiconductor device of the invention.

FIG. 38 shows the case where a depressed portion 3801 is formed as shown in FIG. 23. By forming the depressed portion 3801, a cell gap in the reflection portion and a cell gap in the transmission portion can be easily differentiated; therefore, visibility can be improved and an image with less color unevenness can be displayed with appropriate gray scales.

In FIGS. 36 to 38, description is made of the case where a pixel electrode is provided all over each pixel. This mainly corresponds to the case of being used as the TN liquid crystal.

As shown in FIGS. 18 and 19, the pixel electrode can be provided with a slit or divided so as to be arranged at intervals.

Figure 39:
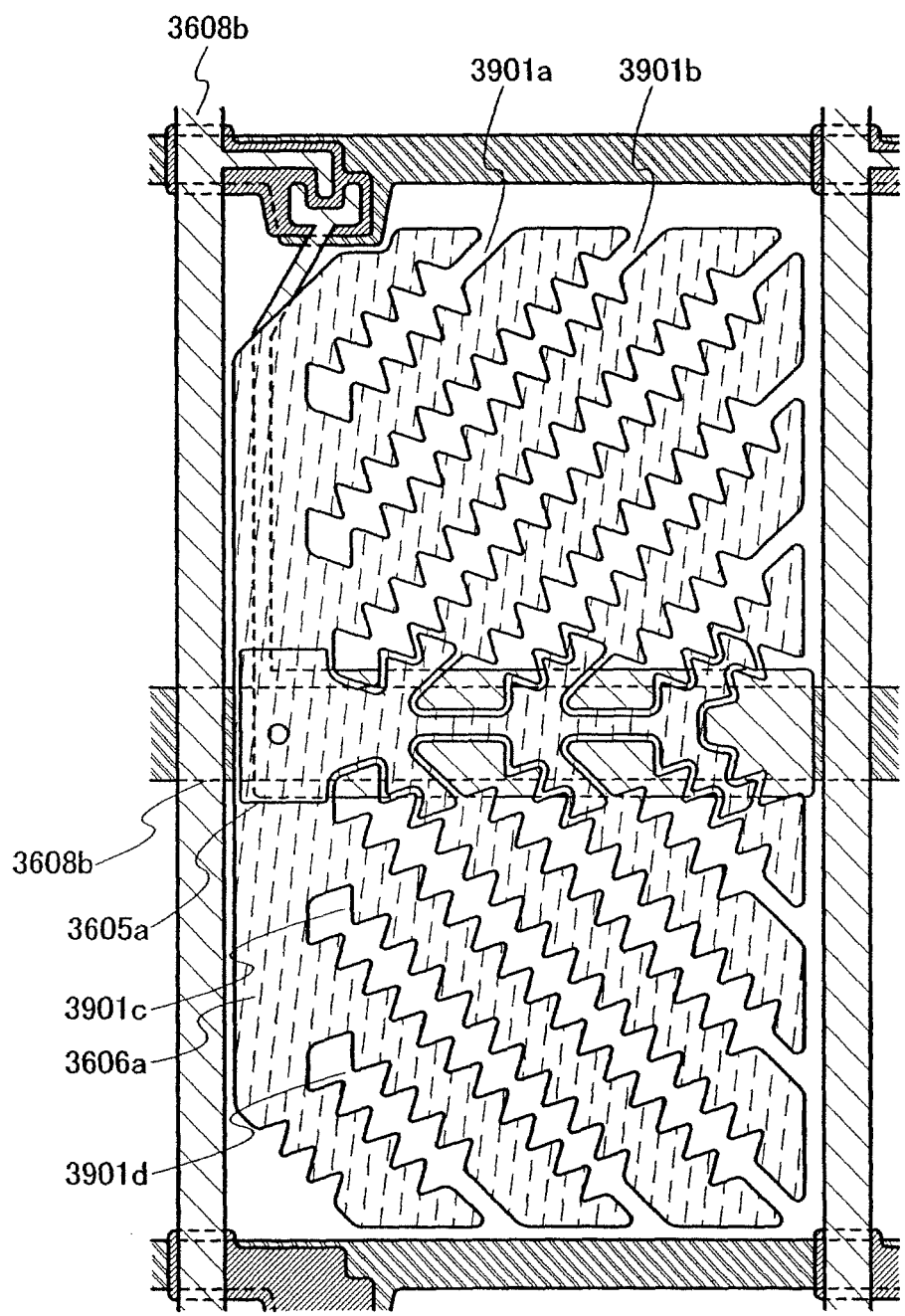
FIG. 39 is a top plan view showing a semiconductor device of the invention.

FIG. 39 is a top plan view, which corresponds to the MVA mode, the PVA mode, or the like by providing the pixel electrode with a slit or by dividing the pixel electrode so as to be arranged at intervals. Slits 3901*a*, 3901*b*, 3901*c*, 3901*d*, and the like are formed both in the transmission region and the reflection region, and thereby a direction of inclination of liquid crystal molecules can be determined.

A storage capacitor portion is provided below the reflection portion; therefore, an aperture ratio of the transmission portion can be increased and layout can be efficiently designed.

The reflection portion and the storage capacitor are provided in the center portion of the pixel electrode and transmission portions are provided adjacent thereto; therefore, a multi-domain structure can be easily realized. By having a multi-domain structure, light transmittance can be prevented from decreasing when seen at a specific angle, and a wide viewing angle can be obtained.

Note that unevenness may be formed in the reflection portion (over a reflective electrode 3605*a*).

Note that the slits in FIG. 39 are wave-shaped, and thereby liquid crystal molecules can be more easily controlled.

As described above, the structure where the pixel electrode is provided with a slit or divided so as to be arranged at intervals can also be applied to other top plan views.

Note that a method of forming a slit is not limited to FIG. 39, and various ways of arrangement can be employed.

Note that this embodiment mode shows an example in the case where the description in Embodiment Modes 1 to 5 is concretely realized and a part thereof is described in detail. Therefore, the description in Embodiment Modes 1 to 5 can be applied to this embodiment mode or combined with this embodiment mode.

In addition, description is made with reference to various drawings in this embodiment mode. One drawing consists of various components. Therefore, another structure can be made by combining each of the components from each drawing.

Embodiment Mode 7

Figure 20A:
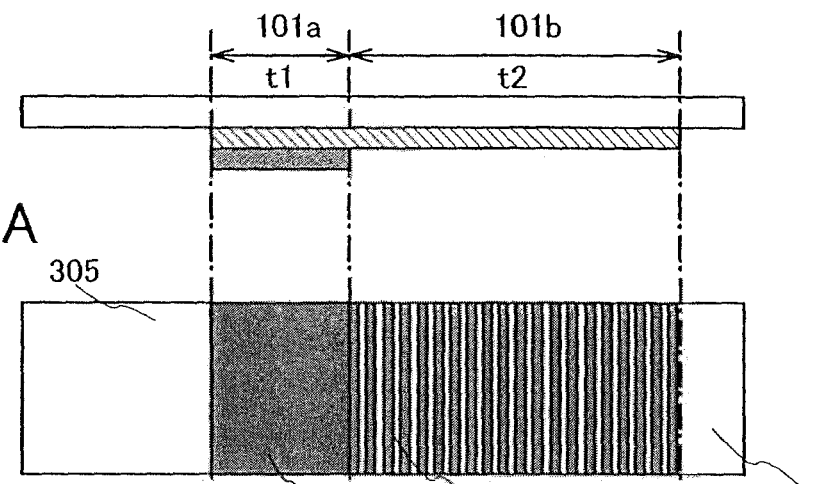
FIGS. 20A to 20C are top plan views showing a light exposure mask.
Figure 20B:
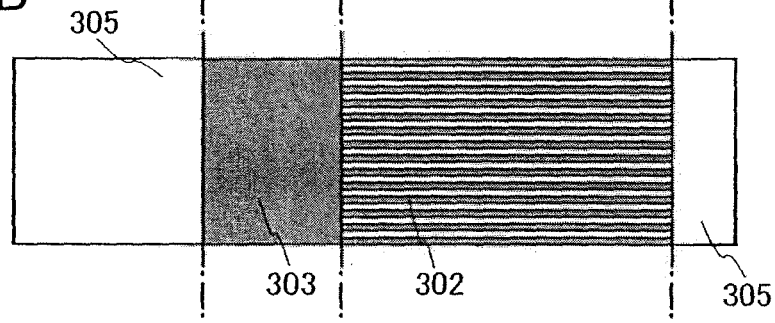
Figure 20C:
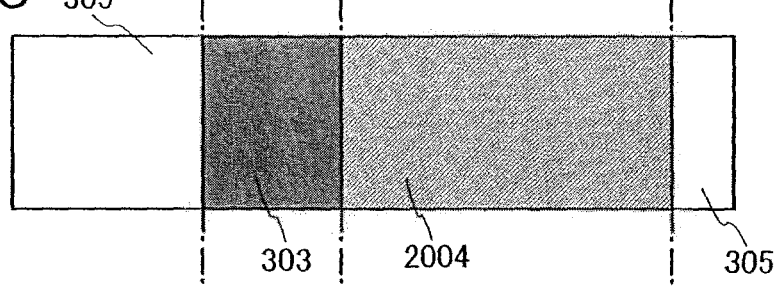

In this embodiment mode, description is made of the light exposure mask used in Embodiment Modes 1 to 6, with reference to FIGS. 20A to 20D. FIGS. 20A to 20C are top plan views of the light shielding portion 101*a* and the semi-transmission portion 101*b* of the light exposure mask shown in FIGS. 1A to 1C, 3A, 3B, 7A, 7B, and 8A and 8B. A width of a light shielding portion 101*a* of the light exposure mask is denoted by t1, and a width of a semi-transmission portion 101*b* thereof is denoted by t2.

The semi-transmission portion 101*b* can be provided with a diffraction grating pattern. Each of FIGS. 20A and 20B shows a diffraction grating pattern including a slit portion formed by a plurality of slits which is equal to or smaller than a resolution limit of a light exposure apparatus. The diffraction grating pattern is a pattern in which at least one pattern such as a slit or a dot is arranged. When a plurality of patterns such as slits or dots is arranged, the patterns may be arranged periodically or aperiodically. By using a minute pattern which is equal to or smaller than a resolution limit, a substantial amount of exposure can be changed and a thickness of a resist exposed to light after development can be adjusted.

The slit of the slit portion may be extended in a direction parallel to one side of a light shielding portion 303 like a slit portion 301; or in a direction perpendicular to one side of the light shielding portion 303 like a slit portion 302. The slit of the slit portion may be extended in an oblique direction with respect to one side of the light shielding portion 303. Note that a resist used for this photolithography step is preferably a positive type resist.

As another example of the semi-transmission portion, FIG. 20C shows an example where a semi-transmission film 2004 having a function of reducing intensity of exposure light is provided. As the semi-transmission film, MoSi, MoSiO, MoSiON, CrSi, or the like as well as MoSiN can be used. A light exposure method using a light exposure mask including a semi-transmission portion is referred to as a half-tone light exposure method.

Figure 20D:
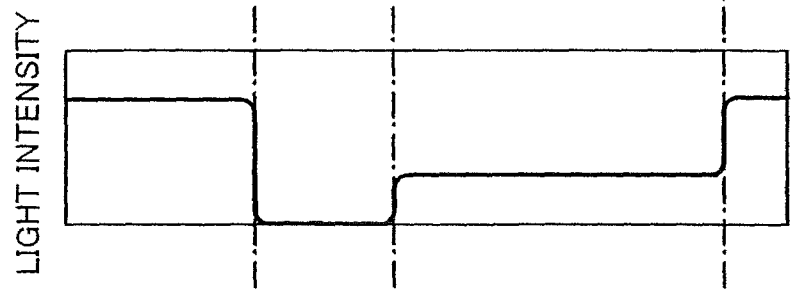
FIG. 20D is a diagram showing light intensity distribution.

When the light exposure masks shown in FIGS. 20A to 20C are irradiated with exposure light, the light intensity is zero in the light shielding portion 303 and the light intensity is 100% in a light transmitting portion 305. On the other hand, the intensity of light passing through the semi-transmission portion having a light intensity reduction function formed by the slit portion 301 or 302, or the semi-transmission film 2004, can be adjusted in the range of 10 to 70%. FIG. 20D shows a typical example of a light intensity distribution. When the semi-transmission portion is a diffraction grating pattern, adjustment of the intensity of light passing through the semi-transmission portion can be realized by adjustment of the pitch and the slit width of the slit portions 301 and 302.

This embodiment mode can be freely combined with Embodiment Modes 1 to 6.

Embodiment Mode 8

Figure 45:
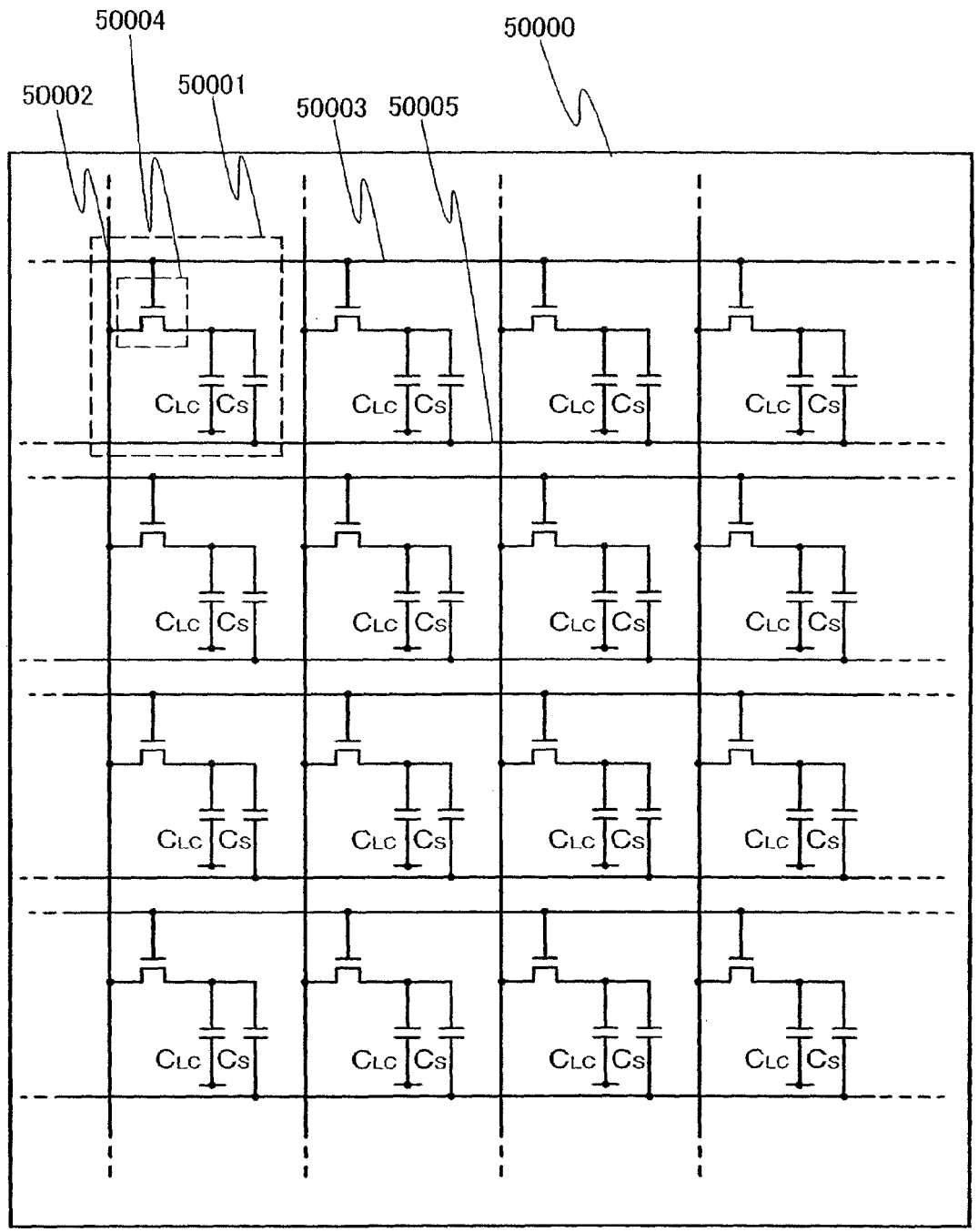
FIG. 45 is a circuit diagram of a liquid crystal display device of the invention.

Description is made of a pixel circuit of the invention. In FIG. 45, pixels 50001 are arranged in matrix in a pixel array 50000. The pixel 50001 is connected to a source signal line 50002 to which a video signal is inputted and a gate signal line 50003 to which a gate signal is inputted. A transistor 50004 is controlled by using these signals so that a video signal is inputted to a liquid crystal $C_{LC}$ and a storage capacitor $C_S$. The storage capacitor $C_S$ is connected to a storage capacitor line 50005. Light transmittance of the liquid crystal $C_{LC}$ is changed in accordance with the video signal; therefore, an image is displayed.

Figure 46:
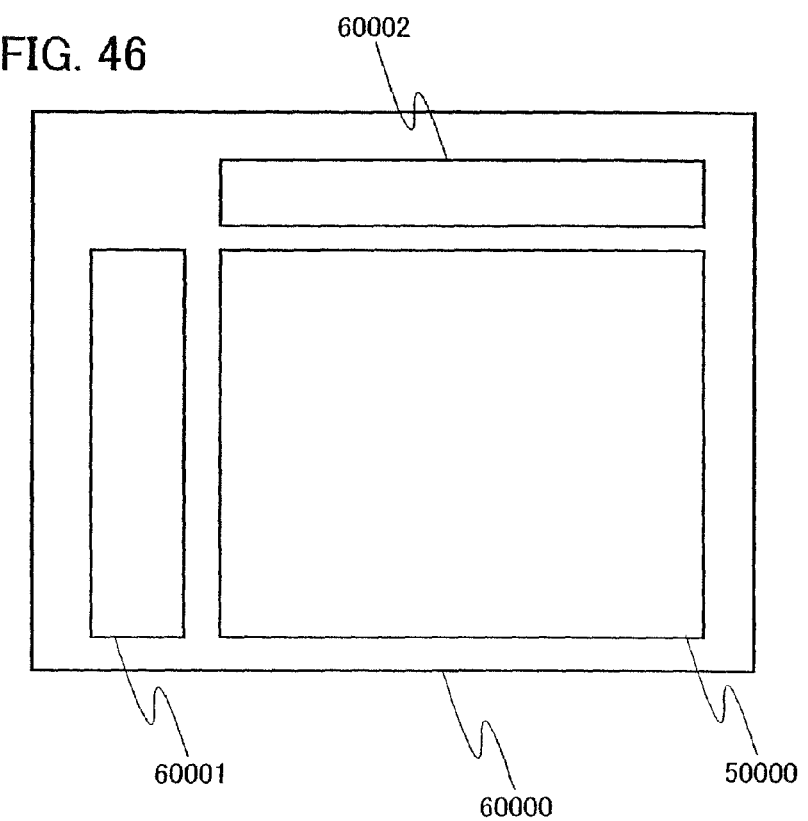
FIG. 46 is a block diagram of a circuit configuration of a liquid crystal display device of the invention.

As shown in FIG. 46, at least the pixel array 50000 is provided over a glass substrate 60000. A gate signal line driver circuit 60001 for driving the gate signal line and a source signal line driver circuit 60002 for supplying a video signal to the source signal line may be provided in some cases. Both of them may be provided in some cases and one of them may be provided in other cases.

The source signal line driver circuit 60002 includes a shift register, a sampling switch, a latch circuit, a D/A converter circuit, or the like; however, the invention is not limited to this. Only a sampling switch may be provided and a shift register and the like are not provided in some cases.

Note that this embodiment mode shows an example in the case where the description in Embodiment Modes 1 to 7 is concretely realized and a part thereof is described in detail. Therefore, the description in Embodiment Modes 1 to 7 can be applied to this embodiment mode or combined with this embodiment mode.

In addition, description is made with reference to various drawings in this embodiment mode. One drawing consists of various components. Therefore, another structure can be made by combining each of the components from each drawing.

Embodiment Mode 9

Figure 40:
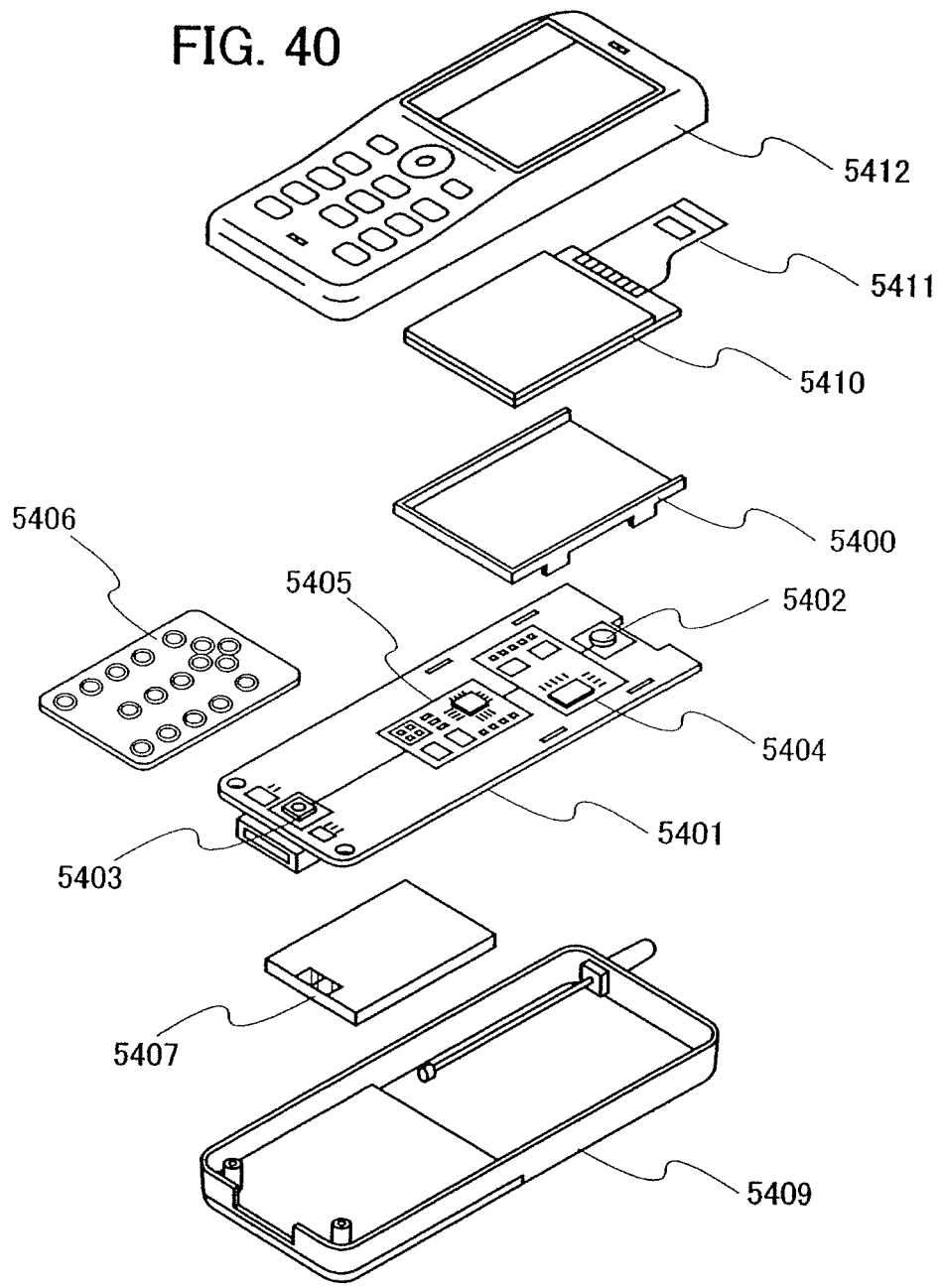
FIG. 40 is a view illustrating one mode of an electronic apparatus to which the invention is applied.

A structure example of a mobile phone in which a display device of the invention is included in a display portion is described with reference to FIG. 40.

A display panel 5410 is detachably incorporated into a housing 5400. A shape and size of the housing 5400 can be changed as appropriate in accordance with a size of the display panel 5410. The housing 5400 which fixes the display panel 5410 is fit into a printed circuit board 5401 and assembled as a module.

The display panel 5410 is connected to the printed circuit board 5401 through an FPC 5411. A speaker 5402, a microphone 5403, a transmission/reception circuit 5404, and a signal processing circuit 5405 including a CPU, a controller, and the like are formed over the printed circuit board 5401. Such a module is combined with an input unit 5406 and a battery 5407, and incorporated into chassis 5409 and 5412. A pixel portion of the display panel 5410 is provided so as to be seen from an open window formed in the chassis 5412.

Figure 41A:
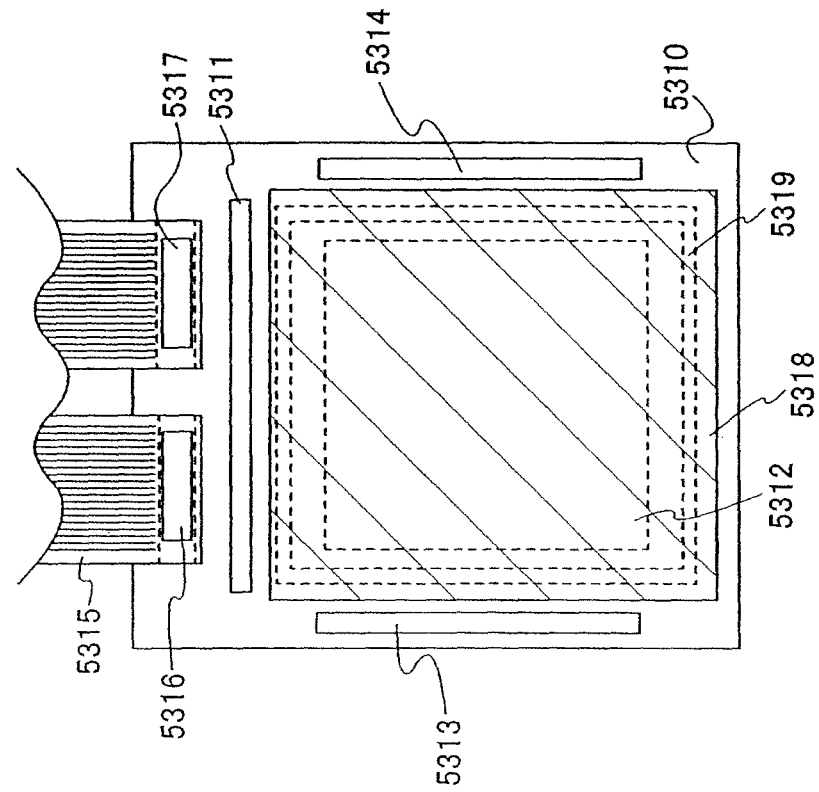
FIGS. 41A and 41B are views showing a semiconductor device of the invention.

The display panel 5410 may be formed in such a manner that the pixel portion and a part of peripheral driver circuits (a driver circuit with a low operating frequency among a plurality of driver circuits) are formed over the same substrate by using TFTs, while another part of the peripheral driver circuits (a driver circuit with a high operating frequency among the plurality of driver circuits) is formed over an IC chip, which may be mounted on the display panel 5410 by COG (Chip On Glass). Alternatively, the IC chip may be connected to a glass substrate by TAB (Tape Automated Bonding) or by using a printed circuit board. Note that FIG. 41A shows an example of a structure of a display panel in which a part of peripheral driver circuits and a pixel portion are formed over a substrate, while an IC chip where another part of the peripheral driver circuits is formed is mounted on the substrate by COG or the like. According to such a structure, power consumption of the display device can be reduced, and operation time of a mobile phone per charge can be extended. In addition, cost reduction of a mobile phone can be achieved.

In addition, time to write a signal to pixels in one row can be shortened by converting an impedance of the signal set to a scan line or a signal line by a buffer. Therefore, a high-definition display device can be provided.

In order to further reduce power consumption, a pixel portion may be formed over a substrate by using TFTs and all the peripheral circuits may be formed over an IC chip, which may be mounted on the display panel by COG (Chip On Glass) or the like.

By using the display device of the invention, a high-contrast image can be obtained.

Note that the structure shown in this embodiment mode is an example of a mobile phone; therefore, the display device of the invention is not limited to the mobile phone with the aforementioned structure and can be applied to mobile phones with various structures.

Note that the description in this embodiment mode can be freely combined with that in Embodiment Modes 1 to 8.

In addition, description is made with reference to various drawings in this embodiment mode. One drawing consists of various components. Therefore, another structure can be made by combining each of the components from each drawing.

Embodiment Mode 10

FIG. 42 shows a liquid crystal module combined with a display panel 5701 and a circuit substrate 5702. The display panel 5701 includes a pixel portion 5703, a scan line driver circuit 5704, and a signal line driver circuit 5705. For example, a control circuit 5706, a signal dividing circuit 5707, and the like are formed over the circuit substrate 5702. The display panel 5701 and the circuit substrate 5702 are connected by a connection wiring 5708. An FPC or the like can be used for the connection wiring.

The display panel 5701 may be formed in such a manner that a pixel portion and a part of peripheral driver circuits (a driver circuit with a low operating frequency among a plurality of driver circuits) are formed over the same substrate by using TFTs, while another part of the peripheral driver circuits (a driver circuit with a high operating frequency among the plurality of driver circuits) is formed over an IC chip, which may be mounted on the display panel 5701 by COG (Chip On Glass) or the like. Alternatively, the IC chip may be mounted on the display panel 5701 by TAB (Tape Automated Bonding) or by using a printed circuit board. Note that FIG. 41A shows an example of a structure in which a part of peripheral driver circuits and a pixel portion are formed over a substrate, while an IC chip where another part of the peripheral driver circuits is formed is mounted on the substrate by COG or the like. By using such a structure, power consumption of the display device can be reduced, and operation time of a mobile phone per charge can be extended. In addition, cost reduction of a mobile phone can be achieved.

In addition, time to write a signal to pixels in one row can be shortened by converting an impedance of a signal set to a scan line or a signal line by a buffer. Therefore, a high-definition display device can be provided.

In order to further reduce power consumption, a pixel portion may be formed over a glass substrate with TFTs and all the signal line driver circuits may be formed over an IC chip, which may be mounted on the display panel by COG (Chip On Glass).

Figure 41B:
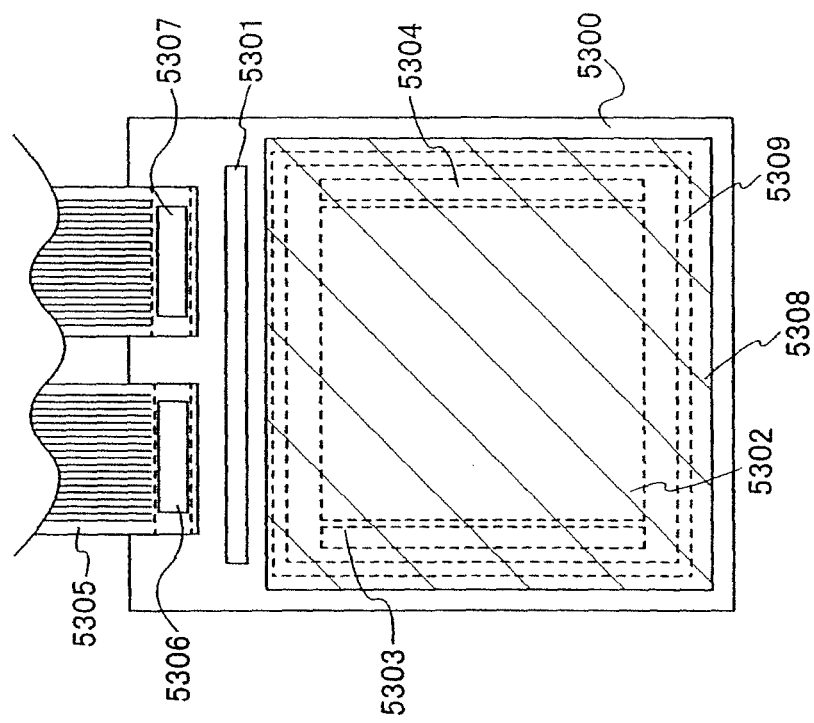

Note that it is preferable that a pixel portion be formed over a substrate by using TFTs and all the peripheral driver circuits be formed over an IC chip, which be mounted on the display panel by COG (Chip On Glass). FIG. 41B shows an example of a structure where a pixel portion is formed over a substrate and an IC chip in which a signal line driver circuit is formed is mounted on the substrate by COG or the like.

Figure 43:
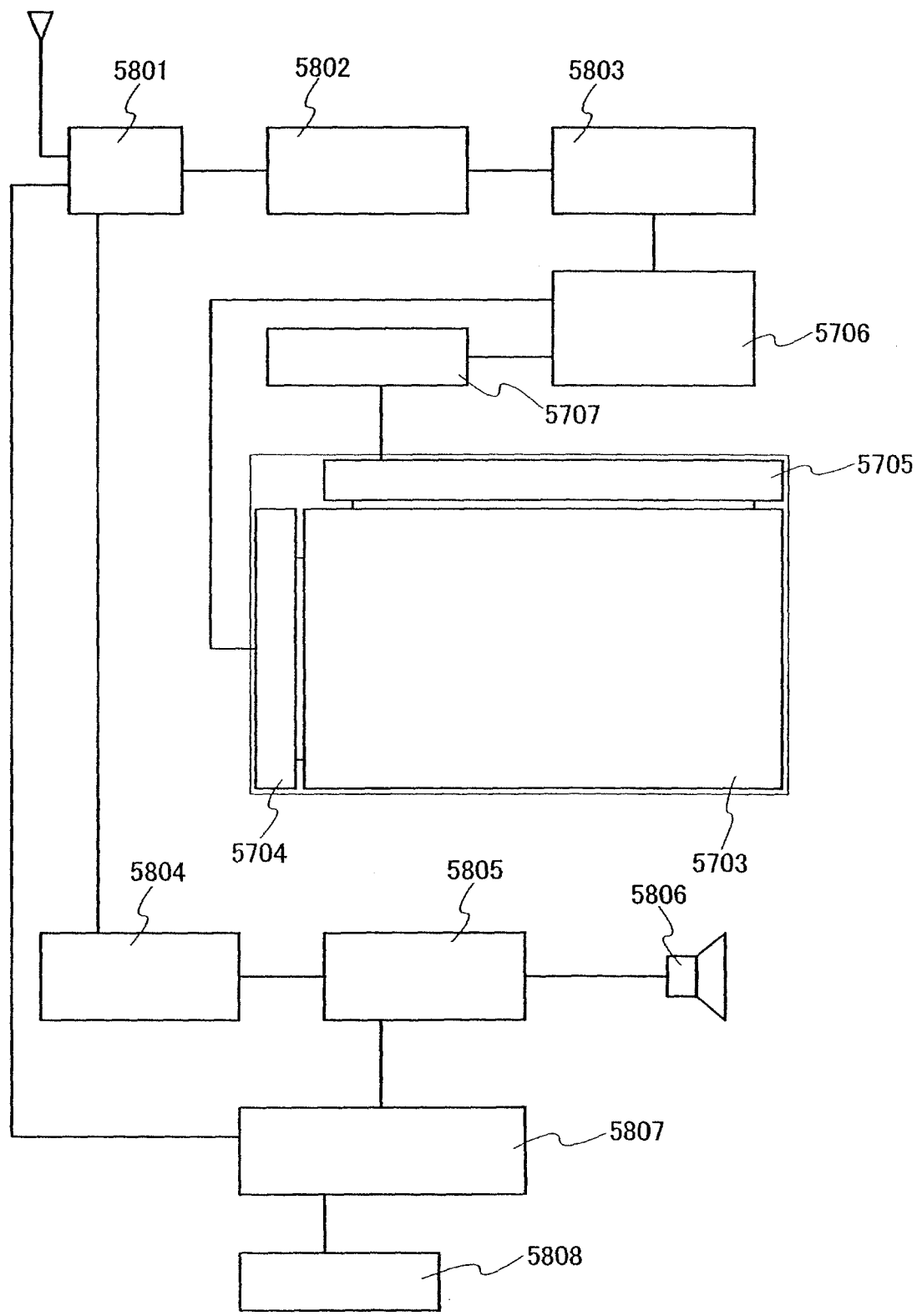
FIG. 43 is a diagram showing a semiconductor device of the invention.

A liquid crystal television receiver can be completed with this liquid crystal module. FIG. 43 is a block diagram showing a main structure of the liquid crystal television receiver. A tuner 5801 receives a video signal and an audio signal. The video signal is processed by a video signal amplifier circuit 5802; a video signal processing circuit 5803 which converts a signal outputted from the video signal amplifier circuit 5802 to a color signal corresponding to each color of red, green, and blue; and a control circuit 5706 which converts the video signal to input specifications of a driver circuit. The control circuit 5706 outputs signals to each of a scan line side and a signal line side. When performing digital drive, the signal dividing circuit 5707 may be provided on the signal line side so that the inputted digital signal is divided into m signals to be supplied.

Among the signals received by the tuner 5801, an audio signal is transmitted to an audio signal amplifier circuit 5804, and an output thereof is supplied to a speaker 5806 through an audio signal processing circuit 5805. A control circuit 5807 receives control data on a receiving station (receive frequency) and volume from an input portion 5808, and transmits the signal to the tuner 5801 and the audio signal processing circuit 5805.

A television receiver can be completed by incorporating a liquid crystal module into a housing. A display portion is formed by the liquid crystal module. In addition, a speaker, a video input terminal, and the like are provided as appropriate.

Needless to say, the invention is not limited to a television receiver and can be applied to various uses such as a monitor of a personal computer, an information display board at a train station or an airport, and an advertising display board on the street, specifically as a large-area display medium.

As described above, a high-contrast image can be obtained by using the display device of the invention.

Note that the description in this embodiment mode can be freely combined with that in Embodiment Modes 1 to 9.

In addition, description is made with reference to various drawings in this embodiment mode. One drawing consists of various components. Therefore, another structure can be made by combining each of the components from each drawing.

Embodiment Mode 11

The invention can be applied to various electronic apparatuses. Specifically, the invention can be applied to a display portion of an electronic apparatus. As such an electronic apparatus, a camera such as a video camera and a digital camera, a goggle type display, a navigation system, an audio reproducing device (a car audio, an audio component stereo, and the like), a computer, a game machine, a portable information terminal (a mobile computer, a mobile phone, a portable game machine, an electronic book, and the like), an image reproducing device provided with a recording medium (specifically, a device which reproduces a recording medium such as a digital versatile disc (DVD) and has a display device for displaying the reproduced image), and the like are taken as examples.

Figure 44A:
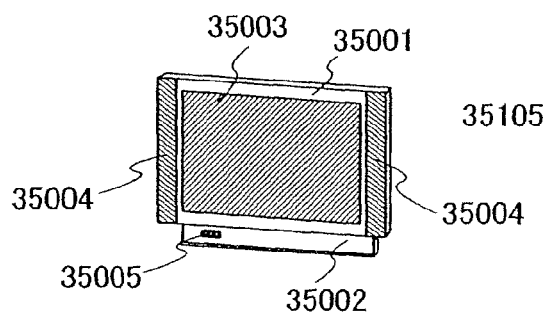
FIGS. 44A to 44H are views illustrating one mode of an electronic apparatus to which the invention is applied.

FIG. 44A shows a display device, which includes a chassis 35001, a supporting base 35002, a display portion 35003, speaker portions 35004, a video input terminal 35005, and the like. The display device of the invention can be applied to the display portion 35003. Note that the display device includes all information display devices such as those for a personal computer, TV broadcasting reception, and advertisement display. A display device which uses the display device of the invention for the display portion 35003 can provide a high-contrast image.

Figure 44B:
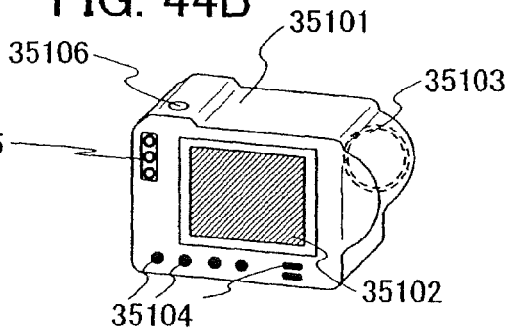

FIG. 44B shows a camera, which includes a main body 35101, a display portion 35102, an image receiving portion 35103, operating keys 35104, an external connecting port 35105, a shutter 35106, and the like.

A digital camera in which the invention is applied to the display portion 35102 can provide a high-contrast image.

Figure 44C:
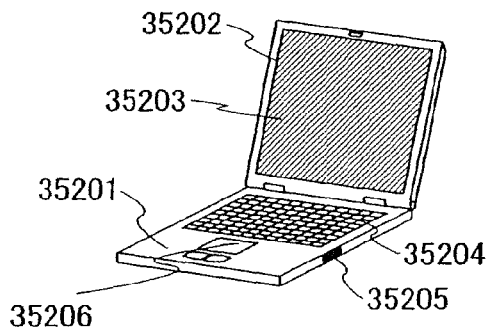

FIG. 44C shows a computer, which includes a main body 35201, a chassis 35202, a display portion 35203, a keyboard 35204, an external connecting port 35205, a pointing device 35206, and the like. A computer in which the invention is applied to the display portion 35203 can provide a high-contrast image.

Figure 44D:
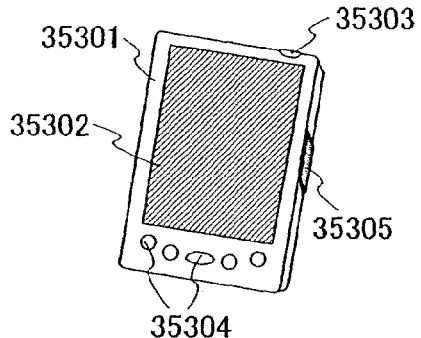

FIG. 44D shows a mobile computer, which includes a main body 35301, a display portion 35302, a switch 35303, operating keys 35304, an infrared port 35305, and the like. A mobile computer in which the invention is applied to the display portion 35302 can provide a high-contrast image.

Figure 44E:
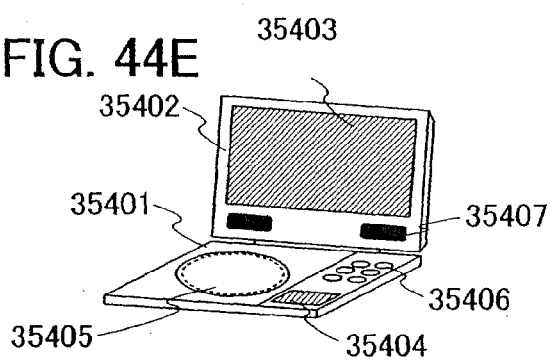

FIG. 44E shows a portable image reproducing device provided with a recording medium (specifically, a DVD player), which includes a main body 35401, a chassis 35402, a display portion A 35403, a display portion B 35404, a recording medium (such as DVD) reading portion 35405, an operating key 35406, a speaker portion 35407, and the like. The display portion A 35403 mainly displays image data, while the display portion B 35404 mainly displays text data. An image reproducing device in which the invention is applied to the display portion A 35403 and the display portion B 35404 can provide a high-contrast image.

Figure 44F:
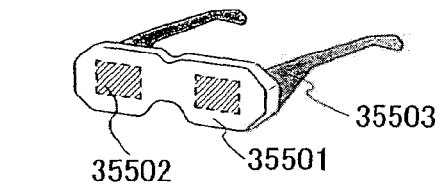

FIG. 44F shows a goggle type display, which includes a main body 35501, a display portion 35502, an arm portion 35503, and the like. A goggle type display in which the invention is applied to the display portion 35502 can provide a high-contrast image.

Figure 44G:
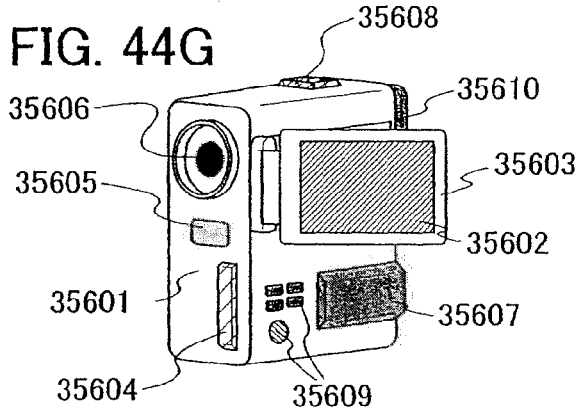

FIG. 44G shows a video camera, which includes a main body 35601, a display portion 35602, a chassis 35603, an external connecting port 35604, a remote controller receiving portion 35605, an image receiving portion 35606, a battery 35607, an audio input portion 35608, operating keys 35609, an eyepiece portion 35610, and the like. A video camera in which the invention is applied to the display portion 35602 can provide a high-contrast image.

Figure 44H:
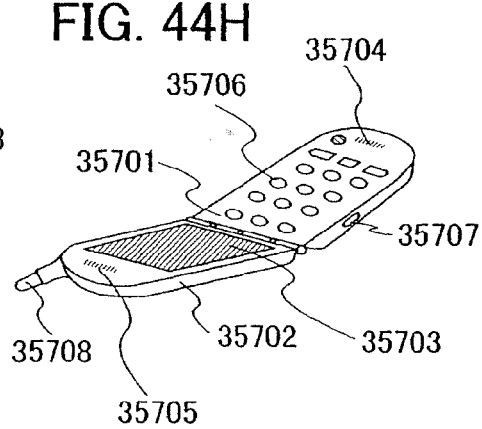

FIG. 44H shows a mobile phone, which includes a main body 35701, a chassis 35702, a display portion 35703, an audio input portion 35704, an audio output portion 35705, an operating key 35706, an external connecting port 35707, an antenna 35708, and the like. A mobile phone in which the invention is applied to the display portion 35703 can provide a high-contrast image.

As described above, the applicable range of the invention is so wide that the invention can be applied to electronic apparatuses of various fields. In addition, the electronic apparatuses in this embodiment mode may use a display device with any of the structures described in Embodiment Modes 1 to 13.

This application is based on Japanese Patent Application serial No. 2005-378778 filed in Japan Patent Office on Dec. 28, 2005, the entire contents of which are hereby incorporated by reference.

What is claimed is:

1. A display device comprising:
a transistor over a first substrate, the transistor comprising a channel formation region in a semiconductor film;
a first insulating film over the semiconductor film;
a gate wiring over the first insulating film;
a first conductive film over the first substrate;
a second insulating film over the gate wiring and the first conductive film;
a source and drain electrode layers over the second insulating film;
a third insulating film over the source and drain electrode layers;
a second conductive film over the third insulating film, the second conductive film being capable of transmitting light;
a third conductive film over the second conductive film, the third conductive film being capable of reflecting light;
a fourth conductive film over the second conductive film;
a liquid crystal layer over the third conductive film; and
a second substrate over the liquid crystal layer,
wherein the second conductive film comprises a first region which is overlapped with the third conductive film and a second region which is not overlapped with the third conductive film,
wherein the first region includes a region which overlaps the first conductive film with the second insulating film and the third insulating film interposed therebetween,
wherein the second region has a larger area than the first region,
wherein the third conductive film overlaps the first conductive film along a long axis direction thereof,
wherein the semiconductor film comprises a third region whose long axis is provided along a long axis direction of the gate wiring and a fourth region whose long axis is provided along a long axis direction of one of the source and drain electrode layers,
wherein the third region includes a fifth region which is overlapped with the gate wiring,
wherein the fourth region includes a region which is overlapped with the first region,
wherein the fifth region is not overlapped either with the second conductive film or the third conductive film, and
wherein the gate wiring and the first conductive film are provided on a same surface.

2. The display device according to claim 1, wherein the semiconductor film is an oxide semiconductor film which comprises In, Zn and a metal other than In and Zn.

3. The display device according to claim 1, wherein a top surface of the third conductive film is in contact with the liquid crystal layer.

4. The display device according to claim 1, wherein a bottom surface of the third conductive film is in contact with a top surface of the second conductive film.

5. The display device according to claim 1, wherein the first conductive film serves as one electrode of a capacitor.

6. The display device according to claim 1, wherein the third conductive film serves as part of a pixel electrode.

7. An electronic device comprising a display portion into which the display device according to claim 1 is incorporated.

8. The display device according to claim 1,
wherein the liquid crystal layer is located between the second conductive film and the fourth conductive film, and
wherein the fourth conductive film serves as an opposite electrode.

9. A display device comprising:
a transistor over a first substrate, the transistor comprising a channel formation region in a semiconductor film;
a first insulating film over the semiconductor film;
a gate wiring over the first insulating film;
a first conductive film over the first substrate;
a second insulating film over the gate wiring and the first conductive film;
a source and drain electrode layers over the second insulating film;
a third insulating film over the source and drain electrode layers;
a second conductive film over the third insulating film, the second conductive film being capable of transmitting light;
a third conductive film over the second conductive film;
a fourth conductive film over the second conductive film;
a liquid crystal layer over the third conductive film; and
a second substrate over the liquid crystal layer,
wherein the second conductive film comprises a first region which is overlapped with the third conductive film and a second region which is not overlapped with the third conductive film,
wherein the first region includes a region which overlaps the first conductive film with the second insulating film and the third insulating film interposed therebetween,
wherein the second region has a larger area than the first region,
wherein the third conductive film overlaps the first conductive film along a long axis direction thereof,
wherein the semiconductor film comprises a third region whose long axis is provided along a long axis direction of the gate wiring and a fourth region whose long axis is provided along a long axis direction of one of the source and drain electrode layers, wherein the third region includes a fifth region which is overlapped with the gate wiring, wherein the fourth region includes a region which is overlapped with the first region and a contact hole provided in the first insulating film and the second insulating film, wherein the fifth region is not overlapped either with the second conductive film or the third conductive film, and wherein the gate wiring and the first conductive film are provided on a same surface.

10. The display device according to claim 9, wherein the semiconductor film is an oxide semiconductor film which comprises In, Zn and a metal other than In and Zn.

11. The display device according to claim 9, wherein a top surface of the third conductive film is in contact with the liquid crystal layer.

12. The display device according to claim 9, wherein a bottom surface of the third conductive film is in contact with a top surface of the second conductive film.

13. The display device according to claim 9, wherein the first conductive film serves as one electrode of a capacitor.

14. The display device according to claim 9, wherein the third conductive film serves as part of a pixel electrode.

15. An electronic device comprising a display portion into which the display device according to claim 9 is incorporated.

16. The display device according to claim 9,
wherein the liquid crystal layer is located between the second conductive film and the fourth conductive film, and wherein the fourth conductive film serves as an opposite electrode.

17. A display device comprising:
a semiconductor film over a substrate;
a first insulating film over the semiconductor film;
a first conductive film over the first insulating film;
a second conductive film over the first insulating film;
a second insulating film over the first conductive film and the second conductive film;
a third conductive film over the second insulating film;
a third insulating film over the third conductive film;
a fourth conductive film over the third insulating film; and
a fifth conductive film over the fourth conductive film,
wherein the semiconductor film a first channel formation region and a second channel formation region of a transistor, wherein the first insulating comprises a region serving as a gate insulating film of the transistor, wherein the first conductive film comprises a region serving as a gate electrode of the transistor, wherein the third conductive film comprises a region serving as one of a source electrode and a drain electrode, wherein the fourth conductive film is capable of letting light through, wherein the fifth conductive film is capable of reflecting light, wherein the fourth conductive film comprises a first region which is overlapped with the fifth conductive film and a second region which is not overlapped with the fifth conductive film, wherein the second region has a larger area than the first region, wherein a long axis of the third conductive film is provided across a long axis direction of the second conductive film, wherein the fifth conductive film comprises a region whose long axis is provided along a long axis direction of the second conductive film, wherein the fifth conductive film comprises a region whose long axis is provided across a long axis direction of the third conductive film, wherein the fifth conductive film comprises a region which is overlapped with the second conductive film, wherein the fifth conductive film comprises a region which is overlapped with the third conductive film, wherein the first conductive film and the second conductive film are formed by processing a same conductive film, wherein the semiconductor film comprises a third region whose long axis is provided across a channel width direction of the first channel formation region and a fourth region whose long axis is provided across a channel length of the first channel formation region, wherein the first channel formation region comprises a fifth region which is not overlapped with the fourth conductive film and the fifth conductive film, and wherein the fourth region comprises a sixth region which is overlapped with the fourth conductive film.

* * * * *